(12) United States Patent
Burch, V et al.

(10) Patent No.: US 11,433,935 B2
(45) Date of Patent: Sep. 6, 2022

(54) SYSTEMS AND METHODS FOR IMPROVED CARGO DOLLY FOR REMOTE CARGO HOLDING PINS FOR A CARGO DOLLY

(71) Applicant: FEDEX CORPORATE SERVICES, INC., Collierville, TN (US)

(72) Inventors: Reuben F. Burch, V, Columbus, MS (US); Katherine King, Collierville, TN (US); Howard McKinney, Bartlett, TN (US); Aaron Prather, Collierville, TN (US); Kevin Frommelt, Collierville, TN (US); Shaq Khan, Collierville, TN (US)

( * ) Notice: Subject to any disclaimer, the term of this patent is extended or adjusted under 35 U.S.C. 154(b) by 637 days.

(21) Appl. No.: 16/515,082

(22) Filed: Jul. 18, 2019

(65) Prior Publication Data
US 2020/0039557 A1    Feb. 6, 2020

Related U.S. Application Data

(60) Provisional application No. 62/712,541, filed on Jul. 31, 2018.

(51) Int. Cl.
*B62B 5/04* (2006.01)
*B62B 3/04* (2006.01)

(52) U.S. Cl.
CPC ............. *B62B 5/0447* (2013.01); *B62B 3/04* (2013.01); *B62B 2501/04* (2013.01)

(58) Field of Classification Search
CPC ... B62B 5/0447; B62B 5/0438; B62B 5/0404; B62B 5/04; B62B 3/04; B62B 2501/04
See application file for complete search history.

(56) References Cited

U.S. PATENT DOCUMENTS

| | | | |
|---|---|---|---|
| 4,003,584 A | 1/1977 | Zelli | |
| 4,280,595 A * | 7/1981 | Timms | B62B 5/04 188/69 |
| 4,541,768 A * | 9/1985 | Walker | B64F 1/322 414/535 |

(Continued)

FOREIGN PATENT DOCUMENTS

| | | |
|---|---|---|
| CN | 107380231 A | 11/2017 |
| GB | 1155469 A | 6/1969 |

OTHER PUBLICATIONS

PCT Application No. PCT/US2019/042310 International Search Report and Written Opinion dated Nov. 13, 2019.

*Primary Examiner* — John D Walters
(74) *Attorney, Agent, or Firm* — Withers & Keys, LLC

(57) ABSTRACT

An improved cargo dolly for transporting cargo is described having a mobile dolly frame, a main shaft on the frame, a lever proximate to a first part of the frame (where the lever is movable relative to the frame and in responsive communication with the main shaft), a first set of transfer sprockets mounted to the main shaft, a secondary shaft rotatably disposed at a second part of the frame (where the first part is remote from the second part), a second set of transfer sprockets mounted to the secondary shaft, a chain disposed about the first set of transfer sprockets and the second set of transfer sprockets, and a locking pin having a first end fixed to the secondary shaft and a second end configured as an angled latch. Rotation of the lever responsively causes the locking pin to remotely rotate at the second part of the frame.

26 Claims, 31 Drawing Sheets

(56) References Cited

U.S. PATENT DOCUMENTS

| | | | | |
|---|---|---|---|---|
| 4,949,986 A | * | 8/1990 | Gohier | B60D 1/00 296/29 |
| 4,986,596 A | * | 1/1991 | Gohier | B62B 3/00 296/210 |
| 2013/0334783 A1 | | 12/2013 | Carruyo | |

* cited by examiner

SYSTEMS AND METHODS FOR IMPROVED CARGO DOLLY FOR REMOTE CARGO HOLDING PINS FOR A CARGO DOLLY

PRIORITY APPLICATION

The present application hereby claims the benefit of priority to related U.S. Provisional Patent Application No. 62/712,541 and entitled "Systems and Methods for Improved Remote Cargo Holding Pins for a Cargo Dolly."

FIELD OF THE DISCLOSURE

The present disclosure generally relates to systems, apparatus, and methods in the field of logistics vehicles and, more particularly, to various aspects of systems, apparatus, and methods related to improved designs of cargo tractor and associated dollies using one or more pins to be dropped or moved on the cargo tractor dolly.

BACKGROUND

Logistics ground support equipment (GSE) is commonly known to include cargo tractors and dollies, which are used to transport cargo (e.g., packages, containers, palletized material, and the like). When transporting cargo on the dolly, there is a need to secure the cargo in place to make sure the cargo stays in place while on the dolly to ensure safe transport of the cargo as well as to help ensure the safety of operators of the ground support equipment.

However, when loading cargo on the dolly, there may be safety issues as the cargo (e.g., a container) is loaded from a separate container loader onto the cargo dolly. Typically, logistics personnel may be instructed not to walk between a cargo dolly and a container loader while the main platform of the loader is in use. However, before a container can be pushed from a loaded dolly to an aircraft loader, the pins on the side of a conventional cargo dolly facing the aircraft loader need to be dropped. Conventionally, a human would need to traverse the gap between the side of the cargo dolly and the aircraft loader in order to drop the further post pin. This poses safety risks to logistics personnel. Complicating this further, delays in loading are undesirable and may often cause logistics personnel to disregard instructions, which compromises their safety in an effort to speed up the loading and unloading work.

To address one or more of these types of problems, there is a need for a technical solution that may be deployed to enhance ways to allow for remote dropping of one or more of the cargo holding pins on a cargo dolly in an improved and enhanced manner that improves system performance and helps reduce safety risk to logistics personnel involved in loading and unloading operations as well as potential damage to ground support equipment. In particular, what is described are various exemplary types of methods and systems where a cargo dolly may be designed or retrofit so as to allow for remotely actuating cargo holding pins in novel and unconventional ways.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

In general, aspects of the disclosure relate to systems, methods, apparatus, and assemblies of components that remotely control one or pins on a cargo dolly so that they may be dropped/moved on one or more sides of the dolly from another side of the dolly at the same time while avoiding the need for human intervention between the dolly and the container loader. In more detail, a first aspect of the disclosure focuses on a dolly locking pin that is a lever-based mechanism for simultaneous lock/unlock of all four locks on one side of the cargo dolly using levers located at the front of the dolly. This aspect involves deploying a rotating shaft with transfer sprockets on the cargo dolly to rotate the pins. As such, a chain drive pin rotation system is described where bearing mounted shafts are disposed in the cargo dolly and may be rotated. The shafts have gears/sprockets and chains fitted to the gears. The chains are then also fitted to other sprockets fixed to a side of the dolly and such other sprockets, which responsively articulate latches operating as types of pins that can selectively engage containers on the cargo dolly Another aspect of the disclosure focuses on simultaneously locking and unlocking one or more pins while the logistics operator is stationary using articulating links. Here, the links may be articulated to travel parallel with the inside of the dolly frame. As such, the articulating links responsively activate a lock mechanism with a sub pin design and a WASP spring-collet rotation system to remotely deploy one or more cargo pins.

A further aspect of the disclosure focuses on a moveable control system for remote pin drop. The system may be placed into a secured and locked position for use on one side of the cargo dolly, and then repositioned in a stored position out of the way so as to avoid damage while being situated within the side frame of the cargo dolly.

Yet another aspect of the disclosure focuses on systems for automatic actuation of cargo holding pins based on cargo tug movement and location relative to the aircraft loader and alignment with the loader using sensors onboard the cargo tug and/or dolly. This aspect may deploy an electronics controller module having GPS and inertial measurement unit types of sensors to detect and respond to movement of the tug/dolly, a transceiver that receives the relative location of the aircraft loader (whether in GPS type of coordinates) and/or further proximity sensors that detects the relative location of a nearby aircraft loader. The controller module may sense alignment data (e.g., proximity data, location data, user input data, and/or a combination thereof) so as to activate and actuate cargo holding pins via one or more of the remote actuation assemblies described herein.

Additional advantages of these and other aspects of the disclosed embodiments and examples will be set forth in part in the description which follows, and in part will be evident from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments according to one or more principles of the invention and together with the description, serve to explain one or more principles of the invention. In the drawings.

DESCRIPTION OF THE EMBODIMENTS

Figure 1A:
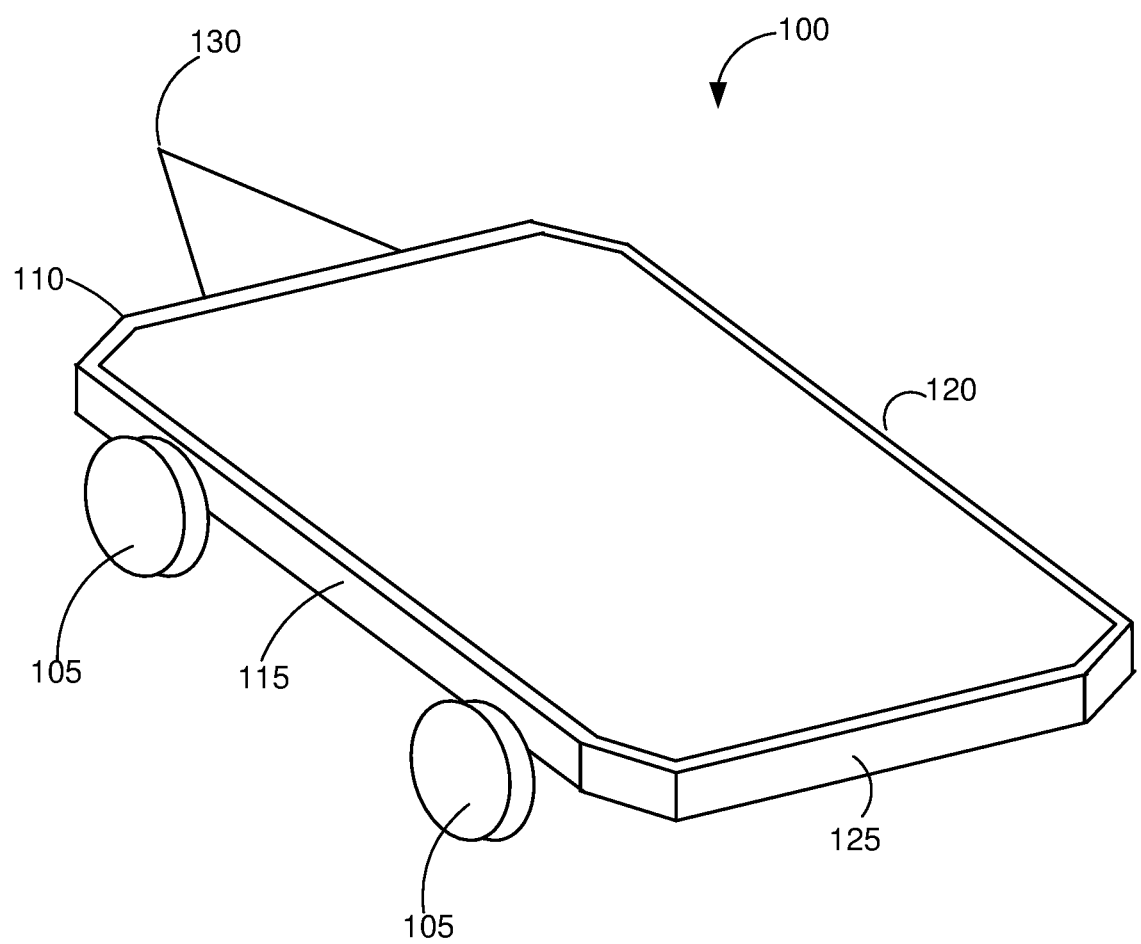
FIG. 1A is a diagram of an exemplary mobile dolly frame in accordance with an embodiment of the invention.

Reference will now be made in detail to various exemplary embodiments. However, those skilled in the art will appreciate that different embodiments may implement a particular part in different ways according to the needs of the intended deployment and operating environment for the respective embodiments.

As noted above, aspects of the disclosure relate to systems, methods, apparatus, and assemblies of components that.

The following describes various embodiments of different systems, apparatus, and applied methods that are deployed and used to remotely control one or pins on a cargo dolly so that they may be dropped/moved on one or more sides of the dolly from another side of the dolly at the same time while avoiding the need for human intervention between the dolly and the container loader. Furthermore, those skilled in the art will appreciate that additional embodiments may combine some of these otherwise independent solutions to provide for an even more robust system for remotely deploying cargo dolly pin structures that help secure cargo being loaded onto, transported on, and unloaded from an exemplary cargo dolly used by logistical ground support equipment (e.g., a cargo tractor or tug) as described in more detail below. The description below is further enhanced with additional details as reflected in appended exhibit documents providing additional reference information.

As used herein, those skilled in the art will appreciate that the term "cargo tractor" or "tug" refers to a mobile industrial vehicle used in the logistics field for transporting cargo, typically via one or more trailing dollies. A dolly is generally a type of trailer for the cargo tractor that is connected to the tractor and has specialized mechanical structure onboard to help secure what is loaded onto the dolly for transport. An example of such specialized mechanical structure may include one or more pins that may be dropped or moved so that the pins engage with or help secure the cargo (e.g., a container, such as a unit load device (ULD) container commonly used for transporting items on aircraft).

Cargo dollies need robust systems to handle large mass/weights of cargo on the dolly. For example, a cargo dolly may need to withstand up to 15,000 pounds of pressure when a fully loaded cargo container shifts it weight onto the pins on either side of the dolly as the container is being pulled around a corner and centrifugal force presses that weight against the pins. Conventional pins do not sit flush with the edges of the container and, therefore, space exists between the container base and the pins allowing for movement of a container on a dolly—in some cases by approximately one inch. Current dolly designs have pins mounted to the frame of the dolly, and the frame absorbs the force.

What is described herein are embodiments for designs and technical solutions that allow for remote dropping of one or more of the cargo holding pins on a cargo dolly in an improved and enhanced manner that improves system performance, helps reduce safety risk to logistics personnel involved in loading and unloading operations, and helps reduce potential damage to ground support equipment. Such embodiments may be in the form of a cargo dolly with enhanced features that allow for different ways of remote dropping of the pins (and automatic systems for accomplishing the same), but other embodiments may take the form of retrofit assemblies that may be added to an existing cargo dolly to improve and enhance how that cargo dolly may be used so as to increase safety as well as ease & speed of load and unload operations involving cargo on the dolly.

Lever-Based System

In more detail, some embodiments focus on dolly locking pins that may be remotely actuated using a lever-based mechanism for simultaneous lock/unlock of multiple locks on one side of the cargo dolly using a lever located at the front of the dolly as the actuating mechanism. In one embodiment, a single lever may be used to deploy and articulate all locking pins on the dolly. In another embodiment, a plurality of different levers (located at a remote location from where the dolly may interface and abut a container loader/unloader) may be used to selectively articular individual or groups of locking pins on the dolly.

In general, these embodiments involve deploying a rotating main shaft within the dolly frame, and disposing a first set of transfer sprockets on the shaft and a second set of sprockets relative to the cargo dolly frame on a different shaft that responsively rotates the locking pins (e.g., angled latches that interface with points on cargo containers on the dolly). FIGS. 1A-6B further details on an exemplary embodiment with one or more exemplary main shafts having the lever and the first set of sprockets, a chain that engages the first set of sprockets on the main shaft as well as the second set of sprockets on a secondary shaft having an articulating latch as a type of "pin" that may be rotated/articulated to a position where it can hold cargo in place on the deck of the cargo dolly when raised, or lower it to release or otherwise not secure cargo on the dolly's deck.

Figure 1B:
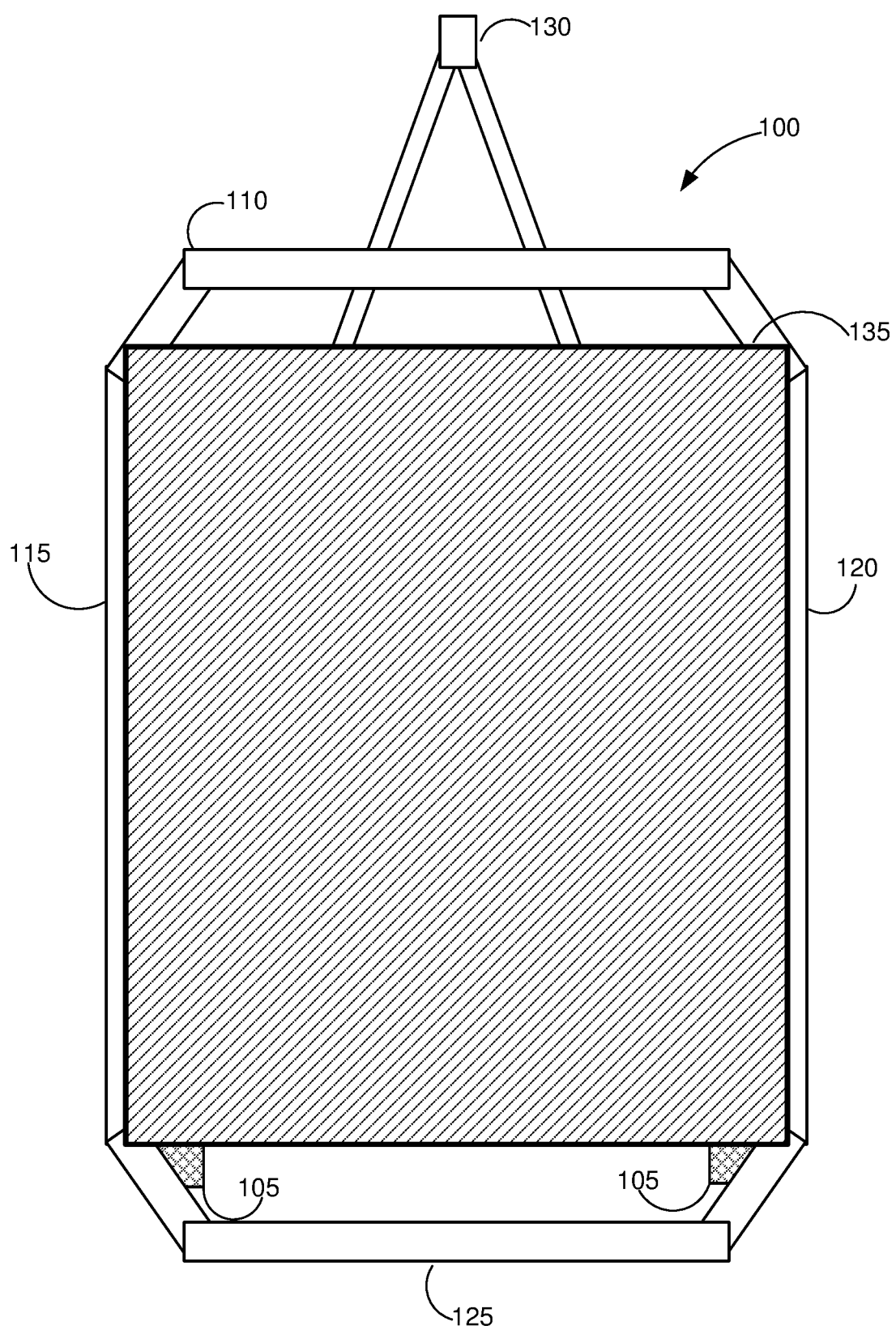
FIG. 1B is a more detailed diagram of an exemplary mobile dolly frame shown from above and illustrating an exemplary working area on which cargo may be supported in accordance with an embodiment of the invention.
Figure 1C:
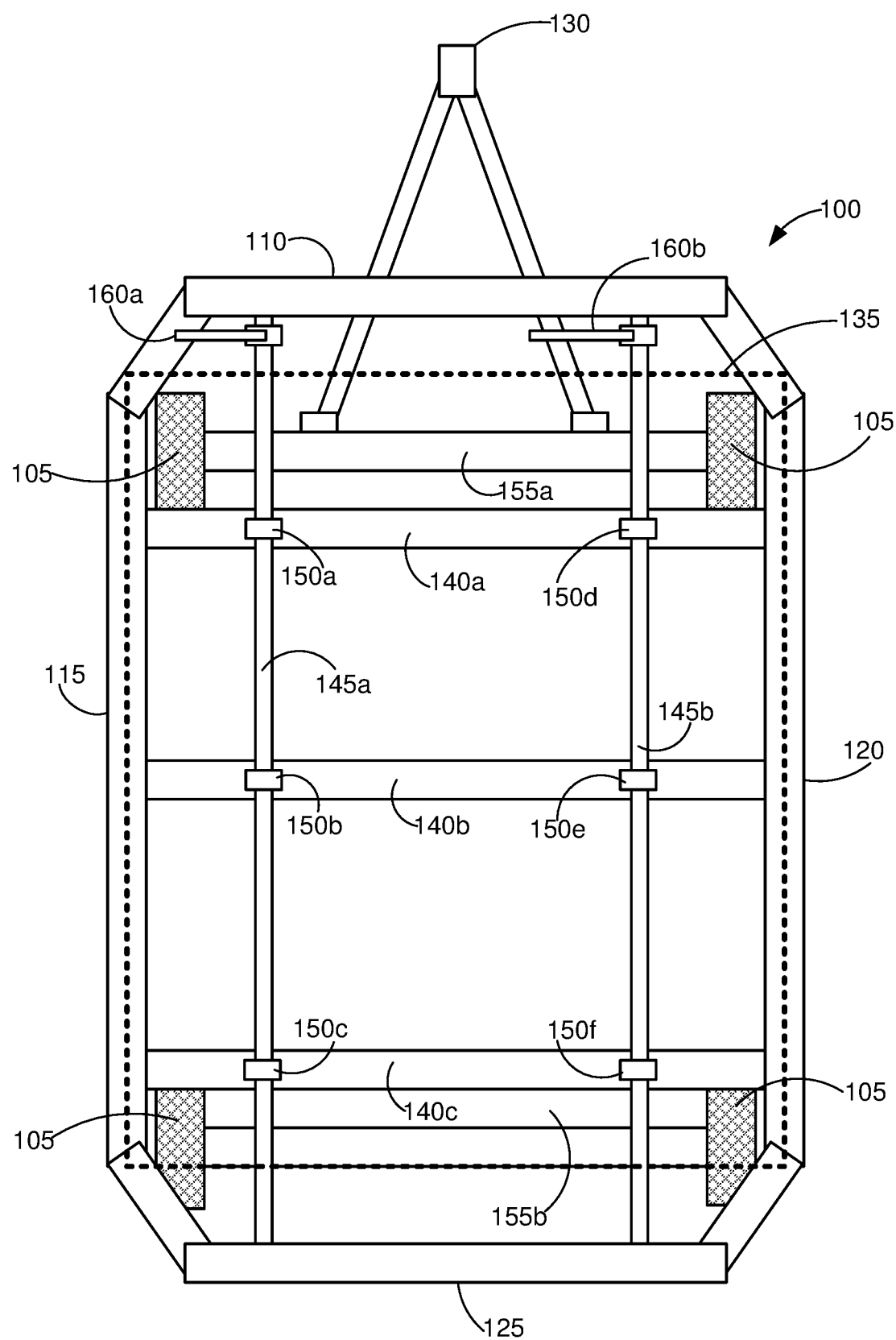
FIG. 1C is a further diagram of an exemplary mobile dolly frame shown from above and illustrating exemplary main shafts and levers used in accordance with an embodiment of the invention.

FIG. 1A is a diagram of an exemplary mobile dolly frame 100 in accordance with an embodiment of the invention. Exemplary mobile dolly frame 100 shown in FIG. 1A may be used as a foundational structure in an embodiment for the transportation/loading/unloading of cargo, such as cargo pallets or unit load devices (ULDs). Exemplary mobile dolly frame (also referred to as a dolly or cargo dolly) is shown with a set of wheels 105, which may be deployed to extend outside of frame 100 (as shown in FIG. 1A) or be disposed on axles to be within frame 100 (as shown in FIGS. 1B and 1C). Exemplary mobile dolly frame 100 is shown as a rail-based frame having at least a front edge 110, a first side edge 115 connected to the front edge 110, a second side edge 120 connected to the front edge 110, a rear edge 125 connected to each of the first side edge 115 and the second side edge 120, and an exemplary tow bar 130 that may be connected to tractor or to other dollies. Those skilled in the art will appreciate that other embodiments of an exemplary dolly frame may be implemented in configurations of different sizes and shapes, but with side edges where cargo may be loaded/unloaded and a container loader/unloader may interface and abut the dolly frame so that cargo supported on the dolly frame may be released from a secure configured and moved off a working area of the dolly frame (e.g., working area or cargo deck 135 as shown in FIG. 1B).

FIG. 1C is a further diagram of exemplary mobile dolly frame 100 shown from above and with more details. Referring now to FIG. 1C, exemplary mobile dolly frame 100 is shown with axles 155a, 155b that may be disposed relative to the frame 100 so as to support wheels 105 (which support the frame 100 and rotate to allow movement of frame 100), cross-member support rails 140a-140c, main shafts 145a-b rotatably disposed on support rails 140a-c of frame 100 via bearings 150a-f (shown in more detail in FIG. 4), and levers 160a-b disposed proximate to part of the dolly frame 100 (e.g., the front edge 110 as shown or the rear edge 125 in other embodiments). Each of levers 160a-160b is movable relative to the dolly frame 100 and in responsive communication with respective ones of the main shafts 145a-145b (shown in more detail in FIG. 4). As shown in FIG. 1C, lever 160a, for example, is disposed on an inner side of the front edge 110 of the dolly frame 100 proximate one side edge 115 so as to allow movement of the lever 160a relative to the dolly frame 100 without being in the working area 135 of the cargo (and without interfering with movement of the cargo, which further allows an operator of lever 160a to remain remote from the cargo and where it may be loaded/unloaded from the frame 100). Exemplary lever 160b is similarly disposed on the inner side of the front edge 110, but in a location proximate the other side edge 120 of frame 100.

Figure 2A:
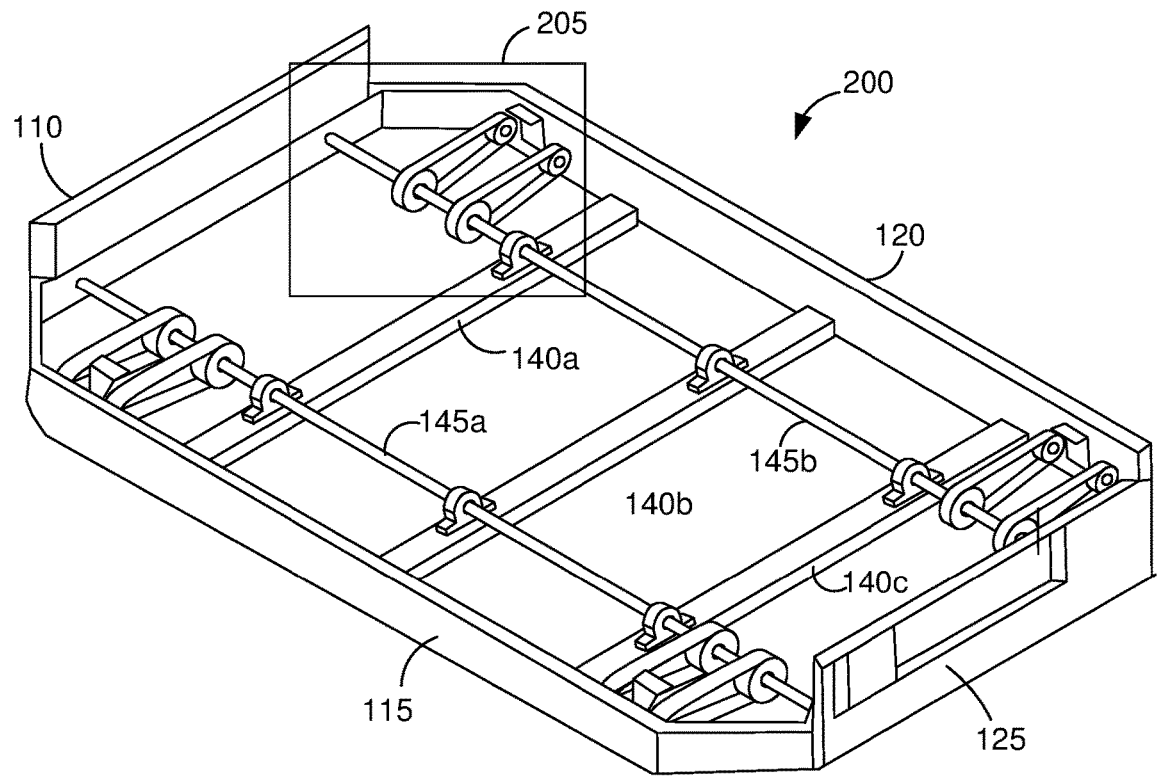
FIGS. 2A and 2B are perspective diagrams of an exemplary mobile dolly frame illustrating exemplary transfer sockets, chains, secondary shafts, and locking pins in accordance with an embodiment of the invention.
Figure 2B:
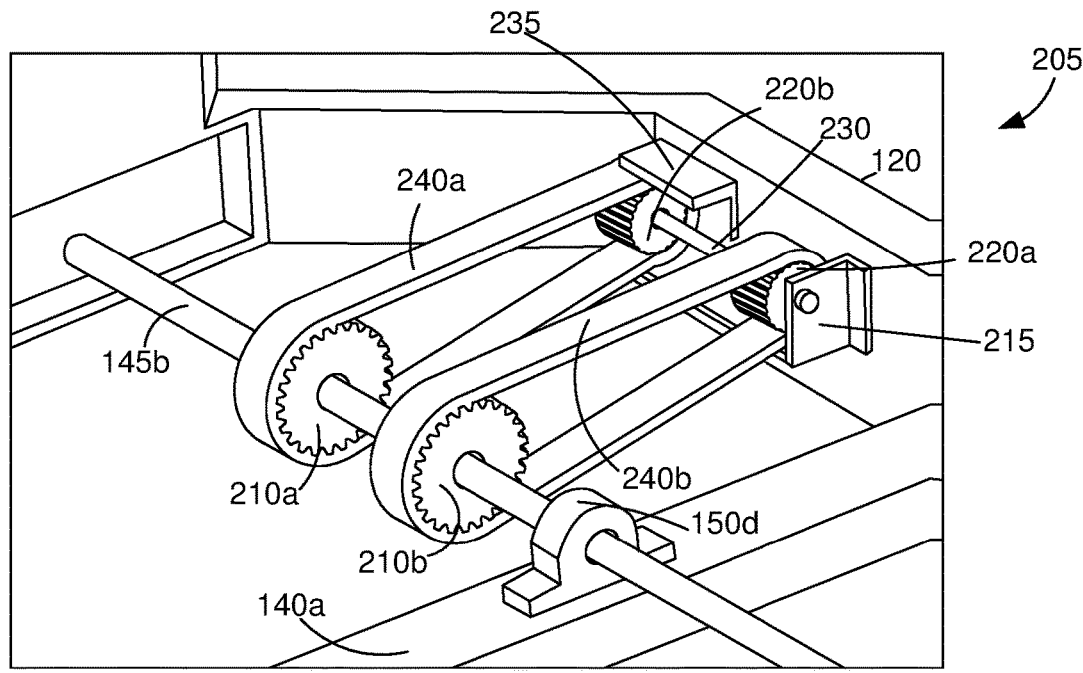

FIGS. 2A and 2B are perspective diagrams of exemplary mobile dolly frame 100 illustrating exemplary transfer sockets, chains, secondary shafts, and locking pins as separate lever-actuated locking pin assemblies in accordance with an embodiment of the invention. As shown, each lever 160a-160b may be actuated (e.g., rotated) to cause movement of the respective locking pins proximate different side edges 115-120 of frame with the operator remaining remote from the locking pins and allowing the lever operator to remain in view of an operator of the cargo loader/unloader. In more detail, exemplary frame 200 shown in FIG. 2A is similar to that of frame 100, while further showing an exemplary assembly 205 of a level-actuated locking pin (with similarly configured assemblies shown along different parts of each of side edges 115-120). FIG. 2B provides more detail showing exemplary lever-actuated locking pin assembly 205 including main shaft 145b, a first set of transfer sprockets 210a-210b mounted to the main shaft 145b; a secondary shaft 230, a second set of transfer sprockets 220a-220b mounted to the secondary shaft 230; chains 240a-240b disposed about and engaged with the first set of transfer sprockets 210a-210b and the second set of transfer sprockets 220a-220b; and a locking pin 235. The secondary shaft 230, as shown in FIG. 2B, is rotatably disposed proximate to side edge 120 of the dolly frame 200 on bracket 215 (fixed to frame 200), wherein the first part of the dolly frame 200 where lever 160b is located is remote from the part of the dolly frame where the locking pin 235 is located. The locking pin 235 has a first end fixed to the secondary shaft 230 and a second end that may be configured as an angled latch (shown in more detail in FIGS. 6A and 6B). Those skilled in the art will appreciate that, in this assembly configuration, rotation of the lever 160b at the front part of the dolly frame responsively causes the locking pin 235 shown in FIG. 2B to remotely rotate at the side part of the dolly frame 200 shown in FIG. 2B.

As shown in FIG. 2A, embodiments may have a single lever that articulates a main shaft, which then drives multiple locking pins. Thus, an embodiment may use lever 160b to remotely articulate different locking pins disposed at different points of side edge 120 of dolly frame 200 as shown in FIG. 2A. In like manner, another embodiment may use lever 160a to remotely articulate different locking pins disposed at different points of side edge 115 of dolly frame 200 as shown in FIG. 2A. Still further embodiments may deploy a single lever with further transfer sockets and chains to drive multiple main shafts and locking pins disposed at multiple points on both edged of dolly frame 200.

Figure 3A:
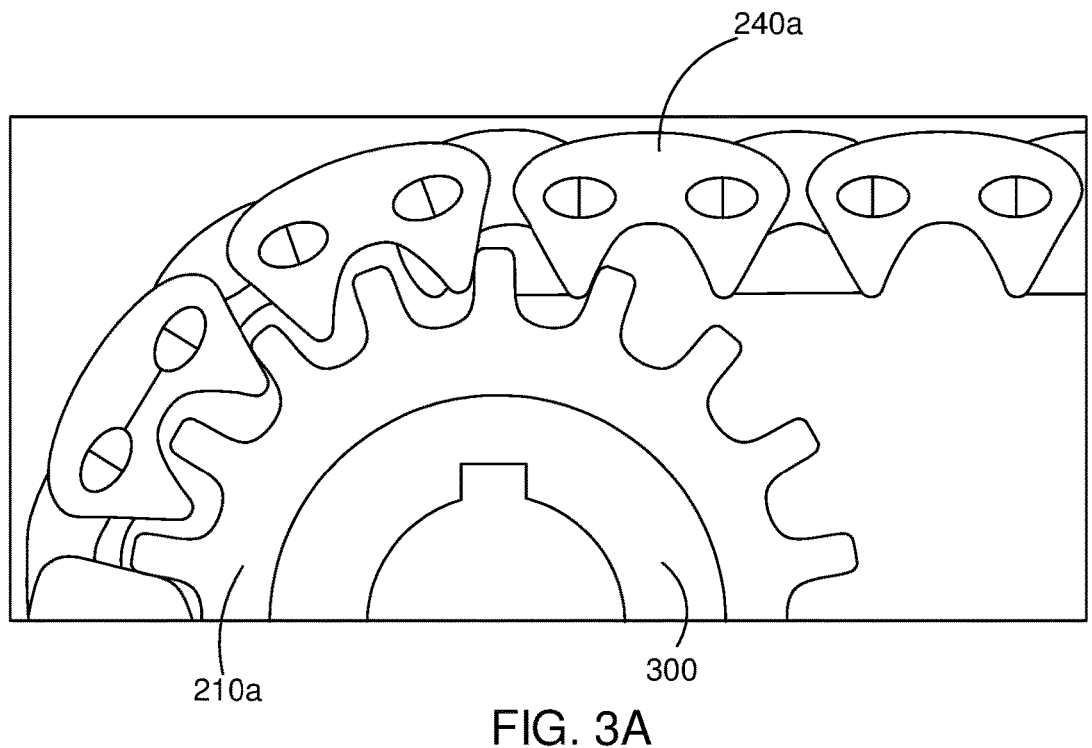
FIGS. 3A and 3B illustrate an exemplary chain and socket that may be deployed in accordance with an embodiment of the invention.
Figure 3B:
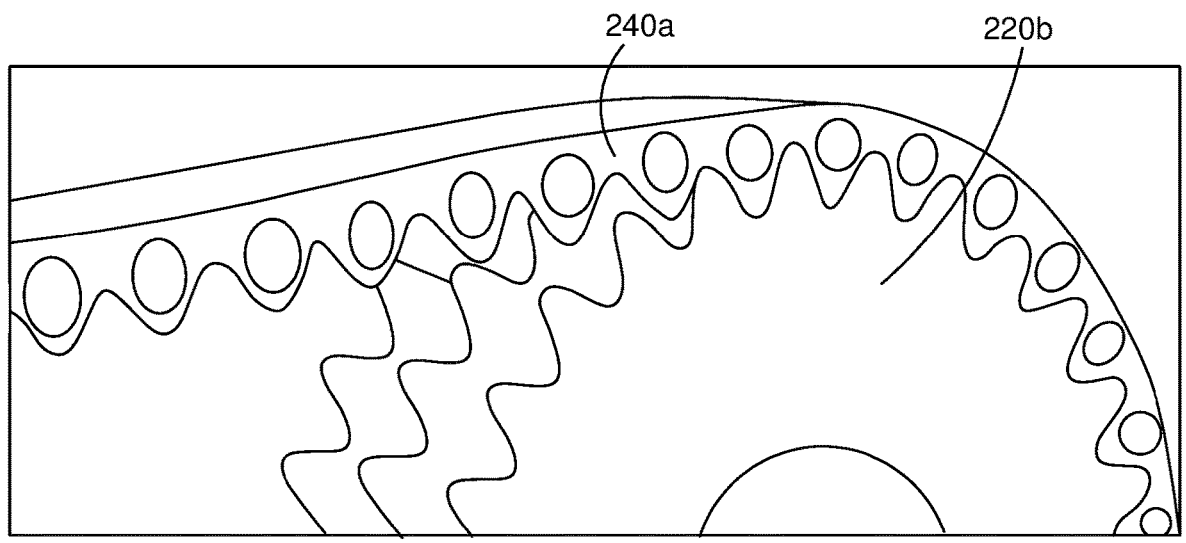

FIGS. 3A and 3B illustrate exemplary chain 240a and transfer socket 220b that may be deployed in accordance with an embodiment of the invention. Referring now to FIG. 3A, chain 240a is shown as an inverted tooth chain that interlocks with sprocket 210a as would be disposed on main shaft 145b (shown in FIGS. 2A and 2B) via, for example, a key disposed longitudinally on the shaft 145b mated to a shaft collar 300 that fixes the sprocket 210a to shaft 145b. An embodiment uses such a chain drive to transmit motion from the shaft 145b to the locking pin 235 (e.g., configured as a latch). In one embodiment, the chain tension may be minimal while the chain is in motion while the maximum chain tension occurs when the dolly frame is turning with a fully-loaded ULD. In such conditions, the latch and chain are stationary.

Chain sizing in low-speed lifting embodiments should be on the basis of tensile strength, and a factor of safety of 5 to 6 for the ultimate tensile load is appropriate; hence, a design factor of $n_d$=5.5 was used to size the chain in an embodiment. To find the chain tension, moments are summed about the latch rotation axis. Let r denote the moment arm of the centripetal reaction force about the latch axis; based on rough measurements, r=1.838 in. If the pitch diameter of the latch sprocket is Dp and the total tangential force supported by the chain(s), with the design factor $n_d$ applied, is $F_{chain}$, then $$F_{chain} = n_d \frac{rF}{D_P/2}.$$

Thus, if the ultimate tensile strength of a particular chain, $F_{UT}$, is known, then the number of chains required is estimated by rounding the ratio $F_{chain}/F_{UT}$ up to the nearest integer.

Based on rough measurements of the clearance between the latch rotation axis and the plane along the bottom of the containers (also referred to as the cargo deck or working area), a latch sprocket diameter may be approximately 2 inches in an embodiment. A preferred embodiment uses an inverted tooth chain as shown in FIGS. 3A and 3B. Although this type of chain is commonly used for power transmission at higher speeds, it would also work for this embodiment because it may have higher load ratings than standard roller chain. An embodiment deployed chain 240a and sprocket set as an Aventics KH040 chain (e.g., chain 240a) with a 15-tooth latch sprocket (e.g., sprocket 220b) and a 30-tooth drive sprocket (e.g., sprocket 210a). In one embodiment, two chains may be required for each locking pin/latch 235 given the chain has a higher ultimate tensile load rating.

Figure 4:
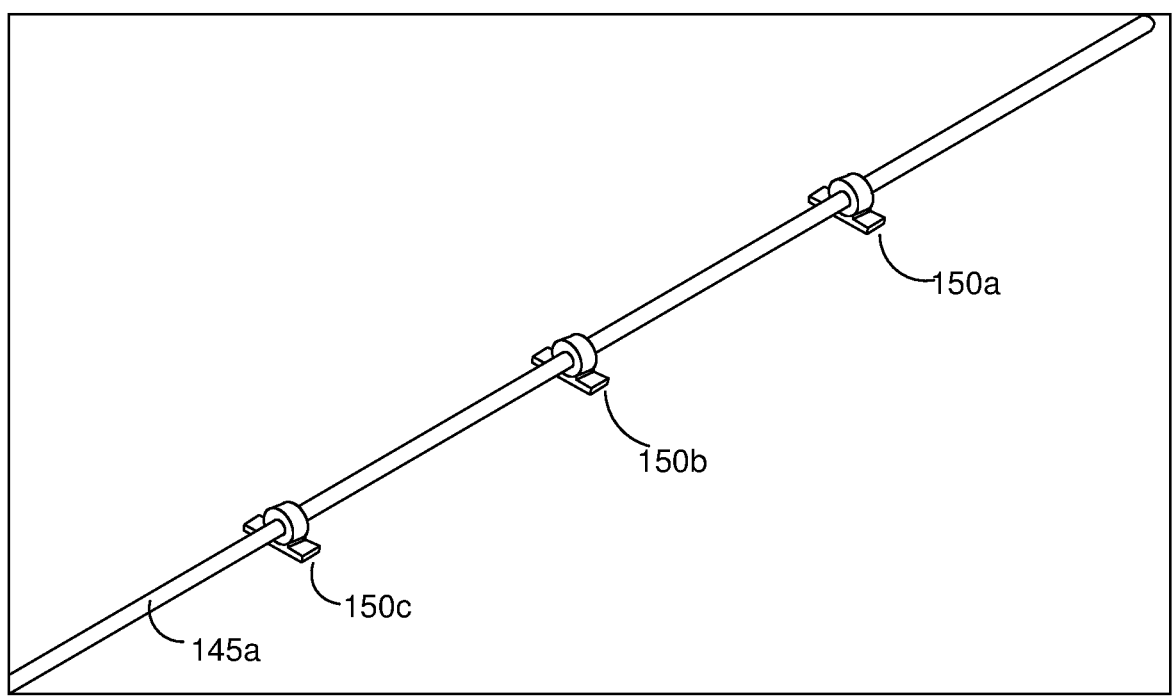
FIG. 4 is a diagram illustrating an exemplary main shaft and associated bearings that may be deployed in accordance with an embodiment of the invention.

FIG. 4 is a diagram illustrating exemplary main shaft 145a and associated pillow block bearings 150a-150c that may be deployed in accordance with an embodiment of the invention. The main shaft (e.g., shaft 145a) may be mounted to cross-member support rails 140a-140c via respective bearings 150a-150c so as to allow the shaft to carry the load between the sprockets (e.g., transfer sprockets shown in FIG. 2A similar to sprockets 210a-210b shown in FIG. 2B) and locking lever (e.g., lever 160a shown in FIG. 1C). An embodiment may use a 1 inch diameter case hardened keyed shaft 145a, which is keyed to prevent rotation between itself and the sprockets, and the sprockets are held in place axially by shaft collars 300 (shown in FIG. 3A). Embodiments may use one or more main shafts (e.g., shaft 145a) supported by pillow block bearings mounted to cross-members on the dolly frame. As shown in FIG. 3A, and the shaft may held in place axially by key and by shaft collars (such as collar 300) on both sides of the bearings. As shown in the embodiment of FIG. 2A, the main shafts may each rotate two locking pin/latches simultaneously, given the shafts run along the length of the dolly.

Figure 5:
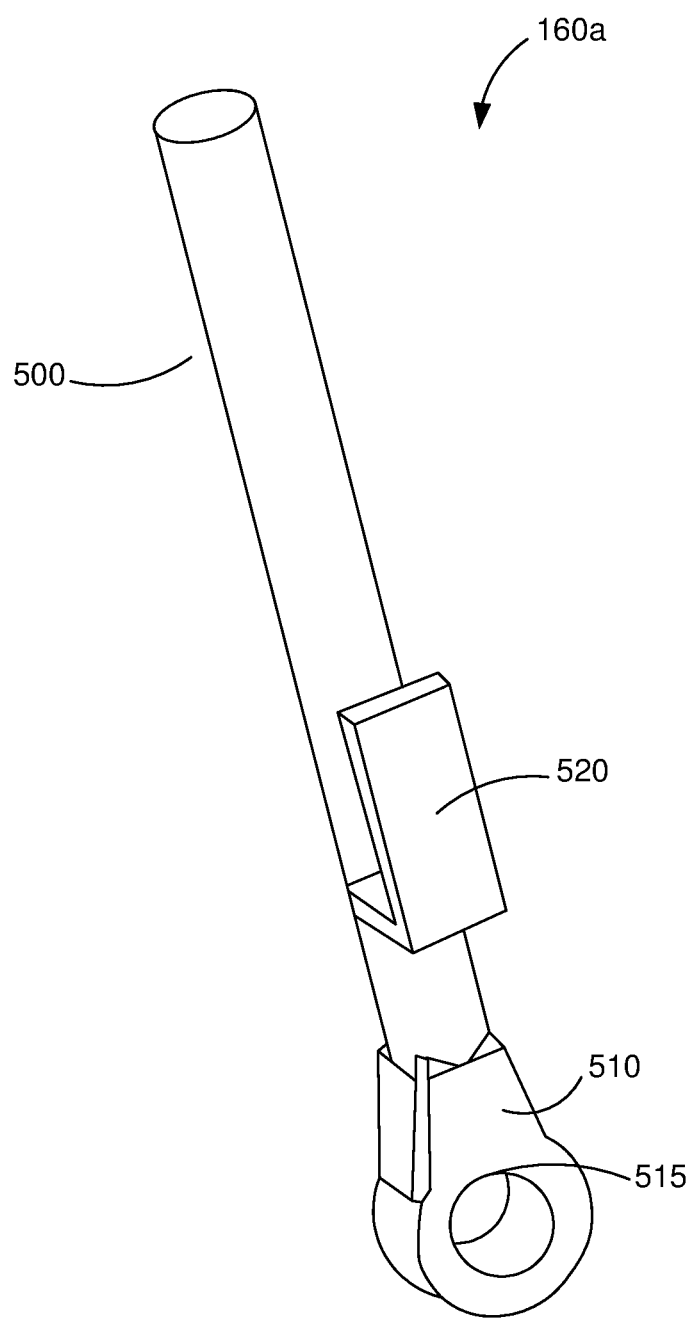
FIG. 5 is a diagram illustrating an exemplary lever that may be deployed in accordance with an embodiment of the invention.

FIG. 5 is a diagram illustrating an exemplary lever (e.g., levers 160a-160b) that may be deployed in accordance with an embodiment of the invention. Generally, an embodiment may locate the lever or levers somewhere where it/they could not be damaged by the high impact environment the dollies operate in—e.g., placing levers 160a-160b inside the frame 100, but not in the working area 135 where the containers could damage the levers. As shown in FIG. 5, exemplary lever 160a is illustrated showing a handle portion 500 opposite a carriage portion 510 seated onto and in responsive communication with a main shaft (such as main shaft 145a with key 515 that engages the carriage portion 510). Pivoting the handle portion 500 causes the carriage portion 510 to rotate about a longitudinal axis of the main shaft and causes rotation of the main shaft, and pivoting so that the handle portion can be locked into an open or closed position. The handle portion 500 may be locked when it is moved from a main channel into a side channel where the handle portion may deploy a flange 520 to hold the handle in place in the side channel. An embodiment may have the handle portion 500 being held in a side channel slot on the dolly's frame by a spring (not shown) that is connected to the handle and the carriage and biased the handle into a desired position (e.g., holding the handle portion 500 in the side channel slot to keep the handle in the closed position).

An embodiment may implement the handle portion 500 with a hand grip that moves between a first position and a second position. Movement of the lever's hand grip (handle portion 500 on lever 160b) to the first position causes the locking pin (e.g., locking pin 235) to move to an open position while movement of the hand grip to the second position causes the locking pin to move to a closed position. Such an open position may represent a released configuration of the locking pin 235 and the cargo as supported on working area 135 and the closed position may represent a secure configuration of the locking pin 235 and the cargo as supported on working area 135 of dolly frame 100/200.

Figure 6A:
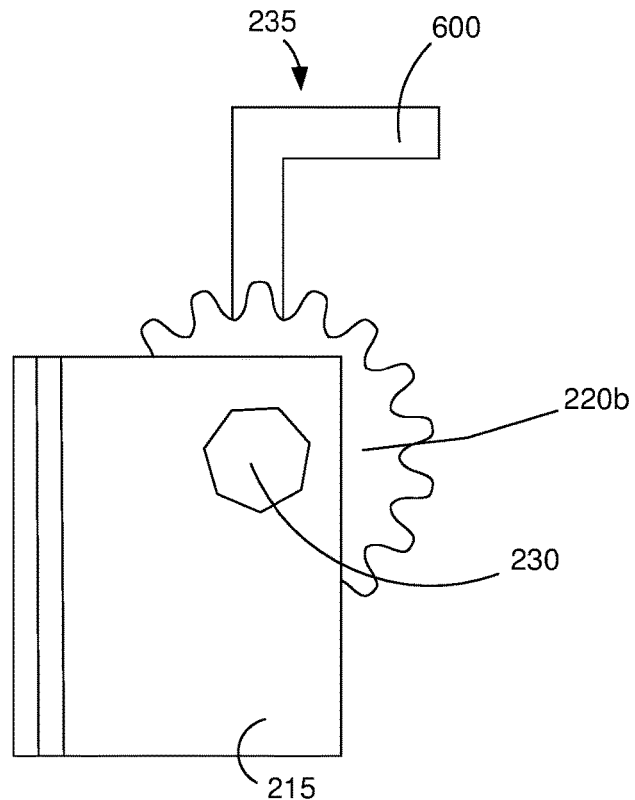
FIG. 6A is a diagram illustrating an end view of an exemplary secondary shaft, sets of transfer sockets on the secondary shaft, and an exemplary angled latch configured locking pin that may be deployed in accordance with an embodiment of the invention.
Figure 6B:
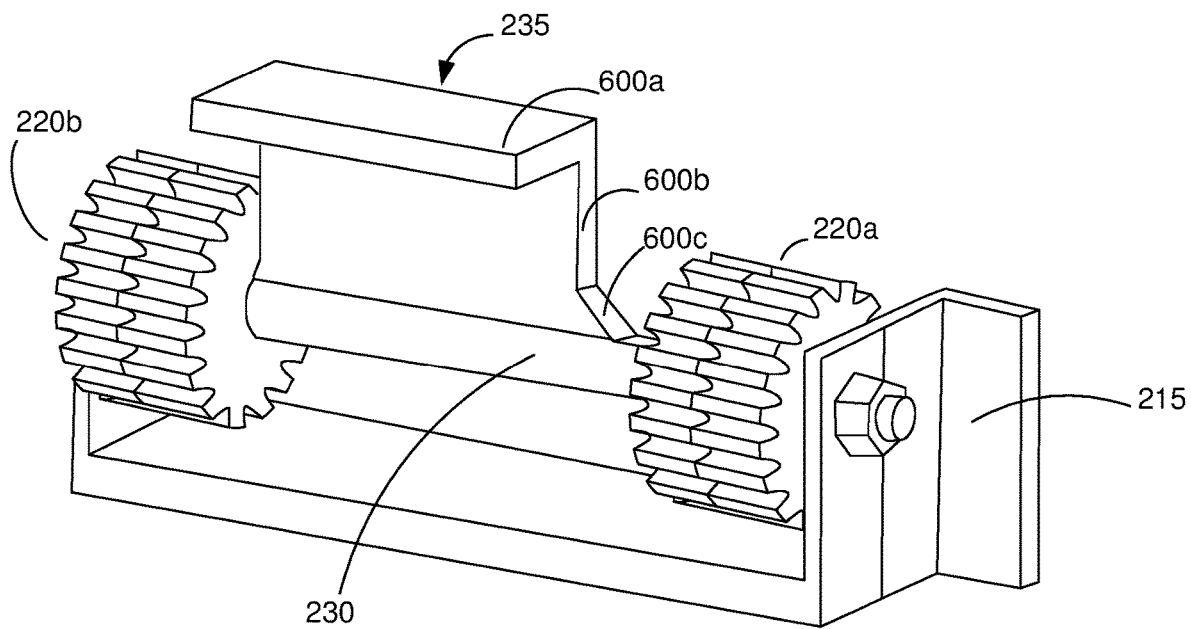
FIG. 6B is a perspective diagram illustrating the exemplary secondary shaft, sets of transfer sockets on the secondary shaft, and exemplary angled latch configured locking pin of FIG. 6A that may be deployed in accordance with an embodiment of the invention.

FIGS. 6A and 6B provide further details of an exemplary secondary shaft, sets of transfer sockets on the secondary shaft, and an exemplary angled latch configured locking pin that may be deployed in accordance with an embodiment of the invention. FIG. 6A illustrates such details with an end-view, while FIG. 6B illustrates more of these details in perspective or isometric view. Referring now to FIG. 6A, exemplary secondary shaft 230 mounted on bracket 215, transfer sockets 220b on the secondary shaft 230, and exemplary locking pin 235 are shown where the locking pin that rotates relative to secondary shaft 230 is an angled latch 600. Referring now to FIG. 6B, angled latch 600 is shown in more detail with a radial latch support 600b attached to and extending from secondary shaft 230 and with a locking latch 600a in an angled relationship to the radial latch support 600b.

In this configuration, the angled latch 600 of the locking pin 235 may be driven in an embodiment (via the lever, main shaft, sprockets, and chain) to rotate towards the cargo. As such, the angled latch 600 securely interfaces with the cargo (e.g., an attachment point on the base of the cargo) to secure the cargo on the working area 135 when the locking pin 235 is moved to the closed position by pivoting the handle portion 500 in a first direction. For example, the angled latch 600 (at least the locking latch 600a) of the locking pin 235 rotates to at least partially extend above the cargo deck (working area 135) to securely interface with the attachment point on the cargo when the locking pin 235 is moved to the closed position by pivoting the handle portion 500 of the lever in the first direction. In like manner, the angled latch of the locking pin may rotate away from the cargo's attachment point to release the cargo when the locking pin is moved to the open position by pivoting the lever's handle portion in a second direction (e.g., where the angled latch of the locking pin rotates to retract below the cargo deck and away from the interface with the cargo's attachment point when the locking pin is moved to the open position by pivoting the handle portion in the second direction).

As shown in FIG. 2A, an embodiment may deploy multiple lever-actuated locking pin assemblies associated with different edges of the mobile dolly frame 200. One of the lever-actuated locking pin assemblies may be associated with a first edge of the mobile dolly frame (e.g., side edge 115 of dolly frame 200) while a second lever-actuated locking pin assembly may be associated with a second edge of the mobile dolly frame (e.g., side edge 120 of dolly frame 200). These different lever-actuated locking pin assemblies may include their own respective lever, main shaft, secondary shaft, sets of transfer sprockets on the main and secondary shafts, chain that couples the different transfer sprockets, and locking pin (actuated angled latch). Those skilled in the art will further appreciate that further embodiments may use a single lever to actuate all such coupled locking pins on the dolly frame and that other embodiments may use particular levers coupled to selective locking pins (or groups of locking pins).

Articulating Link Systems

Another embodiment focuses on simultaneously locking and unlocking one or more pins while the logistics operator is stationary using various types of articulating links. In this type of embodiment, the links may be one or more linkages that can be responsively articulated to travel along with the inside area defined by the dolly frame. As the link moves, a portion of the link responsively activates a sub-pin locking design and/or a spring-collet rotation system to remotely deploy one or more cargo locking pins. Exemplary embodiments related to such an articulating link type of activation of a cargo locking pin are shown in FIGS. 7-22 as explained in more detail below.

Figure 7:
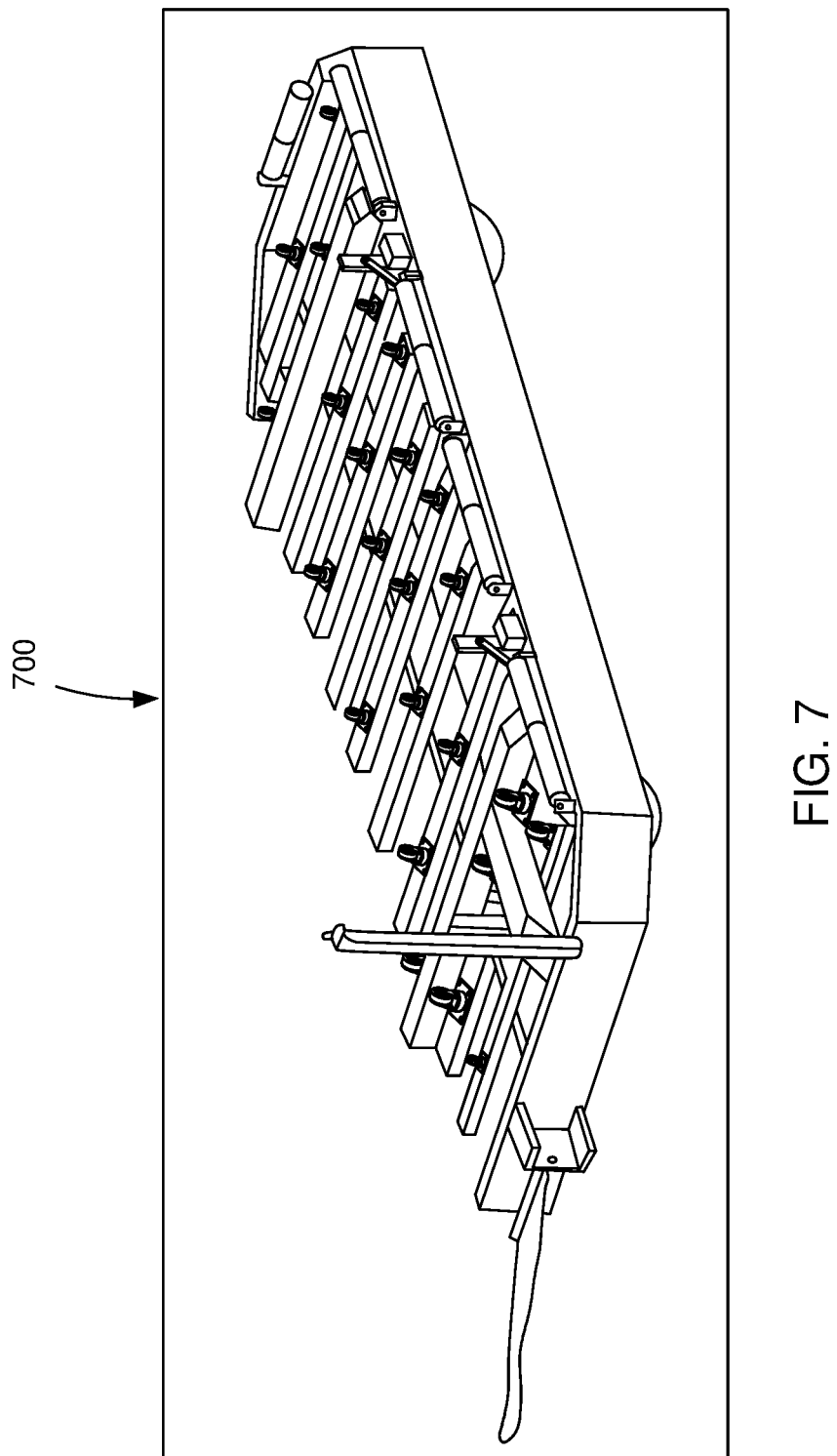
FIG. 7 is a diagram of another exemplary mobile dolly frame that uses one or more articulating links to remotely deploy cargo locking pins in accordance with an embodiment of the invention.
Figure 8:
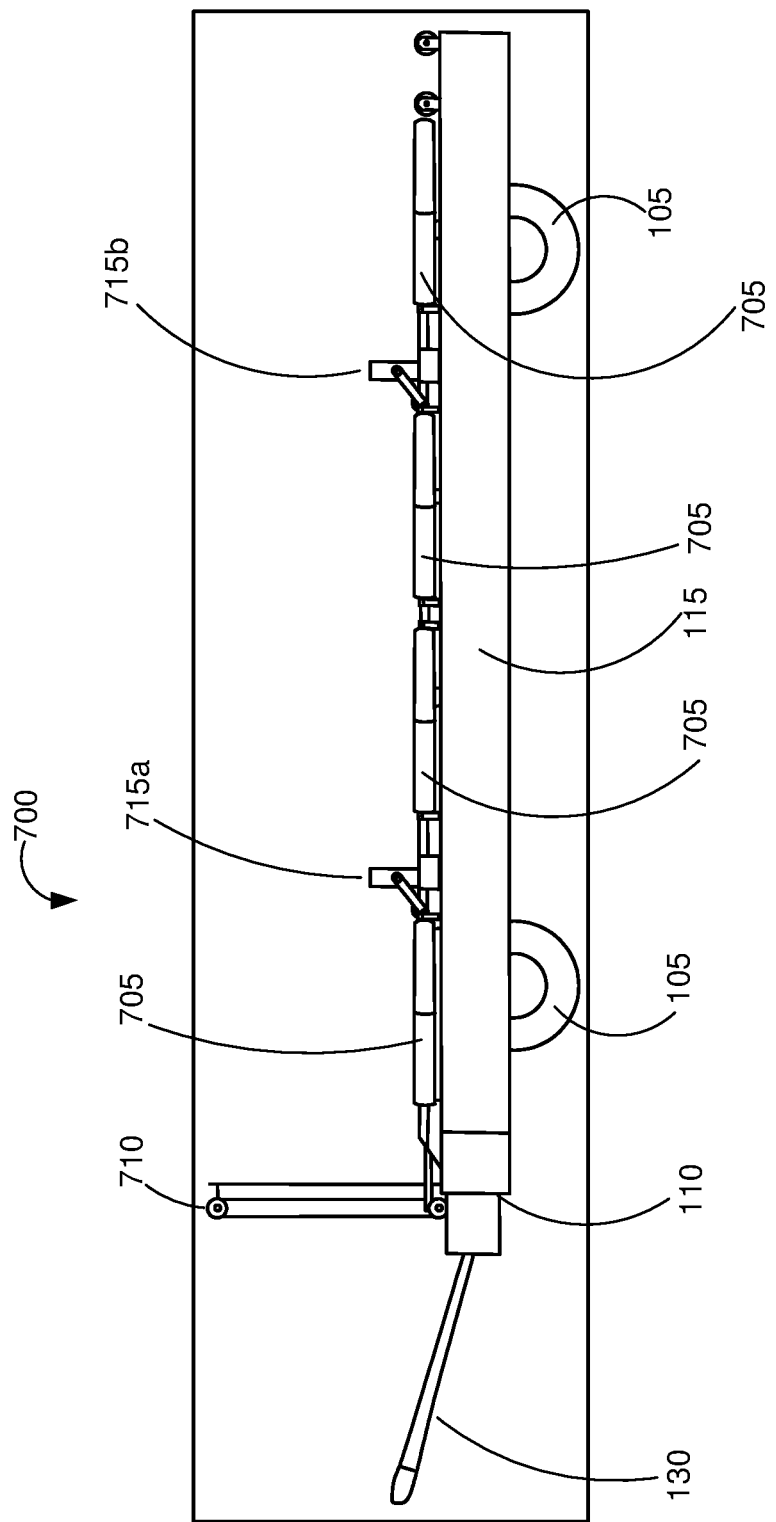
FIG. 8 is a side-view diagram of the exemplary mobile dolly frame of FIG. 7 in accordance with an embodiment of the invention.
Figure 9:
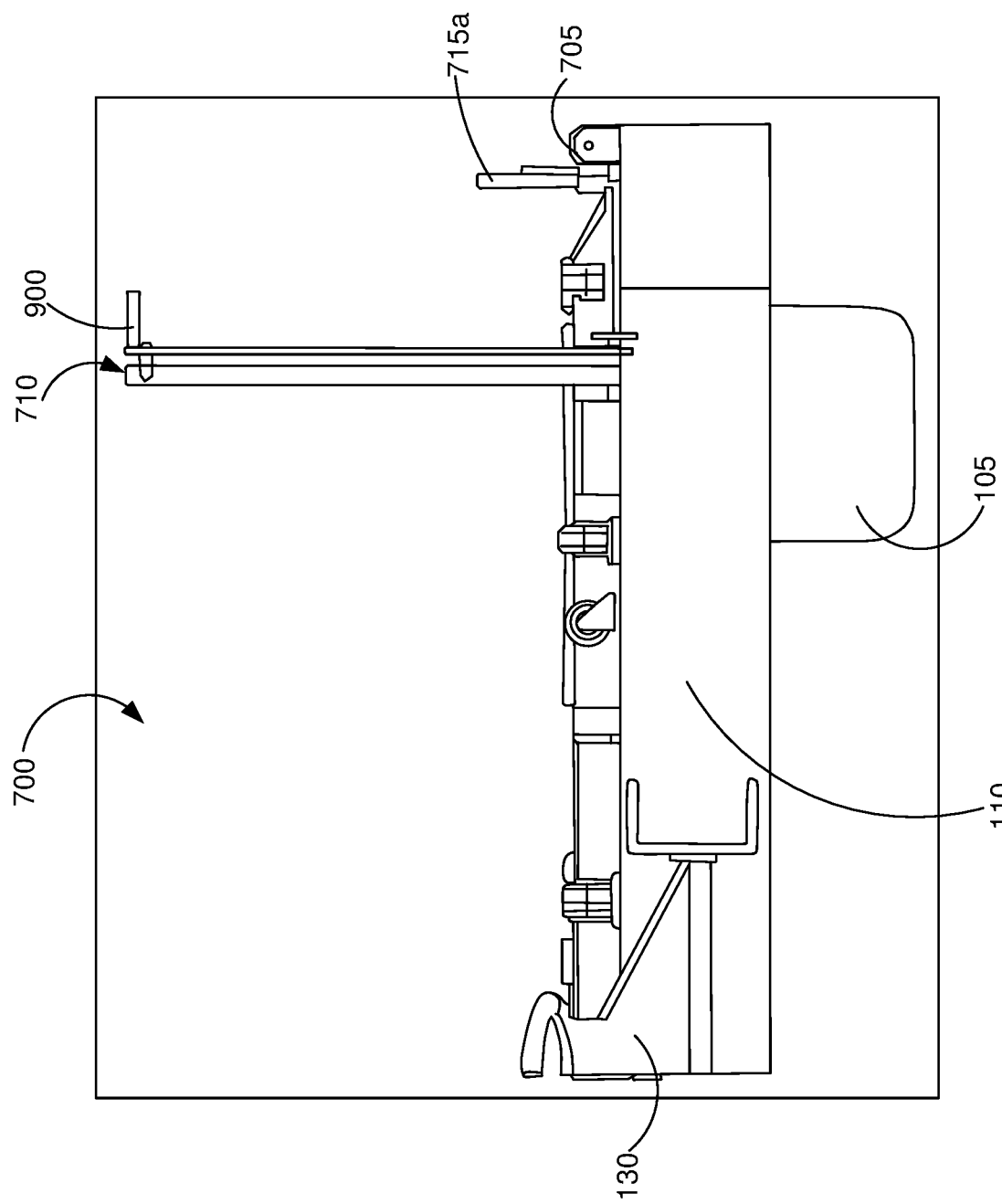
FIG. 9 is a front-view diagram of the exemplary mobile dolly frame of FIG. 7 in accordance with an embodiment of the invention.

FIGS. 7-9 are diagrams illustrating different views of another exemplary mobile dolly frame on wheels that use one or more articulating links to remotely deploy cargo locking pins in accordance with an embodiment of the invention. Referring now to FIG. 7, exemplary mobile dolly frame 700 is illustrated in perspective as a version of frame 100 shown in FIG. 1A as a rail based frame with front, rear, and side edges and a tow bar in the front. Frame 700 is shown in FIG. 7 with cross-member support rails running across frame 700 and with multiple casters and rollers used to facilitate movement of cargo supported on the working area (cargo deck) of frame 700.

FIG. 8 is a side-view diagram of the exemplary mobile dolly frame of FIG. 7 in accordance with an embodiment of the invention, and illustrates exemplary mobile dolly frame 700 having wheels 105, front edge 110, side edge 115, and tow bar similar to that shown for frame 100 in FIG. 1A. FIG. 8 further illustrates cargo rollers 705 disposed relative to a side edge (e.g., edge 115) of frame 700 to facilitate ease of movement and transfer of cargo onto and off of frame 700. Frame 700 is further illustrated with an operator station (e.g., a manually operated station involving an exemplary chain and sprocket assembly 710 having a handle. FIG. 9 is a front-view diagram of the exemplary mobile dolly frame 700 of FIG. 7 in accordance with an embodiment of the invention, and shows details of exemplary chain and sprocket assembly 710 that articulates a link that travels parallel within spaced defined by dolly frame 700. As shown in FIG. 9, exemplary chain and sprocket assembly 710 disposed relative to the front edge 110 of dolly frame 700 has handle 900. The operator may be located remote from side edge 115 (e.g., at the front edge 110 in this embodiment) and engage handle 900 of assembly 710 to cause movement of locking pins 715a, 715b via articulated movement of linkages disposed on the frame 700 in response to handle movement. In this manner, handle 900 is mechanically linked to one end of the chain and sprocket assembly whereby rotational movement of the handle 900 responsively causes the chain and sprocket assembly to rotate and articulate a longitudinal link at the other end of the chain and sprocket assembly. The longitudinal link, as discussed in more detail below, moves within linkage guides and causes movement of one or more locking pins (e.g., locking pins 715a, 715b).

In more detail, the operator station of such an embodiment may be disposed on or at the front edge or rear edge of dolly frame 700. The operator station may be implemented with manually operated exemplary chain and sprocket assembly 710, which may be manually operated via handle 900 where a chain spins the sprockets/pinion of the assembly, which results in linear rack motion (e.g., articulation of the link or linkage) that moves or articulates linkages downward to rotate pins 90 degrees towards the front side of the dolly (e.g., from a raised position that secures cargo on dolly frame 700 to a withdrawn position that releases the cargo allowing the cargo to be loaded/unloaded/moved relative to the dolly frame 700). Other embodiments may implement the operator station with actuated pistons, hydraulic lines, or further actuating structure responsive to input from an operator that causes movement of the linkages disposed on the frame 700 to then move the locking pins between different positions relative to cargo on frame 700.

Figure 10:
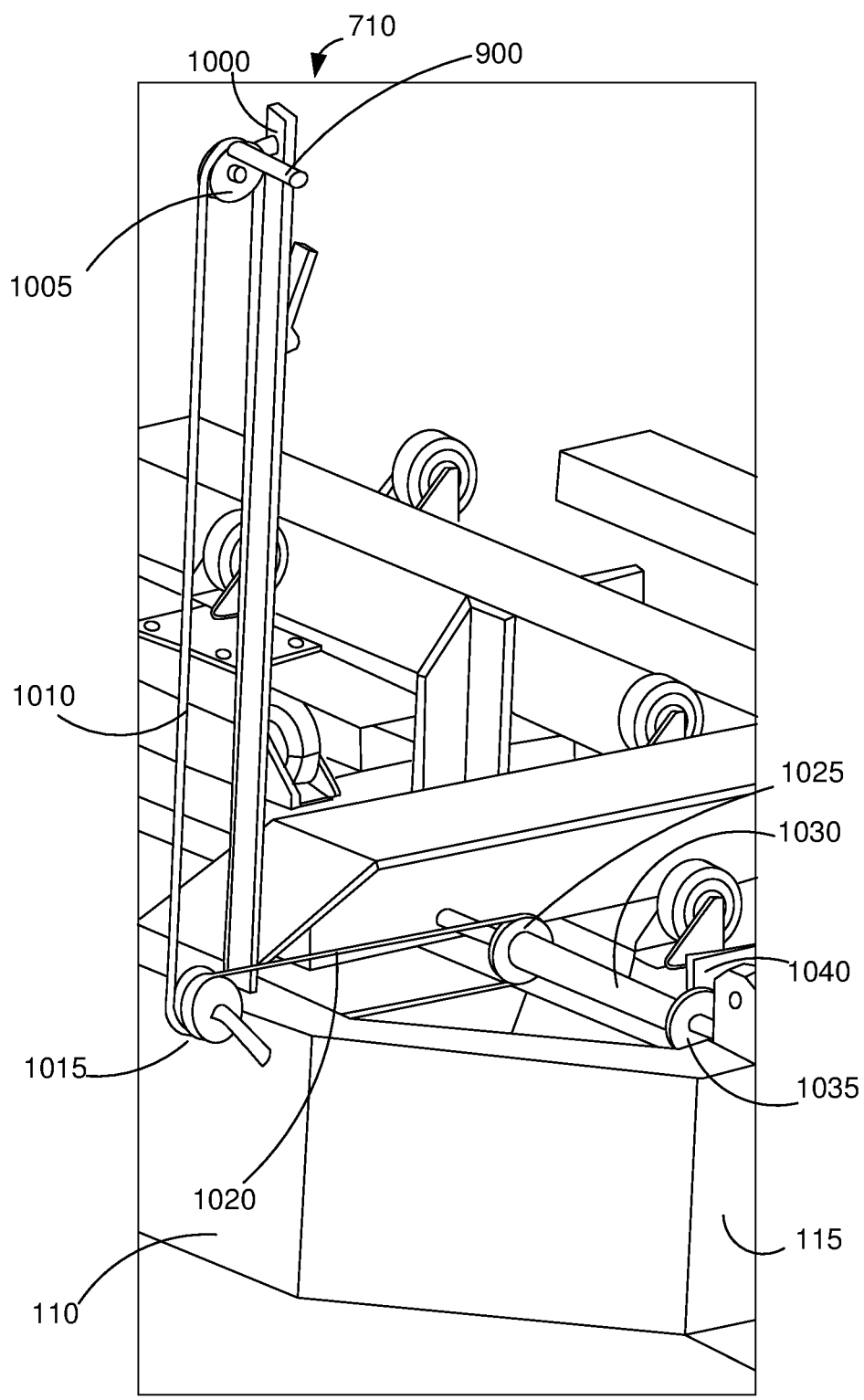
FIG. 10 is a diagram of an exemplary operator station using an exemplary chain and sprocket assembly on the exemplary mobile dolly frame of FIG. 7 in accordance with an embodiment of the invention.

FIG. 10 provides further details of exemplary chain and sprocket assembly 710. Referring now to FIG. 10, exemplary chain and sprocket assembly 710 is shown having support member 1000 fixed to the front edge 110 of dolly frame 700, sprocket 1005 rotatably mounted to an upper end of support member 1000, handle 900 responsively mounted to a side of sprocket 1005, and chain 1010 disposed along member 1000 with a loop of chain 1010 being disposed around sprocket 1005. In this way, operator movement of the handle 900 causes rotation of sprocket 1005 and chain 1010. At the front edge 110 of dolly frame 700, a set of sprockets 1015 are fixed to a rotating axle mounted to the front edge 110. One from that set of sprockets 1015 accepts chain 1010 so that rotation of that sprocket due to movement of chain 1010 causes rotation of the other sprocket in set 1015. A second chain 1020 is disposed about that other sprocket in set 1015 and also around a third sprocket 1025 fixed to one end of a rotatable shaft 1030 disposed within the area defined by the frame 700 and mounted to one of the frame's cross-member support rails. The other end of the shaft 1030 is coupled to and in contact with longitudinal link 1040 via a pinion gear 1035 that mates with gearing on the longitudinal link 1040. In this configuration of such an exemplary chain and sprocket assembly that can articulate the longitudinal link 1040, movement of sprocket 1005 by the handle 900 causes movement of chain 1010, which causes movement of sprockets 1015, which causes movement of the second chain 1020, which causes movement of the third sprocket 1025 and shaft 1030 as well as responsive articulation of the longitudinal link 1040 via the pinion gear 1035 on shaft 1030.

Figure 11:
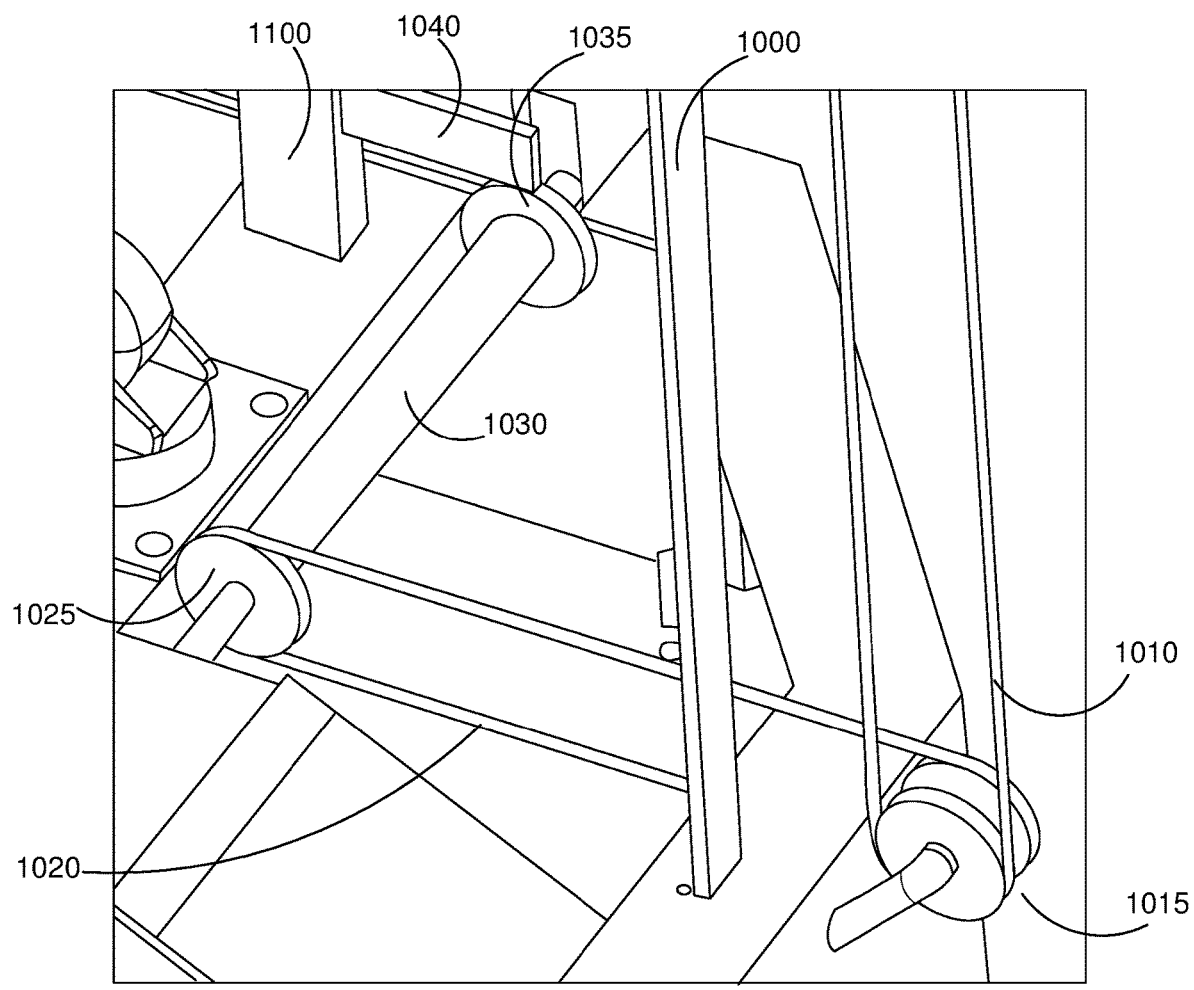
FIG. 11 is a diagram with further details on the exemplary operator station of the exemplary mobile dolly frame of FIGS. 7 and 10 in accordance with an embodiment of the invention.
Figure 12:
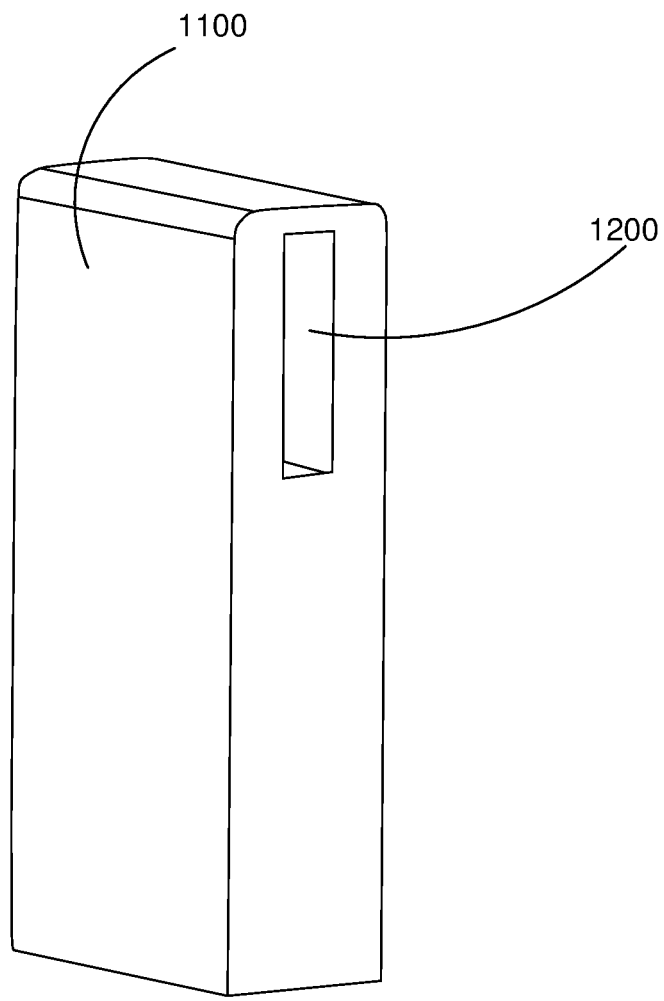
FIG. 12 is a diagram of an exemplary linkage guide used on the exemplary mobile dolly frame of FIG. 7 in accordance with an embodiment of the invention.

FIG. 11 is a diagram with further details on the exemplary operator station of the exemplary mobile dolly frame of FIGS. 7 and 10 in accordance with an embodiment of the invention. FIG. 11 shows a different perspective of parts of such an exemplary operator station and chain and sprocket assembly 710 where pinion gear 1035 is shown in more detail as it contacts longitudinal link 1040, which is held by linkage guide 1100. FIG. 12 shows exemplary linkage guide 1100 having an linkage aperture 1200 through which the longitudinal link 1040 may be inserted so that when the linkage guide 1100 is mounted to frame 700, longitudinal link 1040 may move forward and backward (in response to movement of pinion gear 1035) but be held in place relative to the frame 700 otherwise. In other words, the linkage guide 1100 supports the link 1040 as it is articulated along the length of the dolly frame 700 in response to actuation of the chain and sprocket assembly on the front of the frame. Those skilled in the art will appreciate that multiple linkage guides 1100 may be disposed in an embodiment along the dolly frame 700 to hold the longitudinal link 1040 in an orientation that extends along a length of the dolly frame 700 as the longitudinal link 1040 articulates along the length of the dolly frame 700.

Figure 13:
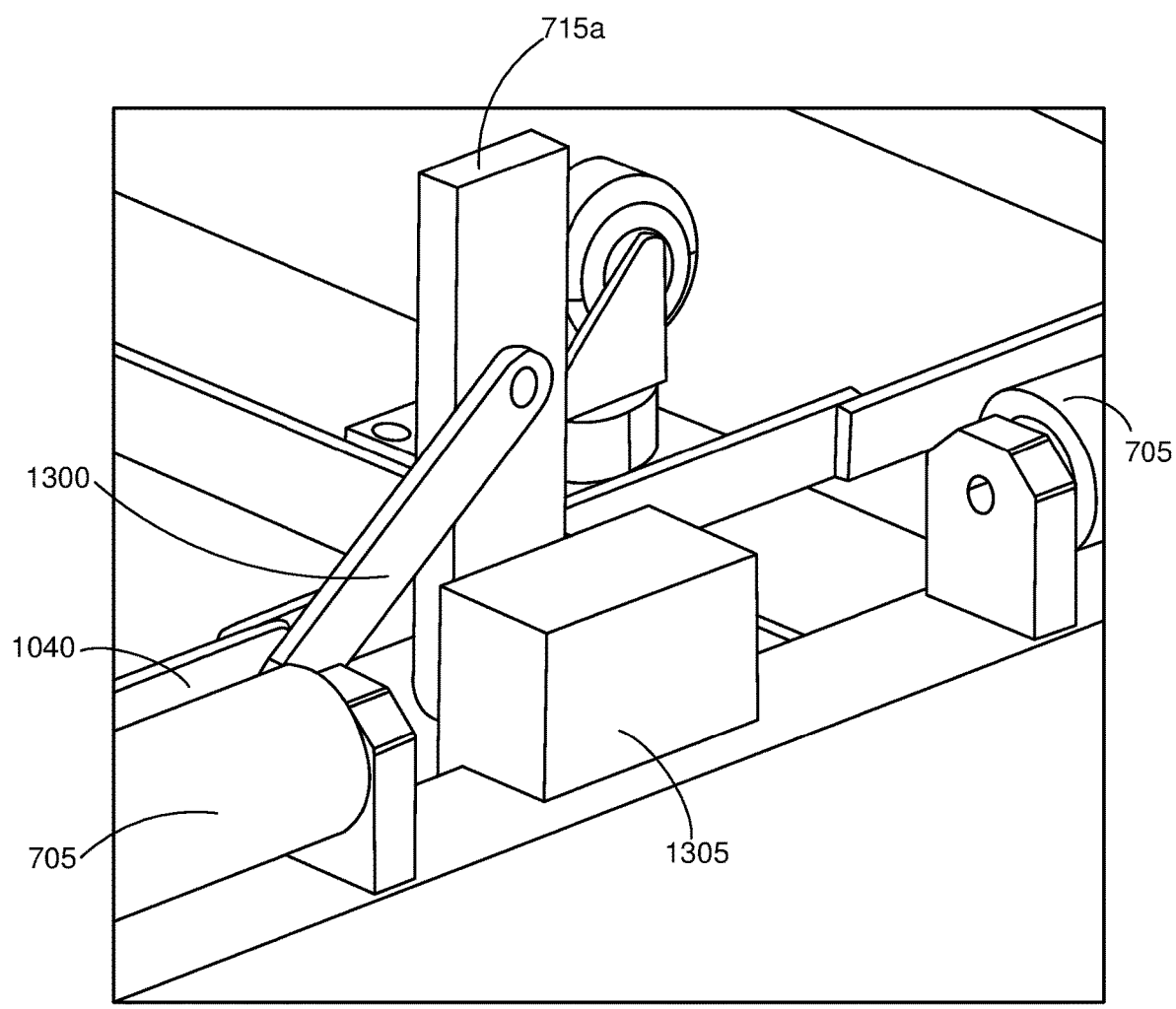
FIG. 13 is a diagram of an assembly illustrating an exemplary longitudinal link, pin linkage, and locking pin on the exemplary mobile dolly frame of FIG. 7 in accordance with an embodiment of the invention.
Figure 14:
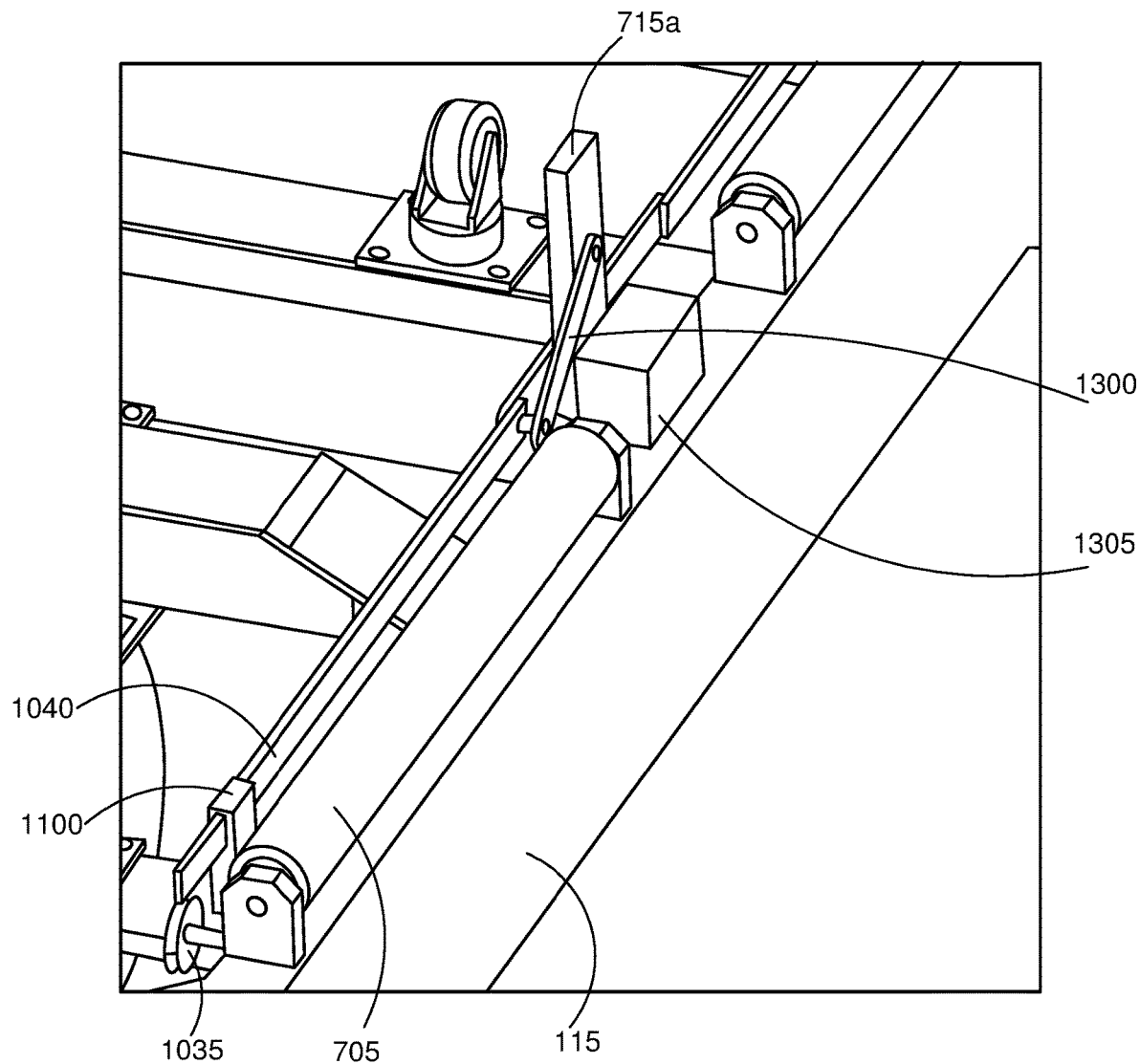
FIG. 14 is a further diagram of an assembly illustrating the exemplary longitudinal link, pin linkage, and locking pin of FIG. 13 as articulated by a portion of the exemplary chain and sprocket assembly on the exemplary mobile dolly frame of FIG. 7 in accordance with an embodiment of the invention.
Figure 15:
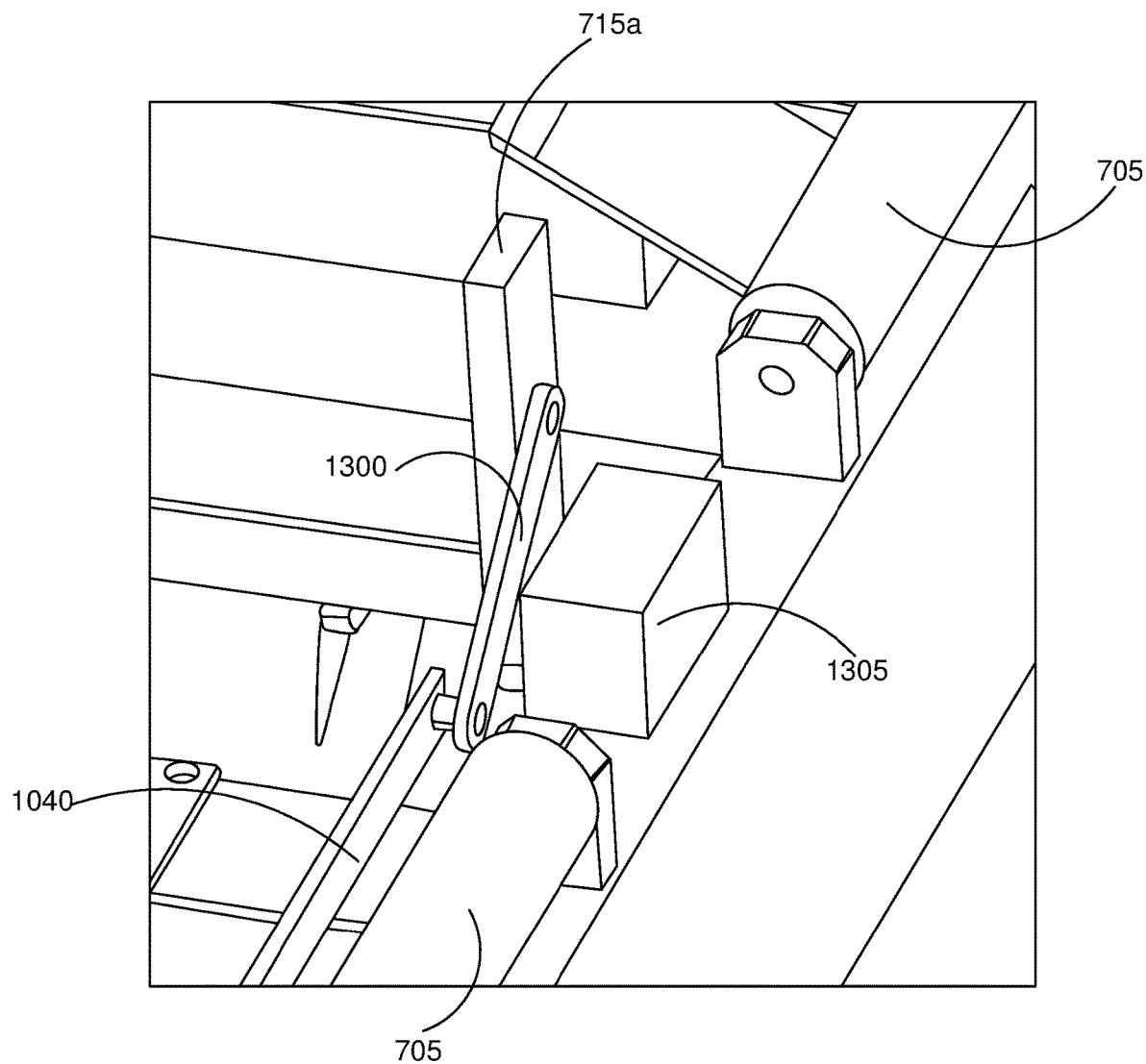
FIG. 15 is a further diagram of an assembly illustrating an exemplary longitudinal link, pin linkage, and locking pin on the exemplary mobile dolly frame of FIG. 7 in accordance with an embodiment of the invention.

FIGS. 13-15 provide different views of and further details about how an exemplary longitudinal link 1040 may extend along the length of the dolly frame 700 and articulate one or more pin linkages and locking pins in embodiments. For exemplar, as shown in FIG. 13, locking pin 715a is shown with an end rotatably fixed to frame 700 via a locking pin support base 1305 that acts as a locking pin pivot point where locking pin 715a can rotate up in response to articulation of longitudinal link 1040 and its component linkages (e.g., pin linkage 1300). Pin linkage 1300 has a first end attached to the longitudinal link 1040 and a second end rotatably attached to the middle portion of the locking pin 715a. FIGS. 14 and 15 are further diagrams an assembly illustrating the exemplary longitudinal link 1040, pin linkage 1300, and locking pin 715a of FIG. 13 as articulated by a portion of the exemplary chain and sprocket assembly on the exemplary mobile dolly frame of FIG. 7. While the example shown in FIG. 14 illustrates exemplary locking pin 715a being a locking pin articulated by longitudinal link 1040 and pin linkage 1300 where the longitudinal link 1040 extend beyond support base 1305 to another locking pin (e.g., locking pin 715b), the example shown in FIG. 15 illustrates an example where locking pin 715a may be a sole locking pin articulated by the longitudinal link 1040 and pin linkage 1300.

In such embodiments, movement of handle 900 as part of the operator station allows for remote actuation of one or more locking pins to secure or release cargo as disposed on the dolly frame 700. In more detail, movement of handle 900 in a first rotational direction causes the second end of the locking pin (e.g., locking pin 715a, 715b) to extend above the dolly frame 700 from the withdrawn position to the raised position representing a secure configuration of the locking pin and the cargo. As such, the locking pin may rotate towards an attachment point on the cargo to securely interface with the attachment point on the cargo when the locking pin is moved to the raised position by moving the handle 900 in the first rotational direction. In another example, movement of the handle 900 in a second rotational direction may cause the second end of the locking pin (e.g., a distal end of locking pin 715a, 715b that has been extended above the working area or deck of dolly frame 700) to retract from the raised position to the withdrawn position to release the cargo. As such, the locking pin may rotate away from an attachment point on the cargo to release the cargo when the locking pin is moved to the withdrawn position by moving the handle 900 in the second rotational direction.

Figure 16:
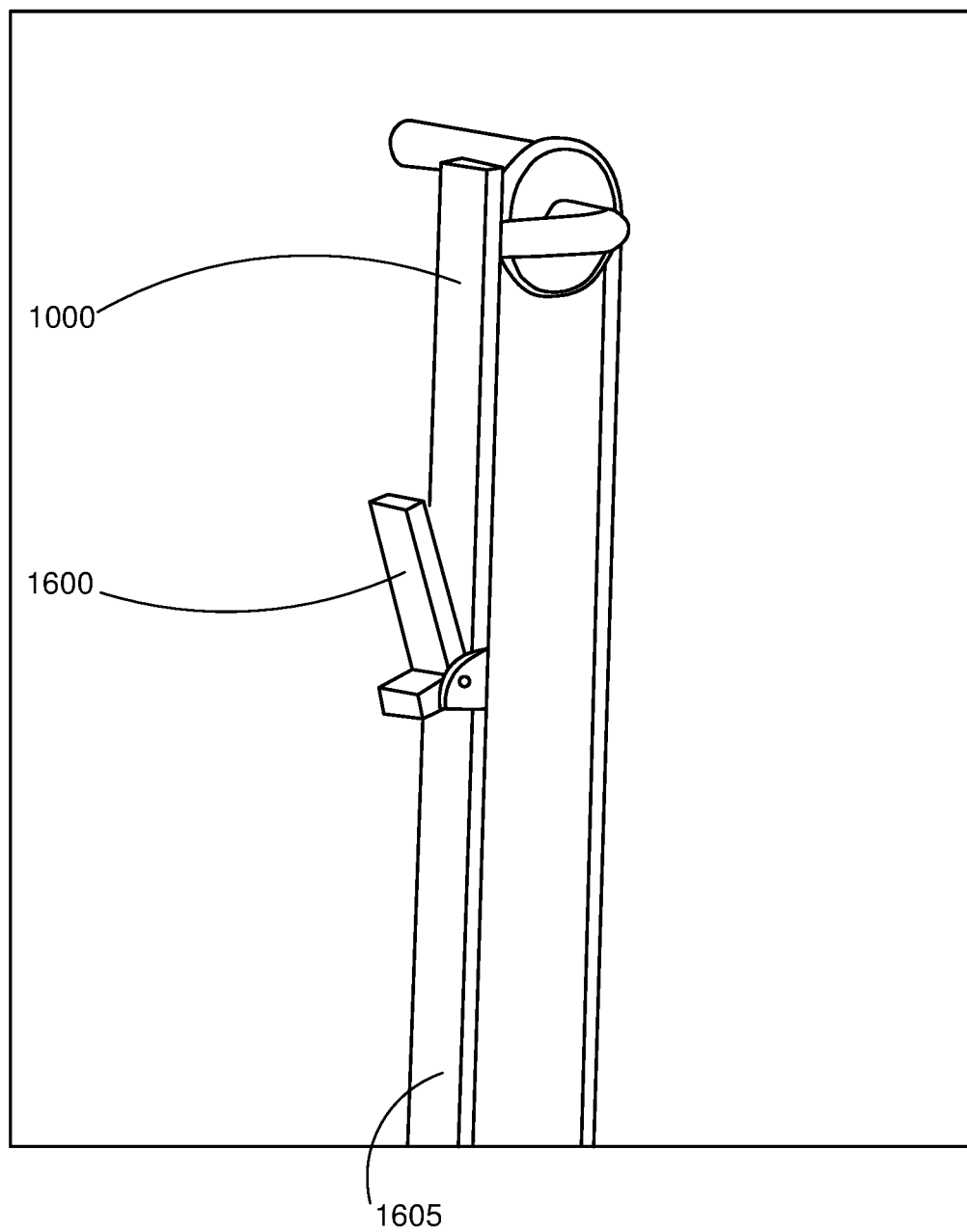
FIG. 16 is a diagram of an exemplary support member having a locking lever as part of the exemplary chain and sprocket assembly on the exemplary mobile dolly frame of FIG. 7 in accordance with an embodiment of the invention.
Figure 17:
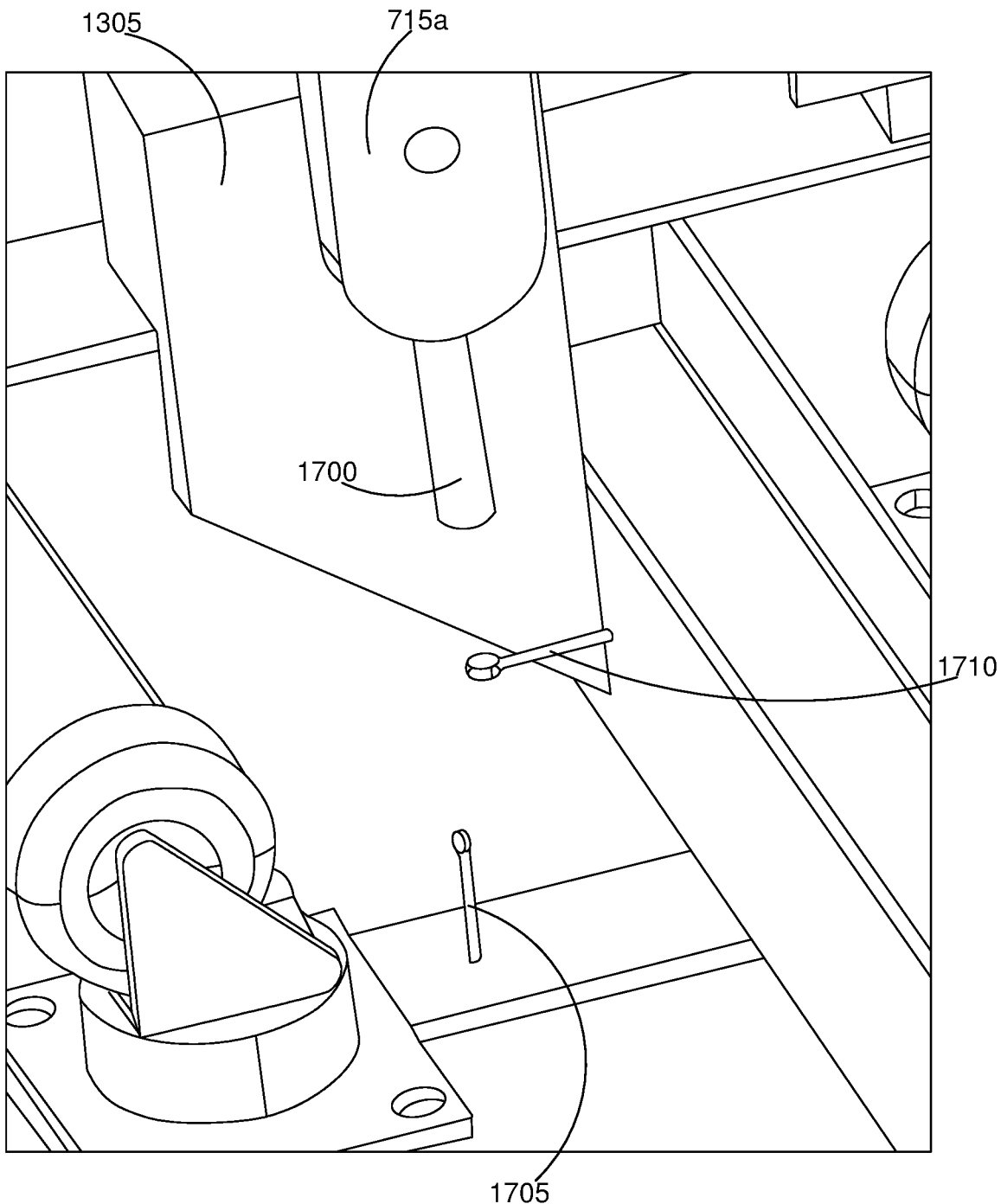
FIG. 17 is a diagram of an exemplary pin lock as disposed on the exemplary mobile dolly frame of FIG. 7 in accordance with an embodiment of the invention.
Figure 18:
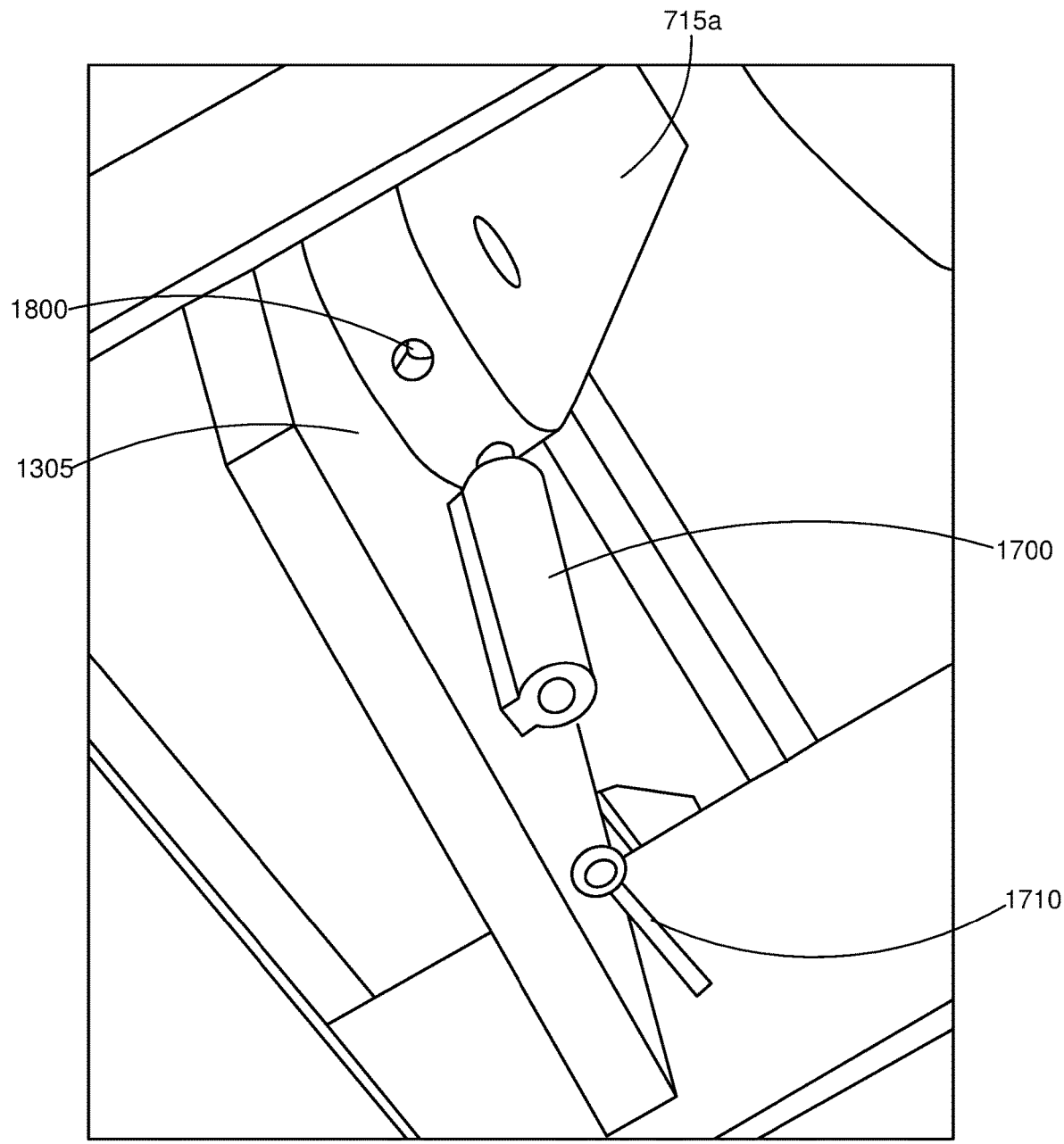
FIG. 18 is a diagram of the exemplary pin lock of FIG. 17 illustrating how it can mate to a pin lock depression on the locking pin as disposed on the exemplary mobile dolly frame of FIG. 7 in accordance with an embodiment of the invention.

FIGS. 16-18 illustrate an exemplary locking mechanism that may keep the locking pins (e.g., locking pins 715a, 715b) in a particular configuration/position (such as in the raised position so as to help secure the cargo) with a trigger actuated pin release. In more detail, FIG. 16 is a diagram of exemplary support member 1000 having an exemplary locking lever 1600 as part of the exemplary chain and sprocket assembly 710 on the exemplary mobile dolly frame 700 of FIG. 7 in accordance with an embodiment of the invention. Exemplary locking lever 1600 is shown coupled to support member 1000 where a brake cable (not shown) may be attached and fed through cable guides (e.g., guide 1605) from the operator station and routed to a sub-pin (also referred to as a pin lock). FIG. 17 is a diagram of an exemplary pin lock 1700 as disposed on the exemplary mobile dolly frame 700 of FIG. 7 in accordance with an embodiment of the invention. Referring now to FIG. 17, exemplary pin lock 1700 is shown disposed on locking pin support base 1305 with cable guides 1705, 1710 that route the brake cable from the operator station to pin lock 1700. FIG. 18 is a diagram of exemplary pin lock 1700 of FIG. 17 from below illustrating how exemplary pin lock 1700 can mate to a pin lock depression 1800 on locking pin 715a as disposed on the exemplary mobile dolly frame of FIG. 7 in accordance with an embodiment of the invention. Referring now to FIG. 18, exemplary pin lock 1700 may be implemented with a sleeve fixed to locking pin support base 1305, and a spring-biased sub pin 1805 that moves within the sleeve in response to movement of the brake cable attached to a bottom part of the sub pin 1805 (as articulated by the locking lever 1600 through the cable guides). Those skilled in the art will appreciate that when locking pin 715a (as shown in FIG. 18) is moved to the raised position, the spring biased sub pin 1805 of pin lock 1700 is biased into the pin lock depression 1800 to secure locking pin 715a in the raised position. But when locking lever 1600 is depressed, such lever movement causes retraction of the sub pin 1805 from the pin lock depression 1800 to release the locking pin 715a and allow locking pin 715a to be moved via articulation of longitudinal link 1040 to the withdrawn position. In this way, the operator may control a triggered release of the sub-pin 1805, which selectively unlocks the cargo locking pins (e.g., locking pin 715a) that may be articulated to protrude from the cargo dolly's deck. Further embodiments may have the same brake cable triggering release of multiple locking pins (e.g., locking pins 715a, 715b) at the same time for a coordinated release of those pins from their respective raised positions.

Figure 19A:
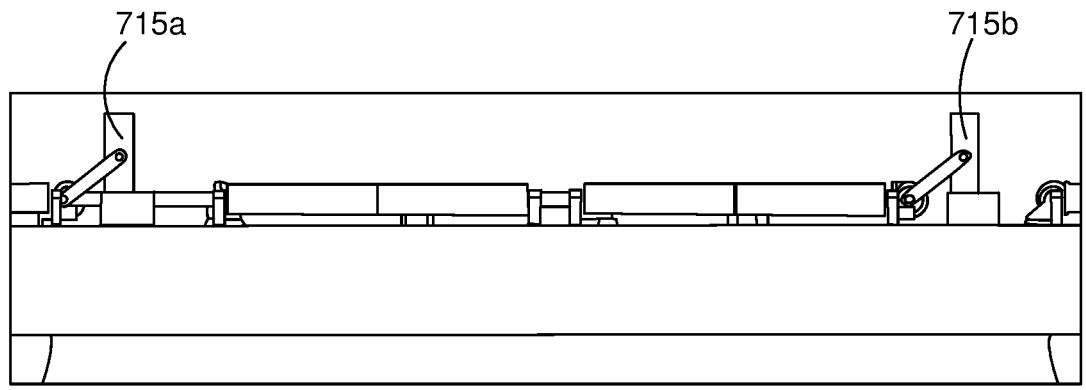
FIGS. 19A-19C are a series of diagrams illustrating articulation of the locking pin from a raised position to a withdrawn position in response to movement of the pin linkage and longitudinal link on the exemplary mobile dolly frame of FIG. 7 in accordance with an embodiment of the invention.
Figure 19B:
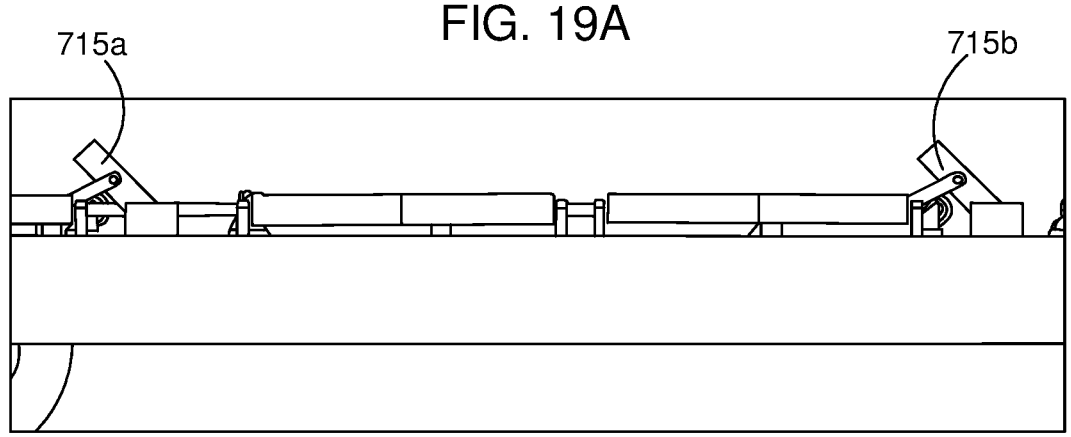
Figure 19C:
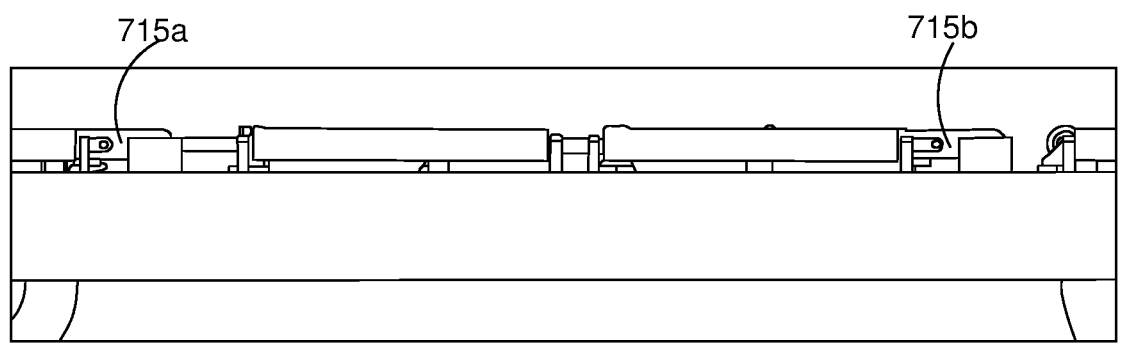

FIGS. 19A-19C are a series of diagrams illustrating articulation of the locking pins (e.g., pins 715a, 715b) from the raised position to the withdrawn position in response to movement of longitudinal link 1040 and respective pin linkages (e.g., linkage 1300) on the different locking pins on the exemplary mobile dolly frame of FIG. 7 in accordance with an embodiment of the invention. As handle 900 is rotated, locking pins 715a, 715b move from the raised position as shown in FIG. 19A, transition between the raised and withdrawn positions as shown in FIG. 19B, and move to the withdrawn position as shown in FIG. 19C where the locking pins 715a, 715b no longer secure cargo on dolly frame 700 and where the cargo may be moved from frame 700. In other words, exemplary locking pins 715a, 715b may be moved from the raised position (where they may securely interface with the attachment point on the cargo when the locking pins 715a, 715b are moved to the raised position by moving the handle 900 at the safe location of the operator station in the first rotational direction) to the withdrawn position (where movement of the handle 900 in an opposing rotational direction causes the second end of the locking pins retract from extending above the dolly frame).

Figure 20A:
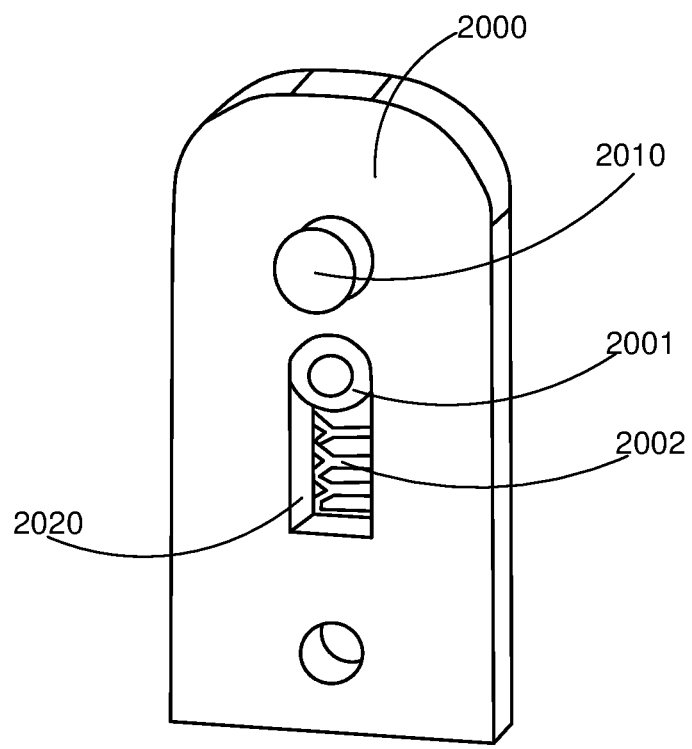
FIGS. 20A and 20B are diagrams of another example of a locking pin using a pin cradle, pin tab movably mounted in the pin cradle, and a spring-biased movable fitting in the pin tab that allows the pin tab to be secured within the pin cradle but articulated to move from a raised position as secured within the pin cradle to a withdrawn position in response to movement of the pin linkage and longitudinal link on the exemplary mobile dolly frame of FIG. 7 in accordance with an embodiment of the invention.
Figure 20B:
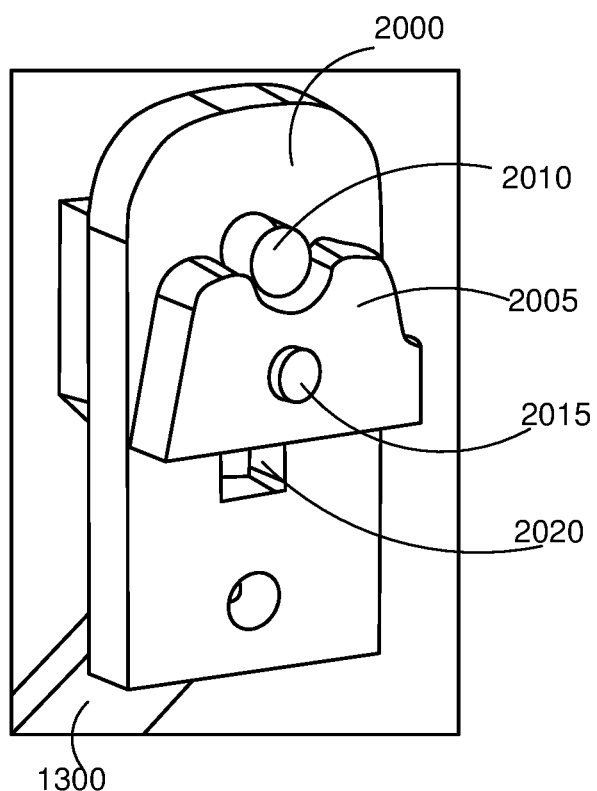
Figure 21:
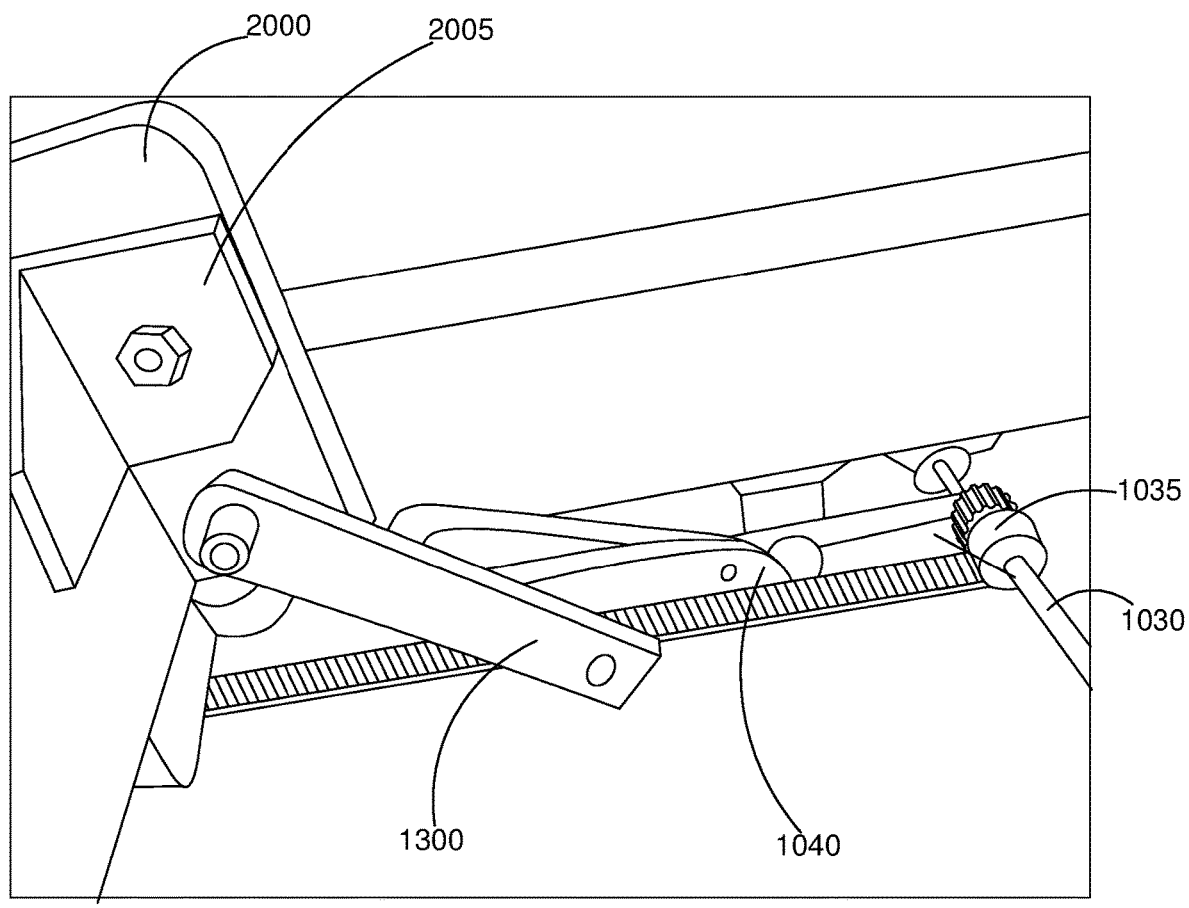
FIG. 21 is a diagram of an exemplary pin cradle and exemplary pin tab in relation to an exemplary pin linkage and longitudinal link in accordance with an embodiment of the invention.
Figure 22:
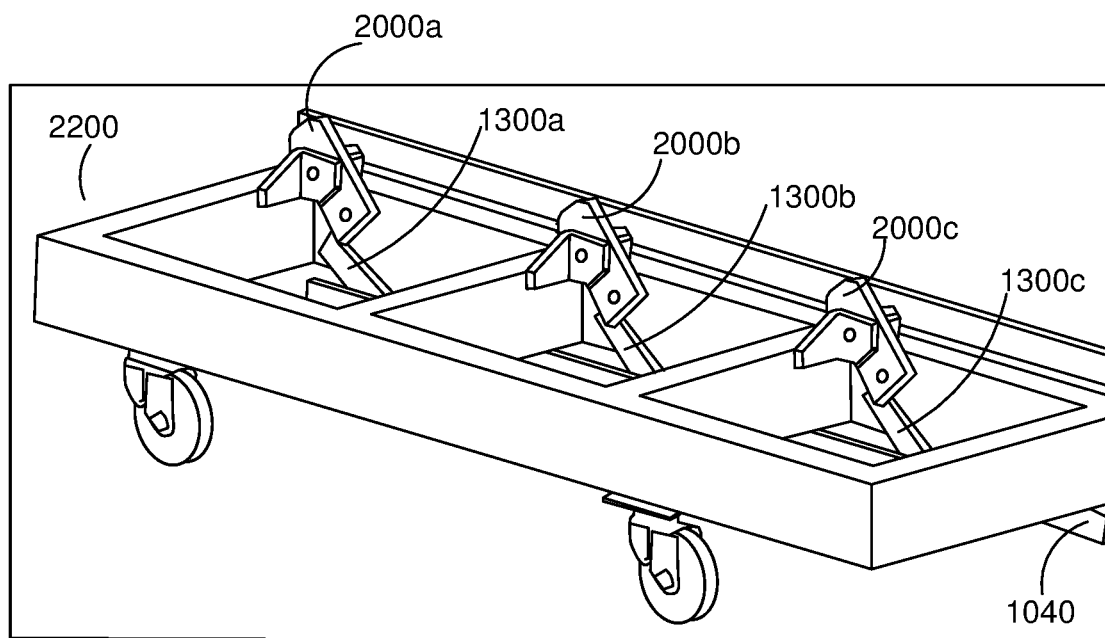
FIG. 22 is a diagram of the exemplary pin cradle and exemplary pin tab in relation to the exemplary pin linkage and longitudinal link as shown in FIG. 21 but as part of a multi-pin assembly on an exemplary mobile dolly frame in accordance with an embodiment of the invention.

FIGS. 20A and 20B are diagrams of another exemplary locking pin that may be articulated via longitudinal link 1040 and pin linkage 1300. Referring now to FIG. 20A, this alternative exemplary locking pin may be implemented using exemplary pin tab 2000 having a cradle post 2010 extending from either side of pin tab 2000 and a movable fitting 2001 disposed within an aperture 2020 in pin tab 2000. Movable fitting 2001, as illustrated in FIG. 20A, glides within aperture 2020 and is biased in place using spring 2002. FIG. 20B illustrates an exemplary pin cradle 2005 where pin tab 2000 may be movably mounted in the pin cradle 2005 using a pin shaft 2015 fed through pin cradle 2005 and spring-biased movable fitting 2001 in the pin tab 2000. This allows the pin tab 2000 to be secured within the pin cradle 2005 but articulated to move from a raised position of the pin tab 2000 (as shown in FIG. 20B) as secured within the pin cradle 2005 to a withdrawn position in response to movement of the pin linkage 1300 and longitudinal link 1040 on the exemplary mobile dolly frame of FIG. 7 in accordance with an embodiment of the invention. In an embodiment, exemplary pin cradle 2005 is disposed on the edge of the dolly frame 700. The pin cradle 2005 securely holds the pin tab 2000 as the locking pin in the raised position given the bias of spring 2002 that holds the cradle post 2010 within a seat of the pin cradle 2005. Movement of pin linkage 1300 (via articulation of longitudinal link 1040) urges and moves pin tab 2000 out of cradle 2005 where the cradle post 2010 and pin tab 2000 are moved up from the cradle's seat so to allow rotation of the pin tab 2000 from the raised position to the withdrawn position in response to movement of the pin linkage 1300 and longitudinal link 1040. An embodiment may implement longitudinal link 1040 as a geared link 1040 (as shown in FIG. 21) responsive to rotation of pinion gear 1035 and shaft 1030 of the chain and sprocket assembly 710. FIG. 22 is a diagram of an exemplary pin cradle and exemplary pin tab in relation to the exemplary pin linkage and longitudinal link as shown in FIG. 21 but as part of a multi-pin assembly with multiple pin tabs 2000a-2000c and multiple pin linkages 1300a-1300c responsive to link 1040 on an exemplary mobile dolly frame 2200 in accordance with an embodiment of the invention.

A further embodiment may have the longitudinal link 1040 disposed under dolly 700 or 2200 to help avoid interference issues. Such an embodiment may deploy a rack and pinion mechanism (similar to that illustrated in FIGS. 21 and 22) where the pin linkages push the pin tabs up and out of their respective cradles. As the operator rotates the top sprocket 1005 at the operator station (e.g., via handle 900), the rotation motion is transferred to the pinion (e.g., via pinion gear 1035) and across the rack (e.g., an embodiment of longitudinal link 1040) resulting in horizontal translation of the longitudinal link and the attached pin linkages, which pushes the rotational pin tabs upward (as illustrated in FIG. 21).

Movable Control System for Remote Pin Actuation

Further embodiments may have a moveable operator control system interface for remote pin drop on the dolly. In general, the exemplary moveable operator control system interface may be selectively deployed from the dolly's frame via a deployment switch. FIGS. 23-26 provide information related to such embodiments involving an exemplary operator control system interface.

Figure 23:
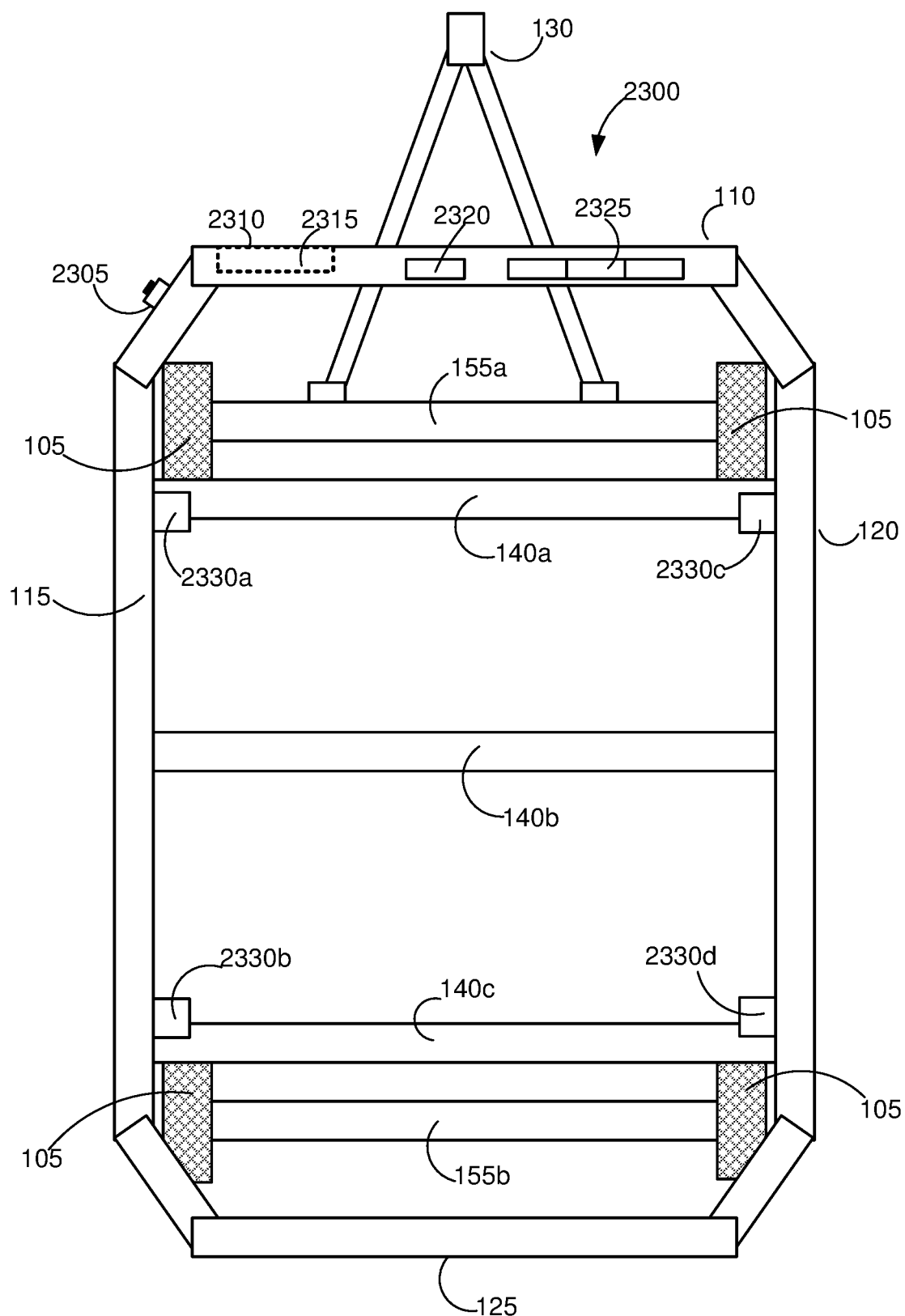
FIG. 23 is a diagram of an exemplary cargo dolly enhanced with an exemplary movable frame section in accordance with an embodiment of the invention.

FIG. 23 is a diagram of an exemplary cargo dolly enhanced with an exemplary movable frame section in accordance with an embodiment of the invention. Referring now to FIG. 23, exemplary cargo dolly frame 2300 is similar to exemplary frame 100 and illustrated with many commonly referenced components similar to that shown in FIGS. 1A-1C. As shown in FIG. 23, exemplary cargo dolly frame 2300 is shown with having multiple different frame sections, such as the front edge 110, the first side edge 115 connected to the front edge 110, the second side edge 120 connected to the front edge 110, the rear edge 125 connected to each of the first side edge 115 and the second side edge 120, and exemplary tow bar 130 that may be connected to tractor or to other dollies. Exemplary cargo dolly frame 2300, as shown in FIG. 23, further includes an exemplary movable frame section 2310 attached to the front edge 110 part of frame 2300 (e.g., a first frame section of the dolly frame). Other embodiments may have the exemplary movable frame section attached to other sections of the dolly frame 2300, such as the rear edge 125.

Exemplary movable frame section 2310 is shown retracted in a recessed portion 2315 of frame 2300, but further embodiments may have the exemplary movable frame section 2310 in a foldable configuration with the dolly frame 2300 or a removable configuration relative to the dolly frame 2300. Thus, embodiments may allow the movable frame section 2310 (which provides a base for a moveable operator control system interface) to be disposed on the dolly frame structure in a moveable manner so that the operator control system interface on the movable frame section 2310 may be placed into a secured and locked user position for use on one side of the cargo dolly 2300, and then repositioned in a stored position out of the way so as to avoid damage while being situated within the side frame of the cargo dolly 2300 (e.g., within the recessed portion 2315 of frame 2300). In other words, the exemplary dolly frame 2300 has a movable frame section 2310 that is moveably positioned (e.g., via a deployment switch 2305 that may activate a latch to lock/unlock and/or latch/unlatch the moveable frame section 2310 and/or may cause the moveable frame section 2310 to be responsively articulated or extended from the dolly's frame 2300 using one or more actuators) so as to expose the operator control system interface when the moveable portion is extended to be in the user position. The moveable frame section 2310 may also be withdrawn from the extended user position (e.g., using such a deployment switch 2305) so as to hide the operator control system interface when the moveable frame section 2310 is in the stored position. Such a stored position may be, for example, recessed within the dolly frame 2300 (e.g., in recessed portion 2315 of frame 2300). In the foldable configuration embodiment, exemplary movable frame section 2310 may be attached to frame 2300 (e.g., via hinges) and folded down beside one side of the dolly frame (e.g., the front 110 of dolly frame 2300) where the operator control system interface on the movable frame section 2310 is not protruding from the dolly 2300 so as to impede other traffic or expose the dolly frame 2300 to damage. In the removable configuration embodiment, exemplary movable frame section 2310 may be a removable component (e.g., with mechanical attachment points and electronic interfaces that may be disconnected and reconnected) that may be removed from the dolly frame 2300 itself so that it may be disconnected and stored out of the way, but then reconnected in the user position during loading and unloading operations.

FIG. 23 further illustrates exemplary electronics control module 2320, power source 2325 providing power to electronic circuitry on dolly frame 2300 (e.g., electronics, actuators, displays, switches, and the like), and an exemplary set of cargo securing pins 2330a-2330d disposed relative to different parts of the dolly frame 2300. Each of the cargo securing pins 2330a-2330d (e.g., similar to that of locking pins 715a-715b) are disposed relative to the frame 2300, are movable relative to the frame 2300, and may be actuated or articulated (like that of locking pins 715a-715b) from a retracted position that releases any cargo being transported on dolly frame 2300 to a deployed position that may extend above the working area/cargo deck of frame 2300 to help secure the cargo being transported on dolly frame 2300. In an embodiment, exemplary electronics control module 2320 (ECM) may be disposed on dolly frame 2300 and used for at least remotely controlling deployment of the cargo securing pins 2330a-2330d in response to operator user input received through the operator control system interface on movable frame section 2310. Embodiments of exemplary electronics control module 2320 may have at least a weatherproof housing and, enclosed therein, a microprocessor, memory, interfacing circuitry for receiving sensor input (e.g., input from an operator/user), and sending control signals to selectively activate one or more external actuators that may drive and control the position of one or more of cargo securing pins 2330a-2330d. An exemplary electronics control module 2320 may be implemented with, for example, a Raspberry Pi type of low-cost computing node that has onboard wireless communications (e.g., Bluetooth, ZigBee, WiFi, Cellular, and the like), sensor and actuator interfacing, memory for storing programming code that adapts the module beyond that of a generic computing device when used as part of improved and enhanced cargo dolly apparatus/system, and may be battery operated (e.g., powered by electricity provided by power source 2325, which may be rechargeable and/or replaceable).

Figure 24:
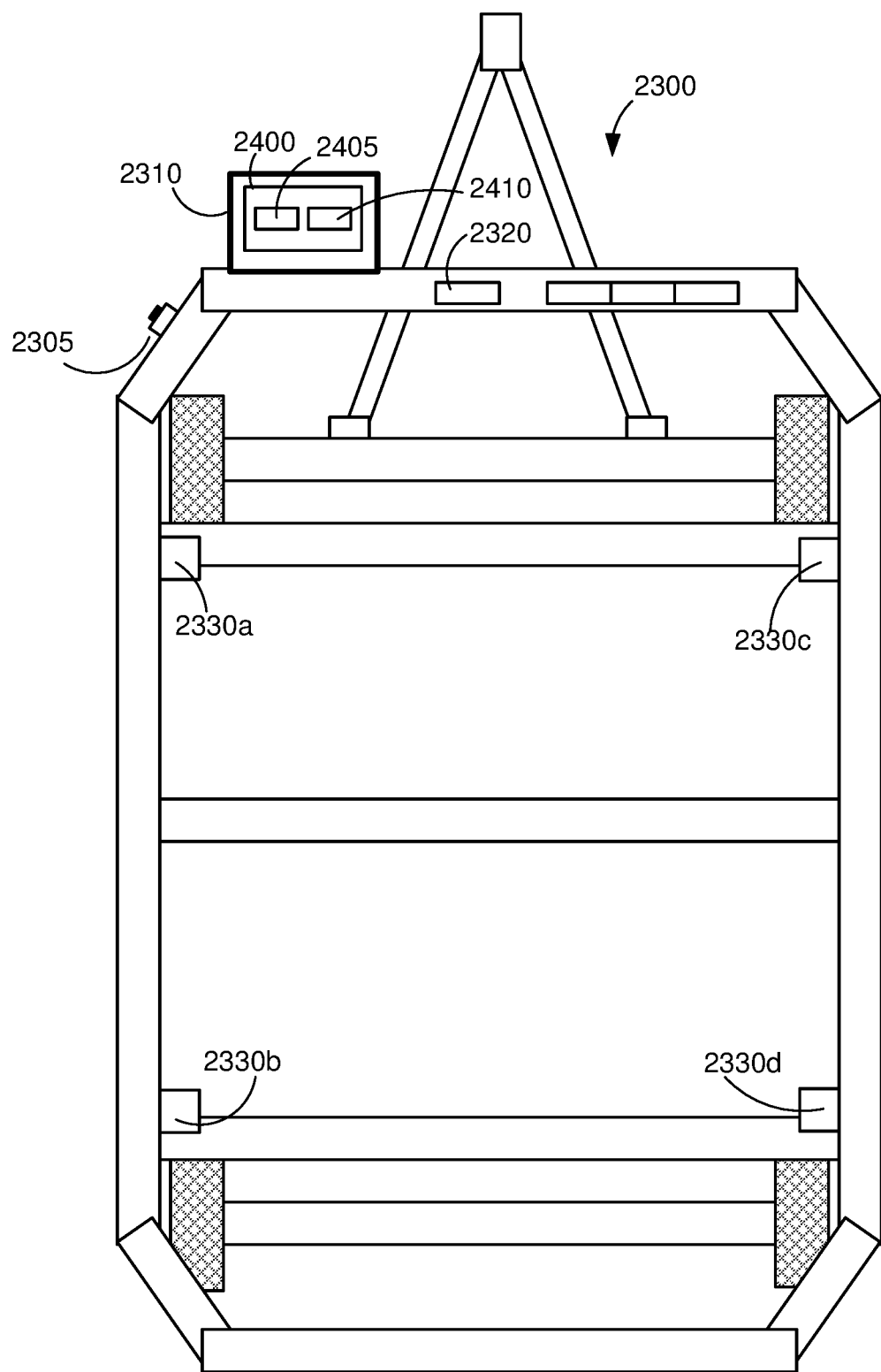
FIG. 24 is a diagram of the exemplary cargo dolly of FIG. 23 shown with the exemplary movable frame section moved from a stored position into a deployed user/operator position in accordance with an embodiment of the invention.

FIG. 24 is a diagram of the exemplary cargo dolly of FIG. 23 shown with the exemplary movable frame section 2310 moved from a stored position (e.g., as disposed in recessed portion 2315 of frame 2300) into a deployed user/operator position that extends from a side of frame 2300. Referring now to FIG. 24, exemplary operator control system interface 2400 on movable frame section 2310 is illustrated in the deployed user/operator position and having one or more user input devices 2405 and one or more status indicators 2410 viewable and operable by the local user/operator. An embodiment has exemplary user input devices 2405 on the system interface 2400 to receive input from the operator/user where the user input devices 2405 allows a logistics operator to send input to electronics control module 2320 as responsive control input for a processor-based system that can actuate remote cargo securing pin drop/raising to a desired configuration. Exemplary user input devices 2405 may be implemented with one or more keys, switches, joy sticks, touchscreens, and the like that. Exemplary status indicators 2410 provide feedback to the operator/user in the form of status information related to one or more of the cargo securing pins 2330a-2330d (e.g., deployed status, withdrawn or retracted status) and/or status information related to the movable frame section 2310 (e.g., locked, unlocked, deployed). Exemplary status indicators 2410 may be implemented with one or more lights and/or speakers. An embodiment may implement status indicators 2410 with one or more displays disposed on the operator control system interface 2400, where the display or displays provide generated messages representing the status information related to the state of cargo securing pins 2330a-2330d and/or the movable frame section 2310.

Figure 25:
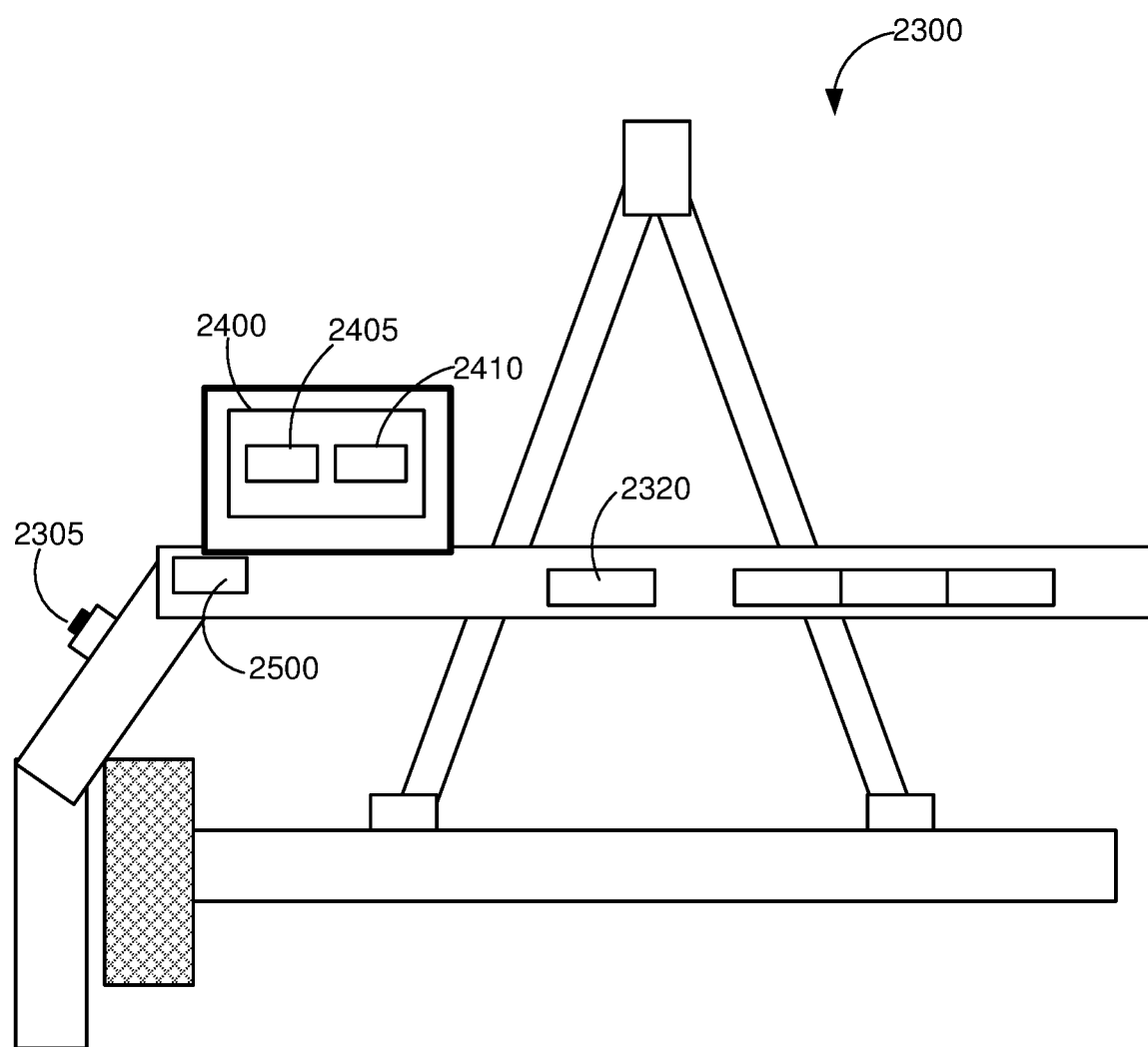
FIG. 25 is a further diagram of a portion of the exemplary cargo dolly of FIG. 23 shown with an actuated exemplary movable frame section capable of being moved from a stored position into a deployed user/operator position in accordance with an embodiment of the invention.

As noted above, exemplary deployment switch 2305 is attached to frame 2300 and engaged by the operator/user to release the movable frame section 2310 from a stored position on a side of the frame 2300 to a deployed user position. Such a switch 2305 may release the movable frame section 2310 from recessed portion 2315 in frame 2300, from a folded position on the side of frame 2300, or may release the movable frame section 2310 from frame 2300 altogether as a removable component of the cargo dolly. FIG. 25 is a further diagram of a portion of the exemplary cargo dolly of FIG. 23 shown with an actuated exemplary movable frame section 2310 capable of being moved from a stored position into a deployed user/operator position in accordance with an embodiment of the invention. Referring now to FIG. 25, an exemplary movable frame section actuator 2500 is shown as one or more actuators that may be activated to cause movable frame section 2310 to deploy from a stored or recessed position (e.g., a position in recessed portion 2315 of frame 2300). Exemplary moveable frame section actuator 2500 is responsive to input received by deployment switch 2305, and is disposed on part of frame 2300 while being in communication with the movable frame section 2310. In other words, the moveable frame section actuator 2500 is operable to cause the movable frame section 2310 to extend from frame 2300 from a stored position to a deployed user position in response to input received by the deployment switch 2305, and further operable to cause the movable frame section 2310 to articulate and retract relative to frame 2300 from the deployed user position to the stored position in response to other input received by the deployment switch 2305. As noted above, other embodiments may use a latch (not shown) responsive to the deployment switch 2500, where the latch is disposed on the frame 2300 to secure the movable frame section 2310 in a stored position and to release the moveable frame section 2310 from the stored position in response to the deployment switch 2500.

Figure 26:
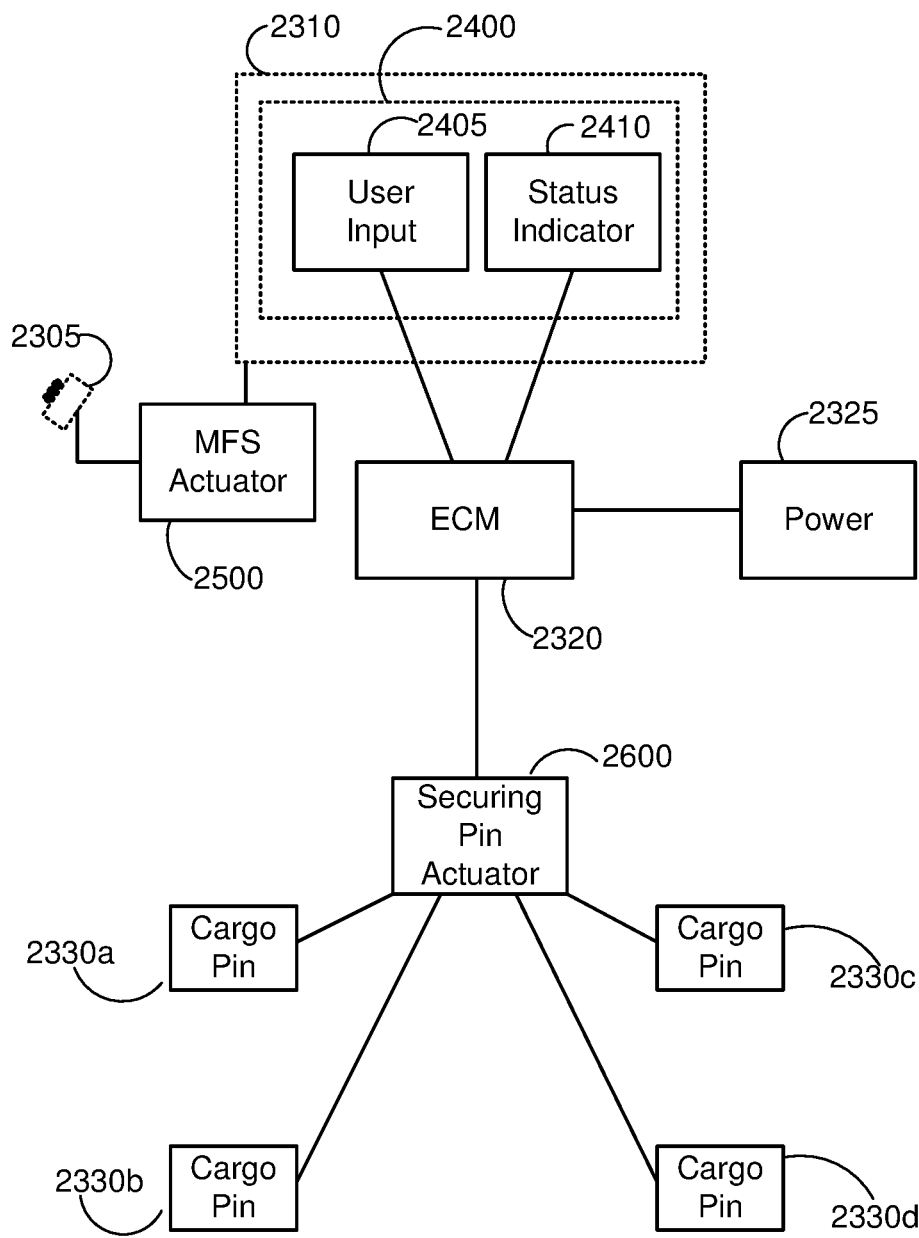
FIG. 26 is a block diagram illustrating exemplary control, input, output, and actuated elements used on the exemplary cargo dolly of FIG. 23 in accordance with an embodiment of the invention.

FIG. 26 is a block diagram illustrating exemplary control, input, output, and actuated elements used on the exemplary cargo dolly of FIG. 23 in accordance with an embodiment of the invention. Referring now to FIG. 26, the above described components are shown with connections the help represent interconnections and operations of the improved cargo dolly as an enhanced apparatus. As shown in FIG. 26, deployment switch 2500 is shown providing its received user input to movable frame section (MFS) actuator 2500, which then responsively causes the movable frame section 2310 (having operator control system interface 2400) to deploy. Electronic control module (ECM) 2320 is shown coupled to user input devices 2405 and status indicators 2410 on operator control system interface 2400, while also providing control signals to exemplary securing pin actuator(s) 2600 so as to allow for remote actuation of the cargo securing pins 2330*a*-2330*d*. As such, the securing pin actuators 2600 are responsive to control input received by user input device 2405 to cause the cargo securing pins 2330*a*-2330*d* to move from their respective retracted position to their respective deployed position to secure the cargo. Likewise, the securing pin actuators 2600 are responsive to other control input received by the user input device 2405 to cause the cargo securing pins 2330*a*-2330*d* to move from their respective deployed position to their respective retracted position to release the cargo. Those skilled in the art will appreciate that user input device 2405 may be implemented to allow an operator/user to provide input to selectively actuate particular ones of cargo securing pins 2330*a*-2330*d* (as individual pins, sub-groups of the pins, or all of the pins). And while power module 2325 is shown coupled to ECM 2320, those skilled in the art will appreciate that power module 2325 may also provide power to any and all other components shown in FIG. 26.

In such a configuration and in operation, ECM 2320 is programmatically operative to receive the control input from the user input device 2405; generate a first control signal responsive to the control input; transmit the first control signal to the securing pin actuators 2600 to cause the cargo securing pins 2330*a*-2330*d* to move from their respective retracted position to their respective deployed position to secure the cargo; receive other control input from the user input device 2405; generate a second control signal responsive to the other control input; and transmit the second control signal to the securing pin actuators 2600 to cause the cargo securing pins 2330*a*-2330*d* to move from their respective deployed position to their respective retracted position to release the cargo.

In an embodiment, the cargo securing pins 2330*a*-2330*d* may be selectively activated individually or in groups by securing pin actuators 2600. For example, particular securing pin actuators 2600 may be respectively coupled to each in the set of cargo securing pins 2330*a*-2330*d*. In such an example, each of the selectively activated securing pin actuators 2600 may be responsive to deploy control input (a particular control signal for that actuator and its respective cargo securing pin or pins) received by the first user input device to cause the respective one of the cargo securing pins 2330*a*-2330*d* to move from a retracted position to a deployed position to facilitate securing the cargo. Likewise, each of the selectively activated securing pin actuators 2600 may be responsive to retract control input (another control signal for that actuator and its respective cargo securing pin or pins) received by the first user input device to cause the respective one of the cargo securing pins 2330*a*-2330*d* to move from the deployed position to the retracted position to at least partially release the cargo where that pin or pins interfaces with attachments point of the cargo or where that pin or pins prevent the cargo from moving off the dolly frame 2300.

Sensor-Based Automatic Actuation of Cargo Holding Pins

Figure 27:
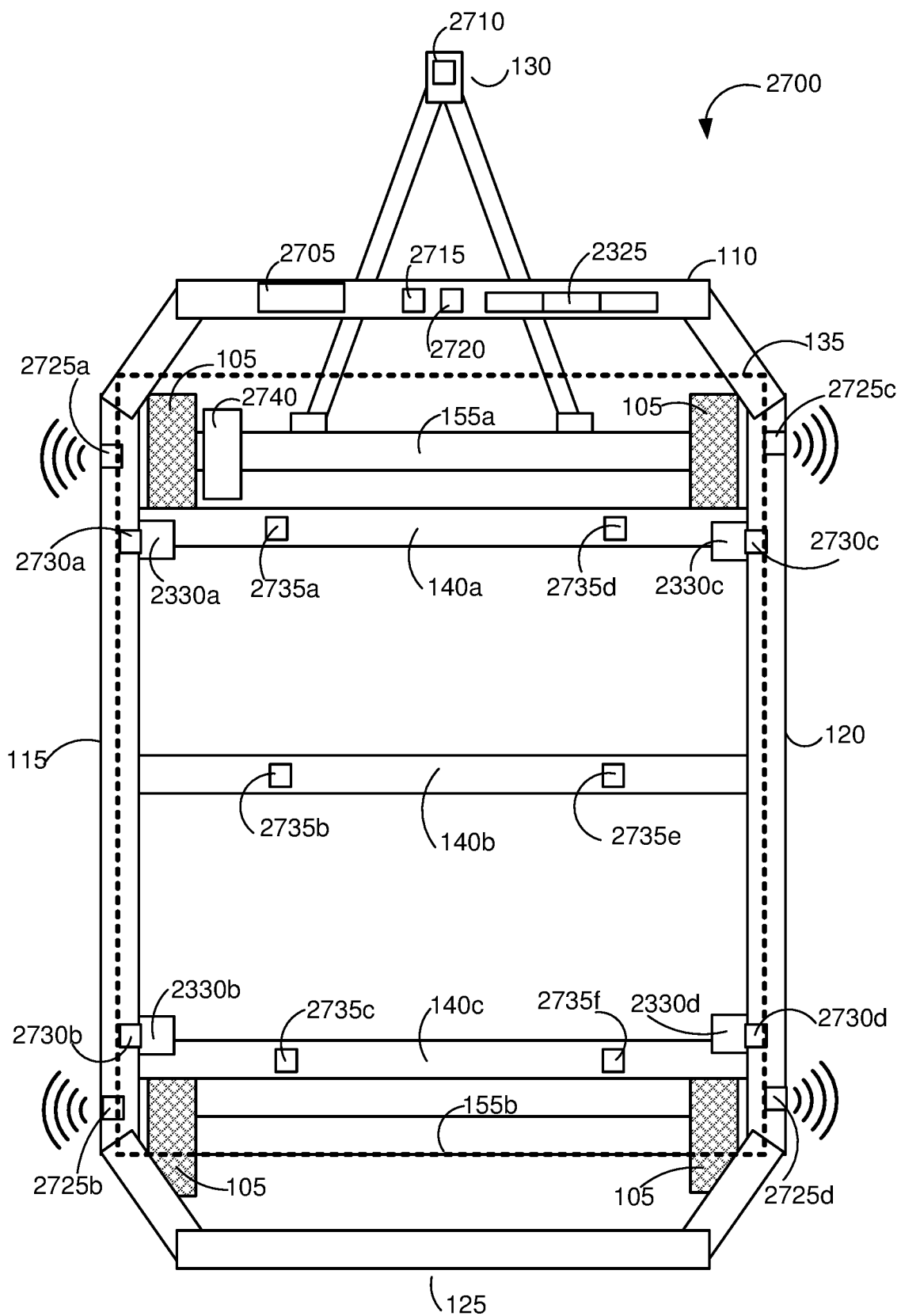
FIG. 27 is a diagram of an exemplary cargo dolly enhanced with exemplary sensor-based actuation of cargo securing pins in accordance with an embodiment of the invention.
Figure 28:
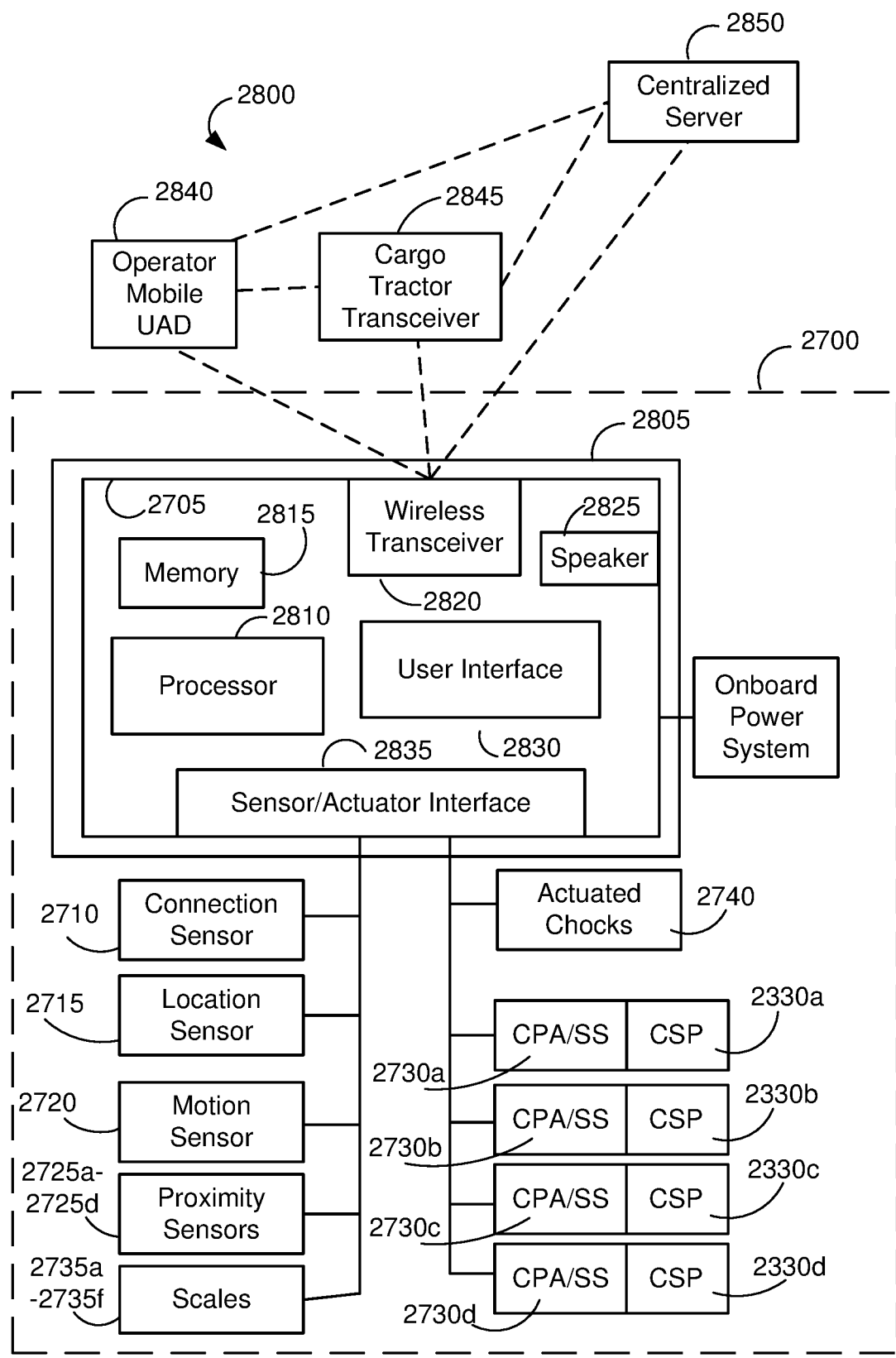
FIG. 28 is a block diagram illustrating an exemplary system with exemplary control, input, output, and actuated elements used on the exemplary cargo dolly of FIG. 27 in accordance with an embodiment of the invention.
Figure 29:
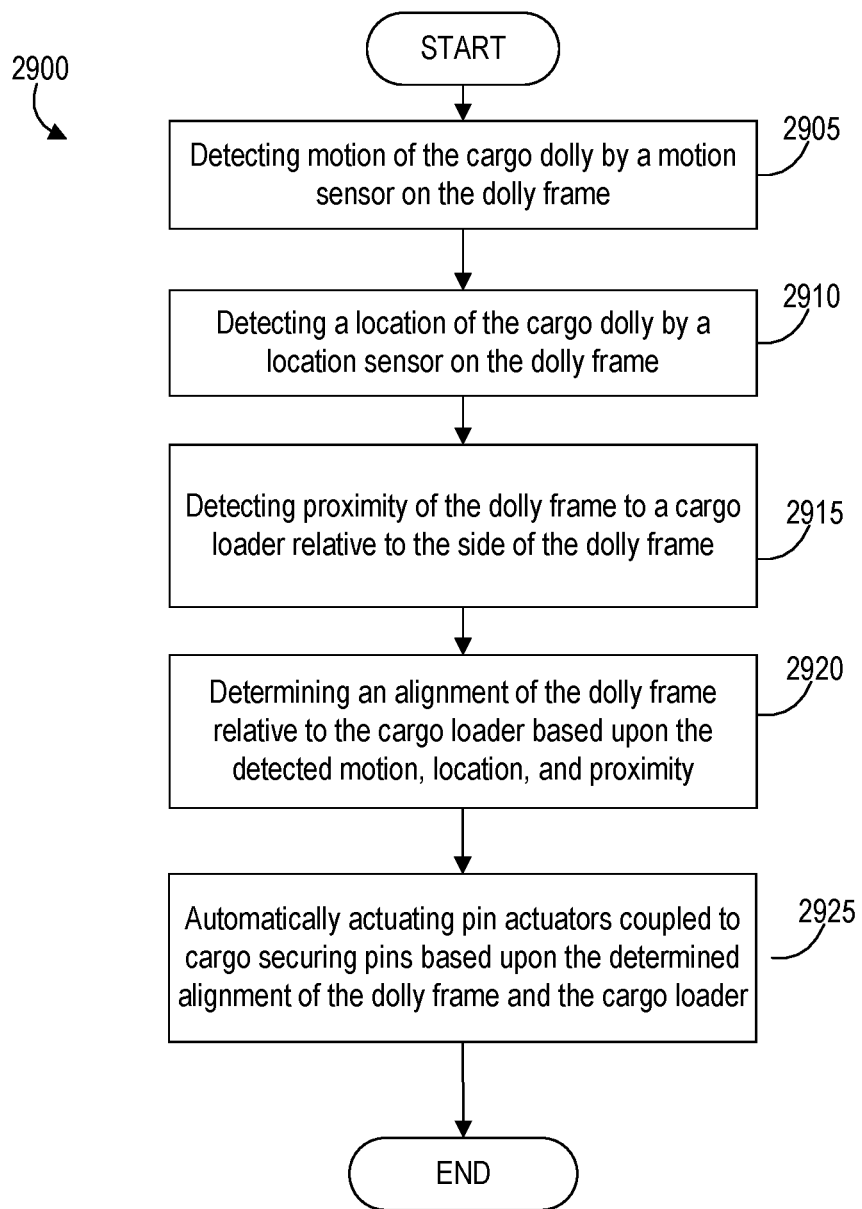
FIG. 29 is flow diagram of an exemplary method for sensor-based actuation of cargo securing pins on an improved cargo dolly in accordance with an embodiment of the invention.

Additional embodiments include systems and methods for automatic actuation of cargo holding/securing pins based on sensor data, such as cargo tug movement and location relative to the aircraft loader (also referenced as a cargo loader) and alignment with the loader using sensors onboard the cargo tug and/or dolly. FIGS. 27-29 provide further details regarding such embodiments.

In general, such embodiments may deploy an exemplary electronics controller module as part of a system or assembly on the dolly that includes or at least interfaces with sensors (e.g., GPS and inertial measurement unit types of sensors) to detect and respond to motion/movement of the tug/dolly, a transceiver that receives the relative location of the aircraft loader (whether in GPS type of coordinates) and/or further proximity sensors that detects the relative location of a nearby aircraft loader. In an exemplary embodiment, the electronic controller module on the dolly may sense alignment data (e.g., proximity data, location data, user input data, and/or a combination thereof) so as to automatically activate and actuate cargo holding pins via one or more of the remote actuation assemblies described above (e.g., sending a signal to cause a lever or shaft to responsively move so as to deploy (lock or unlock) the pins on the dolly frame). In this way, pin raising/dropping or otherwise pin actuation may be automated and reportable. The state of the pins, as automatically detected or determined (via status data reflecting alignment, pin status, and dolly status), may be used in an embodiment as part of determining if a cargo tractor with the dolly should be allowed to move. For example, if a pin was not raised and the dolly's electronics module detects movement, a change in weight on the dolly (via scales or strain gauges deployed as types of sensors on the dolly), or attachment to a cargo tractor, the electronics module may transmit a responsive communication to the cargo tractor itself (e.g., a display of a transceiver on the cargo tractor) or to a user access device operated by a logistics operator of the cargo tractor (e.g., a smartphone or ruggedized tablet used by the cargo tractor operator) to prevent the cargo tractor from moving until the pins are in a desired configuration (e.g., are raised to securely engage the cargo containers on the dolly) as well as to notify the operator of which pins need to be placed into the desired configuration.

FIG. 27 is a diagram of an exemplary cargo dolly enhanced with exemplary sensor-based actuation of cargo securing pins in accordance with an embodiment of the invention. Referring now to FIG. 27, exemplary cargo dolly frame 2700 is similar to exemplary frame 100 with many commonly referenced components similar to that shown in FIGS. 1A-1C and similar to exemplary frame 2300 with many commonly referenced components similar to that shown in FIGS. 23-26. As shown in FIG. 27, exemplary cargo dolly frame 2700 is shown with having multiple different frame sections, such as the front edge 110, the first side edge 115 connected to the front edge 110, the second side edge 120 connected to the front edge 110, the rear edge 125 connected to each of the first side edge 115 and the second side edge 120, and exemplary tow bar 130 that may be connected to other externally disposed ground support equipment (e.g., a cargo tractor or to other dollies). Exemplary frame 2700 is also shown with working area or cargo deck 135, which supports cargo being transported by dolly frame 2700. Exemplary frame 2700 is also shown with multiple cargo securing pins 2330a-2330d where each are disposed on the dolly frame 2700 and movable from a retracted position from below the top deck 135 to a deployed position extending at least partially above the top deck 135.

Exemplary frame 2700 is further shown with exemplary pin actuators 2730a-2730d corresponding to each of the cargo securing pins 2330a-2330d. Each of the pin actuators 2730a-2730d are responsive to a control input from exemplary electronics control module 2705 to at least articulate respective ones of the cargo securing pins 2330a-2330d (individually, in groups, or all of the pins) from the retracted position to the deployed position. Exemplary electronics control module 2705 is shown disposed on the dolly frame 2700 for remotely controlling deployment of each of the set of cargo securing pins 2330a-2330d by selectively generating the control input for each of the pin actuators 2730a-2730d. Exemplary pin actuators 2730a-2730d for cargo securing pins 2330a-2330d may be electronically activated by control signals from the electronics control module 2705 through interface 2835. Such actuators may, for example, selectively activate one or more of the pins with electro-mechanical solenoids, pistons, hydraulically actuated links, and the like.

Exemplary frame 2700 also includes different types of sensors coupled to the exemplary electronics control module 2705. For example, FIG. 27 illustrates a connection sensor 2710 that detects when the dolly frame is connected to external ground support equipment, a location sensor 2715 (e.g., a GPS and inertial measurement unit) that detects a location of frame 2700, a motion sensor 2720 that detects motion of frame 2700, and proximity sensors 2725a-2725d that detect the proximity of frame 2700 to nearby objects, such as a cargo loader at a desired logistics point (e.g., a cargo loader next to an aircraft). The exemplary pin actuators 2730a-2730d may be implemented to report the status (e.g., the deployed or retracted position) of respective cargo securing pins 2330a-2330d (e.g., with pin status sensors implemented as part of the actuators or with separately disposed pin status sensors). In an embodiment, the exemplary electronics control module 2705 is programmatically configured to be operative to at least receive sensor data from the sensors (e.g., sensors 2715, 2720, and 2725a-2725d) and automatically actuate the pin actuators 2730a by generating the control input for the cargo securing pins 2330a-2330d when the sensor data indicates no movement of the dolly frame 2700, the location of the dolly frame 2700 is within a predetermined range of a desired logistics point (such as a particular cargo loader), and the dolly frame 2700 is detected to be proximate a the cargo loader at the desired logistics point.

FIG. 27 further shows exemplary scales 2735a-2735f that are disposed on the dolly frame 2700 and coupled to the electronics control module 2705, where the scales 2735a-2735f detecting a weight supported by the dolly frame 2700. Exemplary scales 2735a-2735f may, for example, be implemented using weight-sensitive pads or strain gauges as a means to detect weight and changes in weight over time. Embodiments may use one or more scales 2735a-2735f to monitor for weight changes over a period of time, which may be indicative of an unloading or loading situation where the frame 2700 should not be moved.

FIG. 27 also shows exemplary actuated chocks 2740 disposed on the dolly frame 2700 and coupled to the electronics control module 2705. Such exemplary actuated chocks 2740 may deploy and retract wheel chocks to prevent movement of at least one of the frame's wheels 150 in response to a chock signal from the electronics control module 2705. As such, the electronics control module 2705 may responsively prevent frame 2700 from moving under certain conditions as sensed by systems in an embodiment.

FIG. 28 is a block diagram illustrating an exemplary system 2800 with exemplary control, input, output, and actuated elements used on the exemplary cargo dolly of FIG. 27 as well as with different types of exemplary external transceivers that may communicate with such dolly components in accordance with an embodiment of the invention. Referring now to FIG. 28, exemplary system 2800 includes further details on exemplary electronics control module 2705 as disposed on frame 2700. An embodiment of exemplary electronics control module 2705 is a processor-based system having at least a weatherproof housing 2805 mounted to frame 2700. Within the weatherproof housing 2805 (e.g., waterproof, dust/dirt resistant, and the like), exemplary electronics control module 2705 is shown with a processor 2810 (e.g., a microprocessor capable of executing program code that programmatically configures operation of the electronics control module 2705), memory 2815 coupled to the processor 2810, a wireless transceiver 2820 coupled to the processor 2810, a speaker 2825 coupled to the processor 2810, a user interface 2830 coupled to the processor 2810, and sensor/actuator interface circuitry 2835 also coupled to the processor 2810. Exemplary memory 2815 may include volatile and non-volatile memory used during operation of the electronics control module 2705 in an embodiment. Memory 2815 at least maintains the program code that programmatically configures operation of the electronics control module 2705 to adapt the processing-based system of the module 2705 beyond that of a conventional or generic computing device. Exemplary sensor/actuator interface circuitry 2835 is used as part of module 2705 for receiving sensor data from the different sensors in system 2800 and for sending control signals to different actuators in system 2800. Embodiments of exemplary electronics control module may deploy exemplary user interface 2830 for visual feedback for the operator of the cargo dolly. This may, for example, be implemented with a display screen, or status indicator light or lights that provide a form of visual feedback (e.g., connection status feedback that signifies that the dolly is connected to the tractor and available to be towed or if the dolly is locked in place via chocks (such as actuated chocks 2740)). In more detail, such feedback from the user interface may be visual, audible, and/or haptic. The feedback may also be generated in the form of a wireless signal transmitted to a user access device operated by logistics operators of the cargo tractor (e.g., exemplary operators mobile user access device 2840, cargo tractor transceiver 2845) and/or to a centralized server 2850 that manages and tracks the status of different dollies within a fleet of GSE vehicles and other equipment. An exemplary electronics control module 2705 for the dolly may be implemented with a Raspberry Pi type of low-cost computing node that has onboard wireless communications (e.g., Bluetooth, ZigBee, WiFi, Cellular, and the like), sensor & actuator interfacing, memory, and may be battery operated.

As noted above, exemplary connection sensor 2710 is a sensor used to detect connection to other GSE (e.g., tractors, other dollies, and the like). Exemplary connection sensor 2710 is shown in FIG. 27 disposed on the tow bar 130, but other embodiments may place the connection sensor 2710 in other locations on the dolly frame 2700 (e.g., on a receiver at rear edge 125 of dolly 2700). An embodiment of exemplary connection sensor 2710 may be implemented as a proximity sensor, as sensor that electronically pairs with other GSE equipment through Bluetooth, as a contact sensor that detects contact with other GSE equipment, or a handshaking communications sensor using a verified handshake upon establishing a connection between the tractor and the dolly, and the like. Connection status information may be displayed on user interface 2830 and/or with an audible connection status notification through speaker 2825. Upon detection of not being linked, an embodiment may have the dolly's electronics module responsively and automatically deploy chocks (e.g., actuated chocks 2740) so as to keep the dolly in a stationary status, and provide feedback regarding the dolly's status.

Exemplary wireless transceiver 2820 of electronics control module 2705 may be used to transmit and receive signals to and from and otherwise communicate with external transceivers, such as a user access device operated by logistics operators of the cargo tractor (e.g., exemplary operators mobile user access device 2840, cargo tractor transceiver 2845) and/or to a centralized server 2850 that manages and tracks the status of different dollies within a fleet of GSE vehicles and other equipment. As such, exemplary wireless transceiver 2820 of module 2705 may notify such an external transceiver of determinations of permissive move status for dolly frame 2700 based upon one or more types of sensor data (e.g., pin status information on whether cargo securing pins 2330a-2330d are retracted and the cargo is not secure on working deck 135, etc.). Embodiments where the exemplary dolly has such a wireless communicating electronics control module 2705 may also be used as part of asset tracking solutions that aid in loading/unloading of GSE equipment and dispatching particular dollies from a nearest location that may be used as part of loading/unloading operations. Embodiments may also have the wireless transceiver 2820 on module 2705 receiving location information on the desired logistics point from an external transceiver (such as UAD 2840, tractor transceiver 2845, or server 2850) and provide the location information on the desired logistics point to the memory 2815 on the electronics control module 2705.

An onboard power system 2325 may be used to provide power to onboard electronics and powered actuators on dolly frame 2700. Such a power system 2325 may be one or more batteries or fuel cells, and may be chargeable and/or replaceable components on dolly frame 2700. Charging may, for example, be accomplished through kinetic, induction, wireless charging, ambient RF charging.

As noted above, operation of such an improved cargo dolly shown in FIGS. 27 and 28 has the exemplary electronics control module 2705 being programmatically configured to be operative to at least receive sensor data from the sensors (e.g., sensors 2715, 2720, and/or 2725a-2725d) and automatically actuate the pin actuators 2730a by generating the control input for the cargo securing pins 2330a-2330d when the sensor data indicates no movement of the dolly frame 2700, the location of the dolly frame 2700 is within a predetermined range of a desired logistics point (such as a particular cargo loader), and the dolly frame 2700 is detected to be proximate a the cargo loader at the desired logistics point.

In a further embodiment, the exemplary electronics control module 2705 may also be programmatically configured to be operative to receive pin status information from the pin actuators 2730a-2730d (where the pin status information reflects a position state of the cargo securing pins 2330a-2330d indicating one of the retracted position and the deployed position); determine a permissive movement status for the cargo dolly based upon the pin status information; and transmit a permissive move indicator message via wireless transceiver 2820 to an external transceiver based upon the permissive movement status for the cargo dolly (where the permissive move indicator message includes a recommendation on allowed movement of the cargo dolly based upon the pin status information).

In another embodiment, the electronics control module 2705 may also be programmatically further operative to receive connection status data from the connection sensor 2710 (where the connection status data indicates when the dolly frame 2700 is detected to be connected to external ground support equipment, such as a tractor or other dolly); determine a permissive movement status for the cargo dolly based upon the connection status data; and transmit a permissive move indicator message to an external transceiver based upon the permissive movement status for the cargo dolly (where the permissive move indicator message includes a recommendation on allowed movement of the cargo dolly based upon the connection status data).

In still another embodiment, the electronics control module 2705 may also be programmatically further operative to receive pin status information from the pin actuators 2730a-2730d (wherein the pin status information reflects a position state of the cargo securing pins 2330a-2330d indicating one of the retracted position and the deployed position); receive connection status data from the connection sensor 2710 (where the connection status data indicates when the dolly frame 2700 is detected to be connected to external ground support equipment); determine a permissive movement status for the cargo dolly based upon the pin status information and the connection status data; and transmit a permissive move indicator message to an external transceiver based upon the permissive movement status for the cargo dolly (where the permissive move indicator message includes a recommendation on allowed movement of the cargo dolly based upon the pin status information and the connection status data).

A further embodiment may have the electronics control module 2705 being programmatically further operative to receive weight change data from the scales (e.g., one or more of scales 2735a-2735f) where the weight change data indicates a change in the weight supported by the dolly frame 2700 over a period of time; determine a permissive movement status for the cargo dolly based upon the weight change data; and transmit a permissive move indicator message to an external transceiver based upon the permissive movement status for the cargo dolly (where the permissive move indicator message includes a recommendation on allowed movement of the cargo dolly based upon the weight change data).

Still another embodiment may have the electronics control module 2705 being programmatically further operative to receive connection status data from the connection sensor 2710 (where the connection status data indicates when the dolly frame 2700 is detected to be connected to external ground support equipment); and activate the actuated chocks 2740 to prevent the at least one of wheels 150 from moving when the connection status data indicates the dolly frame 2700 is not connected to the external ground support equipment.

As described above, system 2800 may be used to implement a method for sensor-based actuation of cargo securing pins on an improved cargo dolly (such as that shown in FIGS. 27 and 28). FIG. 29 is flow diagram of an exemplary method for sensor-based actuation of cargo securing pins on an improved cargo dolly in accordance with an embodiment of the invention. Referring now to FIG. 29, exemplary method 2900 begins at step 2905 where a motion sensor on the dolly frame detects motion of the cargo dolly. For example, motion sensor 2720 on dolly frame 2700 may detect motion of the cargo dolly having frame 2700 as the cargo dolly approaches or nears a cargo loader at a particular location near an aircraft. At step 2910, method 2900 continues with a location sensor (e.g., exemplary location sensor 2715) on the cargo dolly detecting a location of the cargo dolly (e.g., detected GPS coordinates for the location of the dolly having frame 2700). At step 2915, method 2900 continues with a proximity sensor on a side of the dolly frame detecting the proximity (e.g., distance) of the dolly frame to a cargo loader relative to the side of the dolly frame.

At step 2920, method 2900 has an electronics control module (e.g., module 2705) mounted to the dolly frame determining an alignment of the dolly frame relative to the cargo loader based upon the detected motion of the cargo dolly, the detected location of the cargo dolly, and the proximity of the dolly frame to the cargo loader. For example, exemplary control module 2705 may determine that dolly frame 2700 is not yet aligned with the cargo loader because the cargo dolly is still moving, the detected location of the cargo dolly does not match with a desired logistics point (e.g., coordinates for the cargo loader or is not yet within a predetermined range of the cargo loader's coordinates, which may be externally provided to module 2705 by an external transceiver), and/or the dolly frame is not yet detected to be physically proximate to the cargo loader at that desired logistics point (e.g., the dolly frame is beyond a threshold distance from the detected cargo loader using the proximity sensor). However, exemplary control module 2705 may determine that dolly frame 2700 is sufficiently aligned with the cargo loader because the cargo dolly is not moving, the detected location of the cargo dolly matches that of the desired logistics point (e.g., coordinates for) the cargo loader (or is within a predetermined range of the cargo loader), and the dolly frame is detected to be physically proximate to the cargo loader at that desired logistics point (e.g., the dolly frame is within a threshold distance from the detected cargo loader using the proximity sensor). Then, at step 2925, method 2900 has the electronics control module automatically actuating pin actuators coupled to the cargo securing pins based upon the determined alignment of the dolly frame relative to the cargo loader. For example, exemplary electronics control module may generate one or more control signals and provide those signals to pin actuators 2730a-2730d coupled to cargo securing pins 2330a-2330d based upon a determination that dolly frame 2700 is sufficiently aligned with a proximately disposed cargo loader at a desired logistics point where that cargo loader is located.

A further embodiment of method 2900 may include receiving user input from a user input device disposed on the dolly frame (e.g., a key, switch, touchscreen, and the like implemented as part of user interface 2820). As such, this further embodiment of method 2900 may implement step 2920 of determining the alignment of the dolly frame relative to the cargo loader as being based upon the detected motion of the cargo dolly, the detected location of the cargo dolly, the proximity of the dolly frame to the cargo loader, and the user input from the user input device. For example, the additional consideration of user input may allow the operator to provide an override that then allows the normally automatic actuation of cargo securing pins (e.g., from a secure deployed position to a retracted position) to consider, for example, if the operator is ready for such automatic actuation of the pins.

Another embodiment of method 2900 may also have the electronics control module receiving pin status information from the pin actuators, where the pin status information reflects a position state of the cargo securing pins (e.g., indicating one of the retracted position and the deployed position); determining a permissive movement status for the cargo dolly based upon the pin status information; and transmitting a permissive move indicator message to an external transceiver based upon the permissive movement status for the cargo dolly (where the permissive move indicator message includes a recommendation on allowed movement of the cargo dolly based upon the pin status information). Such an external transceiver, in this further embodiment, may be a user access device operated by a logistics operator of a cargo tractor associated with the cargo dolly (e.g., operator mobile UAD 2840, such as a smartphone, tablet, or other mobile computing device with wireless communication capabilities), a transceiver on the tractor itself (e.g., transceiver 2845), or a central server (e.g., server 2850) associated with a fleet of ground support equipment, wherein the cargo dolly is part of the plurality of ground support equipment.

In still another embodiment, method 2900 may further include steps where the electronics control module is receiving pin status information from the pin actuators, where the pin status information reflects a position state of the cargo securing pins (e.g., indicating one of the retracted position and the deployed position); receiving connection status data from a connection sensor disposed on the dolly frame, where the connection status data indicates when the dolly frame is detected to be connected to external ground support equipment; determining, a permissive movement status for the cargo dolly based upon the pin status information and the connection status data; and transmitting a permissive move indicator message to an external transceiver based upon the permissive movement status for the cargo dolly (where the permissive move indicator message includes a recommendation on allowed movement of the cargo dolly based upon the pin status information and the connection status data).

In yet another embodiment, method 2900 may further include steps where the electronics control module is receiving weight change data from scales disposed on the dolly frame (e.g., exemplary scales 2735a-2735f) that detect a weight supported by the dolly frame, where the weight change data indicates a change in the weight supported by the dolly frame over a period of time; determining a permissive movement status for the cargo dolly based upon the weight change data; and transmitting a permissive move indicator message to an external transceiver based upon the permissive movement status for the cargo dolly (where the permissive move indicator message includes a recommendation on allowed movement of the cargo dolly based upon the weight change data).

In further embodiment, method may further include steps where the electronics control module is receiving connection status data from a connection sensor (e.g., sensor 2710) disposed on the dolly frame, where the connection status data indicates when the dolly frame is detected to be connected to external ground support equipment; and activating actuated chocks (e.g., exemplary actuated chocks 2740) disposed on the dolly frame when the connection status data indicates the dolly frame is not connected to the external ground support equipment. The actuated chocks may deploy as activated to be proximate at least one of the dolly's wheels in response to a chock signal from the electronics control module to prevent the at least one in the set of wheels from moving.

Further embodiments consistent with what is shown in FIG. 28 may also include an exemplary system that uses an improved cargo dolly as described above along with one or more of the external transceivers so that the improved cargo dolly operates to automatically use such a sensor-based actuation of cargo securing pins but may also interact with one or more of the external transceivers to receive location information on a desired logistics point where such pins may be actuated and to receive notifications regarding the status of the improved cargo dolly as well as one or more of the above-described permissive move indicator messages with a recommendation on allowed movement of the improved cargo dolly.

What follows is a further collective description of different embodiments consistent with and exemplified by the above description.

Further Embodiment (Set B)—Articulating Linkage

1. An improved cargo dolly for transporting cargo, the improved cargo dolly comprising:

a dolly frame, wherein a portion of the dolly frame supports the cargo from beneath the cargo, a set of wheels attached to the dolly frame, wherein the set of wheels supports the dolly frame and rotates to allow movement of the dolly frame;

an operator station disposed on a front part of the dolly frame, wherein the operator station comprises a manually operated chain and sprocket assembly;

a locking pin disposed on an edge of the dolly frame, the locking pin having a first end rotatably attached to the dolly frame, a middle portion, and a second end extending from the rotatable first end;

a longitudinal link disposed on the dolly frame, the longitudinal link being articulated in response to rotation of the chain and sprocket assembly at the operator station; and a pin linkage having a first end attached to the longitudinal link and a second end rotatably attached to the middle portion of the locking pin; and wherein articulation of the longitudinal link in response to rotation of the chain and sprocket assembly causes the second end of the locking pin to remotely move above the dolly frame from a withdrawn position to a raised position.

2. The improved cargo dolly of embodiment 1, wherein the operator station further comprises a handle mechanically linked to one end of the chain and sprocket assembly whereby rotational movement of the handle responsively causes the chain and sprocket assembly to rotate and articulate the longitudinal link at the other end of the chain and sprocket assembly.

3. The improved cargo dolly of embodiment 1, wherein the chain and sprocket assembly comprises:

a support member having a first end fixed to the front part of the dolly frame and a second end disposed above the dolly frame;

a first sprocket rotatably mounted to second end of the support member;

a handle responsively mounted to a side of the first sprocket where movement of the handle causes rotation of the first sprocket;

a first chain disposed about the first sprocket;

a set of second sprockets rotatably mounted to the front part of the dolly frame, wherein the first chain is disposed about a first of the second sprockets;

a shaft disposed within the area defined by the dolly frame and in contact with the longitudinal link, wherein rotation of the shaft articulates the longitudinal link;

a third sprocket fixed to the shaft;

a second chain disposed about a second of the second sprockets and disposed about the third sprocket; and wherein movement of the first sprocket by the handle causes movement of the first chain, which causes movement of the set of the second sprockets, which causes movement of the second chain, which causes movement of the shaft and articulation of the longitudinal link.

4. The improved cargo dolly of embodiment 1 further comprising a plurality of linkage guides disposed along the dolly frame to hold the longitudinal link in an orientation that extends along a length of the dolly frame as the longitudinal link articulates along the length of the dolly frame.

5. The improved cargo dolly of embodiment 2, wherein movement of the handle in a first rotational direction causes the second end of the locking pin to extend above the dolly frame from the withdrawn position to the raised position representing a secure configuration of the locking pin and the cargo.

6. The improved cargo dolly of embodiment 5, wherein the locking pin rotates towards an attachment point on the cargo to securely interface with the attachment point on the cargo when the locking pin is moved to the raised position by moving the handle in the first rotational direction.

7. The improved cargo dolly of embodiment 2, wherein movement of the handle in a second rotational direction causes the second end of the locking pin to retract from the raised position to the withdrawn position to release the cargo.

8. The improved cargo dolly of embodiment 7, wherein the locking pin rotates away from an attachment point on the cargo to release the cargo when the locking pin is moved to the withdrawn position by moving the handle in the second rotational direction.

9. The improved cargo dolly of embodiment 1 further comprising a pin lock disposed on a locking pin support base fixed to the dolly frame, the pin lock being selectively movable to extend from the locking pin support base into a pin lock depression disposed on the locking pin to secure the locking pin in the raised position.

10. The improved cargo dolly of embodiment 1 further comprising a pin cradle disposed on the edge of the dolly frame, the pin cradle securely holding the locking pin in the raised position and allowing movement of the locking pin from the raised position to the withdrawn position in response to movement of the pin linkage and longitudinal link.

11. The improved cargo dolly of embodiment 10, wherein the locking pin further comprises:
  a pin tab movably mounted in the pin cradle; and
  a spring-biased movable fitting disposed within an aperture in the pin tab, the spring-biased movable fitting being secured to the pin cradle and allowing the pin tab to be articulated from the raised position to the withdrawn position in response to movement of the pin linkage and longitudinal link.

12. The improved cargo dolly of embodiment 2, wherein chain and sprocket assembly further comprises a pinion gear coupled to the longitudinal link;
  wherein the longitudinal link comprises a geared linkage response to the pinion gear on the chain and sprocket assembly as the pinion gear is rotated by the handle.

13. An improved cargo dolly for transporting cargo, the improved cargo dolly comprising:
  a dolly frame, wherein a portion of the dolly frame supports the cargo from beneath the cargo,
  a set of wheels attached to the dolly frame, wherein the set of wheels supports the dolly frame and rotates to allow movement of the dolly frame;
  an operator station disposed on a front part of the dolly frame, wherein the operator station comprises
    a handle that receives operator input,
    a hydraulically actuated assembly responsive to movement of the handle based on the operator input, and
    an articulating gear moved by the hydraulically actuated assembly responsive to movement of the handle;
  a locking pin disposed on an edge of the dolly frame, the locking pin having a first end rotatably attached to the dolly frame, a middle portion, and a second end extending from the rotatable first end;
  a longitudinal link disposed on the dolly frame and having gearing coupled to the articulating gear of the operator station, the longitudinal link being articulated in response to the operator input on the handle of the hydraulically actuated assembly at the operator station and rotation of the articulating gear engaging with the gearing of the longitudinal link; and
  a pin linkage having a first end attached to the longitudinal link and a second end rotatably attached to the middle portion of the locking pin; and
  wherein articulation of the longitudinal link in response to the operator input on the handle causes the second end of the locking pin to remotely move above the dolly frame from a withdrawn position to a raised position.

Further Embodiment (Set C)—Movable Control System for Remote Pin Actuation

1. An improved cargo dolly for transporting cargo, the improved cargo dolly comprising:
  a dolly frame comprising a first frame section and a movable frame section attached to the first frame section;
  a set of wheels attached to the dolly frame, wherein the set of wheels supports the dolly frame and rotates to allow movement of the dolly frame;
  a set of cargo securing pins that are each movable from a retracted position to a deployed position;
  an electronics control module disposed on the dolly frame for remotely controlling deployment of the set of cargo securing pins;
  an operator station disposed on the movable section of the dolly frame, wherein the operator station further comprises an operator control system interface disposed on the movable frame section, the operator control system interface comprising at least
    a first user input device operatively in communication with the electronics control module,
    a status indicator providing feedback on status information related to the set of cargo securing pins and the movable frame section of the dolly frame; and
  a deployment switch mounted to the dolly frame that secures and releases the movable frame section of the dolly frame having the operator station.

2. The improved cargo dolly of embodiment 1, wherein the movable frame section is attached to the first frame section in a recessed portion on the first frame section, wherein the deployment switch releases the movable frame section from a stored position on a side of the first frame section to a user position.

3. The improved cargo dolly of embodiment 1, wherein the movable frame section is attached to the first frame section as a folded portion attached on a side of the first frame section, wherein the deployment switch releases the movable frame section from a stored position to a user position.

4. The improved cargo dolly of embodiment 1, wherein the movable frame section is attached to the first frame section as a removable portion attached on a side of the first frame section, wherein the deployment switch releases the movable frame section from a stored position on the side of the first frame section to a user position repositioned on the side of the first frame section.

5. The improved cargo dolly of embodiment 2, wherein the side of the first frame section comprises one of a front edge of the dolly frame and a rear edge of the dolly frame.

6. The improved cargo dolly of embodiment 1 further comprising a latch responsive to the deployment switch, the latch being disposed on the first frame section to secure the movable frame section in a stored position and to release the moveable frame section from the stored position in response to the deployment switch.

7. The improved cargo dolly of embodiment 1 further comprising a moveable frame section actuator responsive to the deployment switch, the moveable frame section actuator being disposed on the first frame section and in communication with the movable frame section, the moveable frame section actuator being operable to cause the movable frame section to extend from the first frame section from a stored position to a deployed user position in response to the deployment switch, the moveable frame section actuator being further operable to cause the movable frame section to articulate and retract relative to the first frame section from the deployed user position to the stored position in response to the deployment switch.

8. The improved cargo dolly of embodiment 1, further comprising one or more securing pin actuators coupled to the set of cargo securing pins, the securing pin actuators being responsive to first control input received by the first user input device to cause the cargo securing pins to move from their respective retracted position to their respective deployed position to secure the cargo, the securing pin actuators being responsive to second control input received by the first user input device to cause the cargo securing pins to move from their respective deployed position to their respective retracted position to release the cargo.

9. The improved cargo dolly of embodiment 8, wherein the electronics control module is programmatically operative to receive the first control input from the first user input device, generate a first control signal responsive to the first control input, transmit the first control signal to the securing pin actuators to cause the cargo securing pins to move from their respective retracted position to their respective deployed position to secure the cargo, receive the second control input from the first user input device, generate a second control signal responsive to the first control input, transmit the second control signal to the securing pin actuators to cause the cargo securing pins to move from their respective deployed position to their respective retracted position to release the cargo.

10. The improved cargo dolly of embodiment 1, wherein the first user input device comprises one from a group comprising a key, a switch, a joy stick, and a touchscreen.

11. The improved cargo dolly of embodiment 1, wherein the status indicator comprises one from a group comprising a light and a speaker.

12. The improved cargo dolly of embodiment 1, wherein the status indicator comprises a display disposed on the operator control system interface, the display providing a first generated message on the display representing the feedback on the status information related to the state of cargo securing pins.

13. The improved cargo dolly of embodiment 1, wherein the status indicator comprises a display disposed on the operator control system interface, the display providing a second generated message on the display representing the feedback on the status information related to the state of the movable frame section.

14. An improved cargo dolly for transporting cargo, the improved cargo dolly comprising:

a dolly frame comprising a first frame section and a movable frame section attached to the first frame section;

a latch disposed on the first frame to selectively secure the movable frame section in a stored position and selectively release the moveable frame section from the stored position to a deployed user position of the movable frame section;

a set of wheels attached to the dolly frame, wherein the set of wheels supports the dolly frame and rotates to allow movement of the dolly frame;

a set of cargo securing pins that are each movable from a retracted position to a deployed position;

an electronics control module disposed on the dolly frame for remotely controlling deployment of the set of cargo securing pins;

an operator station disposed on the movable section of the dolly frame, wherein the operator station further comprises an operator control system interface disposed on the movable frame section, the operator control system interface comprising at least a first user input device operatively in communication with the electronics control module, a status indicator providing feedback on status information related to the set of cargo securing pins and the movable frame section of the dolly frame; and a deployment switch mounted to the dolly frame, wherein depressing the deployment switch responsively releases the latch to release the movable frame section from the stored position.

15. The improved cargo dolly of embodiment 14, wherein the first frame section comprises a front edge of the dolly frame.

16. The improved cargo dolly of embodiment 14, wherein the first frame section comprises a rear edge of the dolly frame.

17. The improved cargo dolly of embodiment 14 further comprising a moveable frame section actuator being disposed on the first frame section and in articulating communication with the movable frame section, the moveable frame section actuator being operable in response to first input from the deployment switch to cause the movable frame section to extend from the first frame section from the stored position to the deployed user position, the moveable frame section actuator being further operable in response to second input from the deployment switch to cause the movable frame section to articulate and retract relative to the first frame section from the deployed user position to the stored position in response to the deployment switch.

18. The improved cargo dolly of embodiment 14 further comprising a moveable frame section actuator being disposed on the first frame section and in articulating communication with the movable frame section, the moveable frame section actuator being operable in response to first input from the deployment switch to cause the latch to selectively release the moveable frame section from the stored position to the deployed user position of the movable frame section.

19. The improved cargo dolly of embodiment 14 further comprising a plurality securing pin actuators respectively coupled to each in the set of cargo securing pins, wherein the securing pin actuators being responsive to first control input received by the first user input device to cause each of the cargo securing pins to move from their respective retracted position to their respective deployed position to secure the cargo, the securing pin actuators being responsive to second control input received by the first user input device to cause the cargo securing pins to move from their respective deployed position to their respective retracted position to release the cargo.

20. The improved cargo dolly of embodiment 14 further comprising a plurality selectively activated securing pin actuators respectively coupled to each in the set of cargo securing pins, wherein each of the selectively activated securing pin actuators being responsive to deploy control input received by the first user input device to cause a respective one of the cargo securing pins to move from a retracted position to a deployed position to facilitate securing the cargo, wherein each of the selectively activated securing pin actuators being responsive to retract control input received by the first user input device to cause the respective one of the cargo securing pins to move from the deployed position to the retracted position to at least partially release the cargo.

Further Embodiment (Set D)—Sensor-Based Auto Actuation of Cargo Holding Pin

1. An improved cargo dolly having sensor-based actuation capabilities, the cargo dolly comprising:

a dolly frame having a top deck for supporting cargo;

a set of wheels attached to the dolly frame, wherein the set of wheels supports the dolly frame and rotates to allow movement of the dolly frame;
a set of cargo securing pins that are each disposed on the dolly frame and movable from a retracted position from below the top deck to a deployed position extending at least partially above the top deck;
a plurality of pin actuators corresponding to each of the cargo securing pins, each of the pin actuators being responsive to a control input to at least articulate the respective one of the cargo securing pins from the retracted position to the deployed position;
an electronics control module disposed on the dolly frame for remotely controlling deployment of each of the set of cargo securing pins by selectively generating the control input for each of the pin actuators;
a plurality of sensors coupled to the electronics control module, wherein a first of the sensors detects motion of the dolly frame, wherein a second of the sensors detects a location of the dolly frame, and wherein a third of the sensors detects proximity of the dolly frame to an object on at least one side of the dolly frame;
wherein the electronics control module is programmatically configured to be operative to at least
receive sensor data from the sensors,
automatically actuate the pin actuators by generating the control input for the cargo securing pins when the sensor data indicates no movement of the dolly frame, the location of the dolly frame is within a predetermined range of a desired logistics point, and the dolly frame is detected to be proximate a cargo loader at the desired logistics point.

2. The improved cargo dolly of embodiment 1, wherein the third of the sensors detects proximity of the dolly frame to the cargo loader as the object on the at least one side of the dolly frame.

3. The improved cargo dolly of embodiment 1, wherein the electronics control module comprises:
a weatherproof housing;
a processor disposed within the weatherproof housing;
a memory coupled to the processor, the memory maintaining program code that programmatically configures operation of the electronics control module;
a wireless transceiver coupled to the processor;
a sensor interface coupled to the processor and connected to the sensors, the sensor interface receiving the sensor data from each of the first of the sensors, the second of the sensors, and the third of the sensors; and
an actuator interface coupled to the processor and connected to the pin actuators to provide the control input to the pin actuators to activate the pin actuators.

4. The improved cargo dolly of embodiment 3, wherein the wireless transceiver receives location information on the desired logistics point from an external transceiver and provide the location information on the desired logistics point to the memory on the electronics control module.

5. The improved cargo dolly of embodiment 4, wherein the external transceiver comprises a user access device operated by a logistics operator of a cargo tractor associated with the improved cargo dolly.

6. The improved cargo dolly of embodiment 4, wherein the external transceiver comprises a central server associated with a plurality of ground support equipment, wherein the improved cargo dolly is part of the plurality of ground support equipment.

7. The improved cargo dolly of embodiment 3 further comprising a connection sensor coupled to the sensor interface and disposed on the dolly frame that detects when the dolly frame is connected to external ground support equipment.

8. The improved cargo dolly of embodiment 7, wherein the electronics control module further comprises a user interface coupled to the processor, the user interface being operative to display a connection status generated by the processor based upon connection data received by the processor from the connection sensor.

9. The improved cargo dolly of embodiment 8, wherein the user interface comprises a display screen.

10. The improved cargo dolly of embodiment 8, wherein the user interface comprises a status indicator light.

11. The improved cargo dolly of embodiment 7, wherein the electronics control module further comprises a speaker coupled to the processor, the speaker being operative to generate an audible connection status notification in response to an audible signal provided by the processor based upon connection data received by the processor from the connection sensor.

12. The improved cargo dolly of embodiment 1, wherein the electronics control module is programmatically further operative to determine an alignment of the dolly frame relative to the cargo loader using at least proximity data from the third of the sensors, the alignment indicating whether the dolly frame is detected to be proximate the cargo loader at the desired logistics point.

13. The improved cargo dolly of embodiment 1, wherein the electronics control module is programmatically further operative to determine an alignment of the dolly frame relative to the cargo loader using location data from the second of the sensors and proximity data from the third of the sensors, the alignment indicating whether the dolly frame is detected to be proximate the cargo loader at the desired logistics point.

14. The improved cargo dolly of embodiment 1 further comprising a user input device coupled to the electronics control module;
wherein the electronics control module is programmatically further operative to determine an alignment of the dolly frame relative to the cargo loader using input from the user input device, location data from the second of the sensors and proximity data from the third of the sensors, the alignment indicating whether the dolly frame is detected to be proximate the cargo loader at the desired logistics point.

15. The improved cargo dolly of embodiment 1, wherein the electronics control module is programmatically further operative to
receive pin status information from the pin actuators, wherein the pin status information reflects a position state of the cargo securing pins indicating one of the retracted position and the deployed position;
determine a permissive movement status for the cargo dolly based upon the pin status information; and
transmit a permissive move indicator message to an external transceiver based upon the permissive movement status for the cargo dolly, the permissive move indicator message including a recommendation on allowed movement of the cargo dolly based upon the pin status information.

16. The improved cargo dolly of embodiment 15, wherein the external transceiver comprises a user access device operated by a logistics operator of a cargo tractor associated with the improved cargo dolly.

17. The improved cargo dolly of embodiment 16, wherein the permissive move indicator message identifies which of the cargo securing pins are in the retracted position causing the permissive movement status for the cargo dolly to indicate movement of the cargo dolly is not allowed.

18. The improved cargo dolly of embodiment 15, wherein the external transceiver comprises a central server associated with a plurality of ground support equipment, wherein the improved cargo dolly is part of the plurality of ground support equipment.

19. The improved cargo dolly of embodiment 15, wherein the external transceiver comprises a cargo tractor transceiver disposed on a cargo tractor associated with the improved cargo dolly.

20. The improved cargo dolly of embodiment 7, wherein the electronics control module is programmatically further operative to
receive connection status data from the connection sensor, wherein the connection status data indicates when the dolly frame is detected to be connected to external ground support equipment;
determine a permissive movement status for the cargo dolly based upon the connection status data; and
transmit a permissive move indicator message to an external transceiver based upon the permissive movement status for the cargo dolly, the permissive move indicator message including a recommendation on allowed movement of the cargo dolly based upon the connection status data.

21. The improved cargo dolly of embodiment 7, wherein the electronics control module is programmatically further operative to:
receive pin status information from the pin actuators, wherein the pin status information reflects a position state of the cargo securing pins indicating one of the retracted position and the deployed position;
receive connection status data from the connection sensor, wherein the connection status data indicates when the dolly frame is detected to be connected to external ground support equipment;
determine a permissive movement status for the cargo dolly based upon the pin status information and the connection status data; and
transmit a permissive move indicator message to an external transceiver based upon the permissive movement status for the cargo dolly, the permissive move indicator message including a recommendation on allowed movement of the cargo dolly based upon the pin status information and the connection status data.

22. The improved cargo dolly of embodiment 1 further comprising a plurality of scales disposed on the dolly frame and coupled to the electronics control module, the scales detecting a weight supported by the dolly frame;
wherein the electronics control module is programmatically further operative to
receive weight change data from the scales, wherein the weight change data indicates a change in the weight supported by the dolly frame over a period of time;
determine a permissive movement status for the cargo dolly based upon the weight change data; and
transmit a permissive move indicator message to an external transceiver based upon the permissive movement status for the cargo dolly, the permissive move indicator message including a recommendation on allowed movement of the cargo dolly based upon the weight change data.

23. The improved cargo dolly of embodiment 7, further comprising a plurality of actuated chocks disposed on the dolly frame and coupled to the electronics control module, the actuated chocks being operative to deploy proximate at least one in the set of wheels in response to a chock signal from the electronics control module to prevent the at least one in the set of wheels from moving;
wherein the electronics control module is programmatically further operative to
receive connection status data from the connection sensor, wherein the connection status data indicates when the dolly frame is detected to be connected to external ground support equipment; and
activate the actuated chocks to prevent the at least one in the set of wheels from moving when the connection status data indicates the dolly frame is not connected to the external ground support equipment.

24. A method for sensor-based actuation of cargo securing pins on an improved cargo dolly, the cargo dolly having a dolly frame and wheels coupled to the dolly frame, the method comprising the steps of:
detecting, by a motion sensor on the cargo dolly, motion of the cargo dolly;
detecting, by a location sensor on the cargo dolly, a location of the cargo dolly;
detecting, by a proximity sensor on a side of the dolly frame, a proximity of the dolly frame to a cargo loader relative to the side of the dolly frame;
determining, by an electronics control module mounted to the dolly frame, an alignment of the dolly frame relative to the cargo loader based upon the detected motion of the cargo dolly, the detected location of the cargo dolly, and the proximity of the dolly frame to the cargo loader; and
automatically actuating, by the electronics control module, pin actuators coupled to the cargo securing pins based upon the determined alignment of the dolly frame relative to the cargo loader.

25. The method of embodiment 24 further comprising the step of receiving user input from a user input device disposed on the dolly frame; and
wherein the step of determining the alignment of the dolly frame relative to the cargo loader is based upon the detected motion of the cargo dolly, the detected location of the cargo dolly, the proximity of the dolly frame to the cargo loader, and the user input from the user input device, wherein the alignment indicating whether the dolly frame is proximate the cargo loader at a desired logistics point.

26. The method of embodiment 25 further comprising the step of receiving location information on the desired logistics point from an external transceiver.

27. The method of embodiment 24 further comprising the steps of:
receiving, by the electronics control module, pin status information from the pin actuators, wherein the pin status information reflects a position state of the cargo securing pins indicating one of the retracted position and the deployed position;
determining, by the electronics control module, a permissive movement status for the cargo dolly based upon the pin status information; and
transmitting, by the electronics control module, a permissive move indicator message to an external transceiver based upon the permissive movement status for the cargo dolly, the permissive move indicator message including a recommendation on allowed movement of the cargo dolly based upon the pin status information.

28. The method of embodiment 27, wherein the external transceiver comprises a user access device operated by a logistics operator of a cargo tractor associated with the cargo dolly.

29. The method of embodiment 27, wherein the external transceiver comprises a central server associated with a plurality of ground support equipment, wherein the cargo dolly is part of the plurality of ground support equipment.

30. The method of embodiment 24 further comprising the steps of:
- receiving, by the electronics control module, pin status information from the pin actuators, wherein the pin status information reflects a position state of the cargo securing pins indicating one of the retracted position and the deployed position;
- receiving, by the electronics control module, connection status data from a connection sensor disposed on the dolly frame, wherein the connection status data indicates when the dolly frame is detected to be connected to external ground support equipment;
- determining, by the electronics control module, a permissive movement status for the cargo dolly based upon the pin status information and the connection status data; and
- transmitting, by the electronics control module, a permissive move indicator message to an external transceiver based upon the permissive movement status for the cargo dolly, the permissive move indicator message including a recommendation on allowed movement of the cargo dolly based upon the pin status information and the connection status data.

31. The method of embodiment 24 further comprising the steps of:
- receiving, by the electronics control module, weight change data from a plurality of scales disposed on the dolly frame that detect a weight supported by the dolly frame, wherein the weight change data indicates a change in the weight supported by the dolly frame over a period of time;
- determining, by the electronics control module, a permissive movement status for the cargo dolly based upon the weight change data; and
- transmitting, by the electronics control module, a permissive move indicator message to an external transceiver based upon the permissive movement status for the cargo dolly, the permissive move indicator message including a recommendation on allowed movement of the cargo dolly based upon the weight change data.

32. The method of embodiment 24 further comprising the steps of:
- receiving, by the electronics control module, connection status data from a connection sensor disposed on the dolly frame, wherein the connection status data indicates when the dolly frame is detected to be connected to external ground support equipment; and
- activating, by the electronics control module, a plurality of actuated chocks disposed on the dolly frame when the connection status data indicates the dolly frame is not connected to the external ground support equipment, the actuated chocks being operative to deploy as activated to be proximate at least one in the set of wheels in response to a chock signal from the electronics control module to prevent the at least one in the set of wheels from moving.

Those skilled in the art will appreciate that the embodiments disclosed and explained above using such an exemplary electronics control module onboard a cargo dolly may be implemented with an apparatus or system of sensors, actuators, feedback systems, communication interfaces, power supplies, and one or more software modules running on the processor of the electronics control module as described above. Such software modules may be stored on non-transitory computer-readable medium in the electronic control module. Thus, when executing such software modules, the electronics control module and any of its peripheral sensors, actuators, feedback systems, and communication interfaces may be operative to perform the operations or steps from the process embodiments disclosed above, including variations of those processes.

In summary, it should be emphasized that the sequence of operations to perform any of the processes/methods and variations of the methods described in the embodiments herein are merely exemplary, and that a variety of sequences of operations may be followed while still being true and in accordance with the principles of the present invention as understood by one skilled in the art.

At least some portions of exemplary embodiments outlined above may be used in association with portions of other exemplary embodiments to enhance and improve logistics operations (such as cargo and package loading, transport, and unloading) using dolly that may be enhanced or improved to allow for remote control of one or pins on the dolly so that they may be dropped/moved on one or more sides of the dolly from another side of the dolly at the same time while avoiding the need for human intervention between the dolly and the container loader and enhanced onboard electronics that further improved on use of such an improved dolly.

As noted above, the exemplary embodiments disclosed herein may be used independently from one another and/or in combination with one another and may have applications to devices and methods not disclosed herein. Further, those skilled in the art will appreciate that embodiments may provide one or more advantages, and not all embodiments necessarily provide all or more than one particular advantage as set forth here. Additionally, it will be apparent to those skilled in the art that various modifications and variations can be made to the structures and methodologies described herein. Thus, it should be understood that the invention is not limited to the subject matter discussed in the description. Rather, the present invention, as recited in the claims below, is intended to cover modifications and variations.

What is claimed:

1. An improved cargo dolly for transporting cargo, the improved cargo dolly comprising:
   - a dolly frame,
   - a set of wheels attached to the dolly frame, wherein the set of wheels supports the dolly frame and rotates to allow movement of the dolly frame;
   - a main shaft rotatably disposed on the dolly frame;
   - a lever disposed proximate to a first part of the dolly frame, wherein the lever is movable relative to the dolly frame and in responsive communication with the main shaft;
   - a first set of transfer sprockets mounted to the main shaft;
   - a secondary shaft rotatably disposed proximate to an edge of the dolly frame at a second part of the dolly frame, wherein the first part of the dolly frame is remote from the second part of the dolly frame;
   - a second set of transfer sprockets mounted to the secondary shaft;

a chain disposed about and engaged with the first set of transfer sprockets and the second set of transfer sprockets;

a locking pin having a first end fixed to the secondary shaft and a second end configured as an angled latch, wherein rotation of the lever at the first part of the dolly frame responsively causes the locking pin to remotely rotate at the second part of the dolly frame.

2. The improved cargo dolly of claim 1, wherein the dolly frame comprises a rail-based frame having at least a front edge, a first side edge connected to the front edge, a second side edge connected to the front edge, a rear edge connected to each of the first side edge and the second side edge, and a cargo deck disposed between the first side edge and the second side edge, wherein the cargo deck provides a working area to support the cargo as loaded on the dolly frame; and wherein the lever is disposed on an inner side of the front edge as the first part of the dolly frame to allow movement of the lever relative to the dolly frame without being in the working area of the cargo.

3. The improved cargo dolly of claim 1, wherein the dolly frame comprises a rail-based frame having at least a front edge, a first side edge connected to the front edge, a second side edge connected to the front edge, a rear edge connected to each of the first side edge and the second side edge, and a cargo deck disposed between the first side edge and the second side edge, wherein the cargo deck provides a working area to support the cargo as loaded on the dolly frame; and wherein the lever is disposed on an inner side of the rear edge as the first part of the dolly frame to allow movement of the lever relative to the dolly frame without being in the working area of the cargo.

4. The improved cargo dolly of claim 1, wherein the lever comprises a handle portion disposed opposite a carriage portion, wherein the carriage portion is seated in responsive communication with the main shaft, wherein pivoting the handle portion causes the carriage portion to rotate about a longitudinal axis of the main shaft and causes rotation of the main shaft.

5. The improved cargo dolly of claim 4, wherein the handle portion comprises a hand grip that moves between a first position and a second position, wherein movement of the hand grip to the first position causes the locking pin to move to an open position and movement of the hand grip to the second position causes the locking pin to move to a closed position, the open position representing a released configuration of the locking pin and the cargo and the closed position representing a secure configuration of the locking pin and the cargo.

6. The improved cargo dolly of claim 4, wherein the angled latch of the locking pin rotates towards an attachment point on the cargo to securely interface with the attachment point on the cargo when the locking pin is moved to the closed position by pivoting the handle portion in a first direction.

7. The improved cargo dolly of claim 6, wherein the angled latch of the locking pin rotates to at least partially extend above the cargo deck to securely interface with the attachment point on the cargo when the locking pin is moved to the closed position by pivoting the handle portion in the first direction.

8. The improved cargo dolly of claim 5, wherein the angled latch of the locking pin rotates away from an attachment point on the cargo to release the cargo when the locking pin is moved to the open position by pivoting the handle portion in a second direction.

9. The improved cargo dolly of claim 8, wherein the angled latch of the locking pin rotates to retract below the cargo deck and away from the interface with the attachment point on the cargo when the locking pin is moved to the open position by pivoting the handle portion in the second direction.

10. The improved cargo dolly of claim 1 further comprising:

a second set of transfer sprockets mounted to the main shaft;

an additional secondary shaft rotatably disposed proximate the edge of the dolly frame at a third part of the dolly frame, wherein the first part of the dolly frame is remote from the third part of the dolly frame;

a third set of transfer sprockets mounted to the additional secondary shaft;

an additional chain disposed about and engaged with the second set of transfer sprockets and the third set of transfer sprockets;

an additional locking pin having one end fixed to the additional secondary shaft and another end configured as a second angled latch, wherein rotation of the lever at the first part of the dolly frame responsively causes the additional locking pin to remotely rotate at the third part of the dolly frame.

11. An improved cargo dolly for transporting cargo, the improved cargo dolly comprising:

a mobile dolly frame, a first lever-actuated locking pin assembly associated with a first edge of the mobile dolly frame, the first lever-actuated locking pin assembly comprising a first main shaft rotatably disposed on the mobile dolly frame proximate the first edge of the mobile dolly frame;

a first lever disposed proximate to a first part of the mobile dolly frame, wherein the first lever is movable relative to the mobile dolly frame and in responsive communication with the first main shaft;

a first set of transfer sprockets mounted to the first main shaft;

a first secondary shaft rotatably disposed proximate the first edge of the mobile dolly frame at a second part of the mobile dolly frame, wherein the first part of the mobile dolly frame is remote from the second part of the mobile dolly frame;

a second set of transfer sprockets mounted to the first secondary shaft;

a first chain disposed about and engaged with the first set of transfer sprockets and the second set of transfer sprockets; and a first locking pin having a first end fixed to the first secondary shaft and a second end configured as a first angled latch, wherein rotation of the first lever at the first part of the mobile dolly frame responsively causes the first locking pin to remotely rotate at the second part of the mobile dolly frame; and a second lever-actuated locking pin assembly associated with a second edge of the mobile dolly frame opposing the first edge of the mobile dolly frame, the second lever-actuated locking pin assembly comprising a second main shaft rotatably disposed on the mobile dolly frame proximate the second edge of the mobile dolly frame;

a second lever disposed proximate to the first part of the mobile dolly frame, wherein the second lever is movable relative to the mobile dolly frame and in responsive communication with the second main shaft;

a third set of transfer sprockets mounted to the second main shaft;

a second secondary shaft rotatably disposed proximate the second edge of the mobile dolly frame at a third part of the mobile dolly frame, wherein the first part of the mobile dolly frame is remote from the third part of the mobile dolly frame;

a fourth set of transfer sprockets mounted to the first secondary shaft;

a second chain disposed about and engaged with the third set of transfer sprockets and the fourth set of transfer sprockets; and a second locking pin having one end fixed to the second secondary shaft and another end configured as a second angled latch, wherein rotation of the second lever at the first part of the mobile dolly frame responsively causes the second locking pin to remotely rotate at the third part of the mobile dolly frame.

12. The improved cargo dolly of claim 11, wherein the first part of the mobile dolly frame comprises a front edge of the mobile dolly frame.

13. The improved cargo dolly of claim 11, wherein the first part of the mobile dolly frame comprises a rear edge of the mobile dolly frame.

14. The improved cargo dolly of claim 11, wherein the mobile dolly frame further comprises a cargo deck disposed between the first edge of the mobile dolly frame and the second edge of the mobile dolly frame, wherein the cargo deck provides a working area to support the cargo as loaded on the dolly frame; and wherein each of the first lever and the second lever is disposed on an inner side of the first part of the mobile dolly frame to allow movement of each of the first lever and the second lever relative to the dolly frame without being in the working area of the cargo.

15. The improved cargo dolly of claim 11, wherein the first lever comprises a first handle portion and disposed opposite a first carriage portion, wherein the first carriage portion is seated in responsive communication with the first main shaft, wherein pivoting the first handle portion causes the first carriage portion to rotate about a longitudinal axis of the first main shaft and causes rotation of the first main shaft.

16. The improved cargo dolly of claim 11, wherein the second lever comprises a second handle portion disposed opposite a second carriage portion, wherein the second carriage portion is seated in responsive communication with the second main shaft, wherein pivoting the second handle portion causes the second carriage portion to rotate about a longitudinal axis of the second main shaft and causes rotation of the second main shaft.

17. The improved cargo dolly of claim 15, wherein the first handle portion comprises a hand grip that moves between a first position and a second position, wherein movement of the hand grip to the first position causes the first locking pin to move to an open position and movement of the hand grip to the second position causes the first locking pin to move to a closed position, the open position representing a released configuration of the first locking pin and the cargo and the closed position representing a secure configuration of the first locking pin and the cargo.

18. The improved cargo dolly of claim 17, wherein the first angled latch of the first locking pin rotates towards a first attachment point on the cargo to securely interface with the first attachment point on the cargo when the first locking pin is moved to the closed position by pivoting the first handle portion in a first direction.

19. The improved cargo dolly of claim 18, wherein the first angled latch of the first locking pin rotates to at least partially extend above the cargo deck to securely interface with the first attachment point on the cargo when the first locking pin is moved to the closed position by pivoting the first handle portion in the first direction.

20. The improved cargo dolly of claim 17, wherein the first angled latch of the first locking pin rotates away from a first attachment point on the cargo to release the cargo when the first locking pin is moved to the open position by pivoting the first handle portion in a second direction.

21. The improved cargo dolly of claim 20, wherein the first angled latch of the first locking pin rotates to retract below the cargo deck and away from the interface with the first attachment point on the cargo when the first locking pin is moved to the open position by pivoting the first handle portion in the second direction.

22. The improved cargo dolly of claim 15, wherein the second handle portion comprises a hand grip that moves between a first position and a second position, wherein movement of the hand grip to the first position causes the second locking pin to move to an open position and movement of the hand grip to the second position causes the second locking pin to move to a closed position, the open position representing a released configuration of the second locking pin and the cargo and the closed position representing a secure configuration of the second locking pin and the cargo.

23. The improved cargo dolly of claim 22, wherein the second angled latch of the second locking pin rotates towards a second attachment point on the cargo to securely interface with the second attachment point on the cargo when the second locking pin is moved to the closed position by pivoting the second handle portion in a first direction.

24. The improved cargo dolly of claim 23, wherein the second angled latch of the second locking pin rotates to at least partially extend above the cargo deck to securely interface with the second attachment point on the cargo when the second locking pin is moved to the closed position by pivoting the second handle portion in the first direction.

25. The improved cargo dolly of claim 22, wherein the second angled latch of the second locking pin rotates away from a second attachment point on the cargo to release the cargo when the second locking pin is moved to the open position by pivoting the second handle portion in a second direction.

26. The improved cargo dolly of claim 25, wherein the second angled latch of the second locking pin rotates to retract below the cargo deck and away from the interface with the second attachment point on the cargo when the second locking pin is moved to the open position by pivoting the second handle portion in the second direction.

* * * * *